US011880179B2

(12) United States Patent
Strohmenger et al.

(10) Patent No.: US 11,880,179 B2
(45) Date of Patent: *Jan. 23, 2024

(54) CLOUD-BASED ANALYTICS FOR INDUSTRIAL AUTOMATION

(71) Applicant: Rockwell Automation Technologies, Inc., Mayfield Heights, OH (US)

(72) Inventors: John Strohmenger, Strongsville, OH (US); Jessica L. Korpela, Milwaukee, WI (US); Matthew W. Fordenwalt, Hudson, OH (US); Jan Pingel, Weddington, NC (US); Stephen L Hickox, Middlefield, OH (US); Douglas B Weber, Glendale, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 175 days.

This patent is subject to a terminal disclaimer.

(21) Appl. No.: 17/648,098

(22) Filed: Jan. 14, 2022

(65) Prior Publication Data

US 2022/0137582 A1 May 5, 2022

Related U.S. Application Data

(63) Continuation of application No. 14/658,345, filed on Mar. 16, 2015, now Pat. No. 11,243,505.

(51) Int. Cl.
*G05B 19/042* (2006.01)
*G05B 15/02* (2006.01)
(Continued)

(52) U.S. Cl.
CPC ......... *G05B 19/0428* (2013.01); *G05B 15/02* (2013.01); *G05B 23/0237* (2013.01);
(Continued)

(58) Field of Classification Search
CPC ............... G05B 19/0428; G05B 15/02; G05B 23/0237; G05B 2219/23026;
(Continued)

(56) References Cited

U.S. PATENT DOCUMENTS

| 5,014,317 A | 5/1991 | Kita et al. |
| 5,122,948 A | 6/1992 | Zapolin |

(Continued)

FOREIGN PATENT DOCUMENTS

| CN | 1232553 A | 10/1999 |
| CN | 1255208 | 5/2000 |

(Continued)

OTHER PUBLICATIONS

Final Office Action received for U.S. Appl. No. 14/658,365 dated Jan. 24, 2022, 38 pages.

(Continued)

*Primary Examiner* — Santosh R Poudel
(74) *Attorney, Agent, or Firm* — Amin, Turocy & Watson, LLP

(57) ABSTRACT

A cloud-based analytics engine that analyzes data relating to an industrial automation system(s) to facilitate enhancing operation of the industrial automation system(s) is presented. The analytics engine can interface with the industrial automation system(s) via a cloud gateway(s) and can analyze industrial-related data obtained from the industrial automation system(s). The analytics engine can determine correlations between respective portions or aspects of the system(s), between a portion(s) or aspect(s) of the system(s) and extrinsic events or conditions, or between an employee(s) and the system(s). The analytics engine can determine and provide recommendations or instructions in connection with the industrial automation system(s) to enhance system performance based on the determined cor- (Continued)

relations. The analytics engine also can determine when there is a deviation or potential of deviation from desired system performance by an industrial asset or employee, and provide a notification, a recommendation, or an instruction to rectify or avoid the deviation.

20 Claims, 22 Drawing Sheets

(51) Int. Cl.
  *G06Q 10/06* (2023.01)
  *G05B 23/02* (2006.01)
(52) U.S. Cl.
  CPC ... *G06Q 10/06* (2013.01); *G05B 2219/23026* (2013.01); *G05B 2219/23068* (2013.01); *G05B 2219/24015* (2013.01); *G05B 2219/32187* (2013.01); *Y02P 90/02* (2015.11); *Y02P 90/80* (2015.11)
(58) Field of Classification Search
  CPC .......... G05B 2219/23068; G05B 2219/24015; G05B 2219/32187; G05B 19/418; G05B 19/41875; G05B 23/02; G05B 23/0283; G06Q 10/06; Y02P 90/02; Y02P 90/80
  See application file for complete search history.

(56) References Cited

U.S. PATENT DOCUMENTS

| | | | |
|---|---|---|---|
| 5,199,009 A | 3/1993 | Svast |
| 5,598,572 A | 1/1997 | Tanikoshi et al. |
| 5,611,059 A | 3/1997 | Benton et al. |
| 5,612,869 A | 3/1997 | Letzt et al. |
| 5,682,460 A | 10/1997 | Hyziak et al. |
| 5,710,885 A | 1/1998 | Bondi |
| 5,844,794 A | 12/1998 | Keeley |
| 5,845,149 A | 12/1998 | Husted et al. |
| 5,856,931 A | 1/1999 | McCasland |
| 5,957,985 A | 9/1999 | Wong et al. |
| 5,966,301 A | 10/1999 | Cook et al. |
| 5,970,430 A | 10/1999 | Burns et al. |
| 5,978,568 A | 11/1999 | Abraham et al. |
| 6,167,337 A | 12/2000 | Haack et al. |
| 6,175,770 B1 | 1/2001 | Bladow |
| 6,175,801 B1 | 1/2001 | Millington |
| 6,199,068 B1 | 3/2001 | Carpenter |
| 6,279,113 B1 | 8/2001 | Vaidya |
| 6,282,455 B1 | 8/2001 | Engdahl |
| 6,324,607 B1 | 11/2001 | Korowitz et al. |
| 6,381,502 B1 | 4/2002 | Rudder et al. |
| 6,400,996 B1 | 6/2002 | Hoffberg et al. |
| 6,412,032 B1 | 6/2002 | Neet et al. |
| 6,437,692 B1 | 8/2002 | Petite et al. |
| 6,457,024 B1 | 9/2002 | Felsentein et al. |
| 6,463,338 B1 | 10/2002 | Neet |
| 6,466,972 B1 | 10/2002 | Paul et al. |
| 6,529,780 B1 | 3/2003 | Soergel et al. |
| 6,535,926 B1 | 3/2003 | Esker |
| 6,578,005 B1 | 6/2003 | Lesaint et al. |
| 6,624,388 B1 | 9/2003 | Blankenship et al. |
| 6,640,145 B2 | 10/2003 | Hoffberg et al. |
| 6,651,062 B2 | 11/2003 | Ghannam et al. |
| 6,675,226 B1 | 1/2004 | Nair et al. |
| 6,686,838 B1 | 2/2004 | Rezvani et al. |
| 6,691,159 B1 | 2/2004 | Grewal et al. |
| 6,705,229 B2 | 3/2004 | Frankenberger |
| 6,708,074 B1 | 3/2004 | Chi et al. |
| 6,708,385 B1 | 3/2004 | Lemelson |
| 6,714,974 B1 | 3/2004 | Machida |
| 6,728,262 B1 | 4/2004 | Woram |
| 6,732,165 B1 | 5/2004 | Jennings, III |
| 6,732,191 B1 | 5/2004 | Baker et al. |
| 6,757,897 B1 | 6/2004 | Shi et al. |
| 6,774,598 B1 | 8/2004 | Kohler et al. |
| 6,801,920 B1 | 10/2004 | Wischinski |
| 6,819,960 B1 | 11/2004 | McKelvey et al. |
| 6,891,850 B1 | 5/2005 | Vandesteeg et al. |
| 6,895,532 B2 | 5/2005 | Raynham |
| 6,904,600 B1 | 6/2005 | James et al. |
| 6,907,302 B2 | 6/2005 | Karbassi |
| 6,920,502 B2 | 7/2005 | Araujo et al. |
| 6,952,680 B1 | 10/2005 | Melby et al. |
| 6,965,802 B2 | 11/2005 | Sexton |
| 6,968,242 B1 | 11/2005 | Hwu et al. |
| 6,970,913 B1 | 11/2005 | Albert et al. |
| 6,982,953 B1 | 1/2006 | Swales |
| 7,032,045 B2 | 4/2006 | Kostadinov |
| 7,085,814 B1 | 8/2006 | Gandhi et al. |
| 7,103,428 B2 | 9/2006 | Varone et al. |
| 7,133,900 B1 | 11/2006 | Szeto |
| 7,149,792 B1 | 12/2006 | Hansen et al. |
| 7,151,966 B1 | 12/2006 | Baier et al. |
| 7,203,560 B1 | 4/2007 | Wylie et al. |
| 7,210,095 B1 | 4/2007 | Mor |
| 7,233,830 B1 | 6/2007 | Callaghan et al. |
| 7,242,009 B1 | 7/2007 | Wilson et al. |
| 7,275,037 B2 | 9/2007 | Lauer |
| 7,277,865 B1 | 10/2007 | Silverstone et al. |
| 7,289,994 B2 | 10/2007 | Nixon et al. |
| 7,298,275 B2 | 11/2007 | Brandt et al. |
| 7,310,344 B1 | 12/2007 | Sue |
| 7,383,155 B2 | 6/2008 | Rosam et al. |
| 7,412,548 B2 | 8/2008 | Sichner |
| 7,428,495 B2 | 9/2008 | Dhar et al. |
| 7,478,010 B2 | 1/2009 | Hashemian |
| 7,480,728 B2 | 1/2009 | Evans |
| 7,539,724 B1 | 5/2009 | Callaghan |
| 7,734,590 B2 | 6/2010 | Chand et al. |
| 7,827,122 B1 | 11/2010 | Campbell, Jr. et al. |
| 7,831,317 B2 | 11/2010 | McGreevy et al. |
| 8,150,959 B1 | 4/2012 | Bezdicek et al. |
| 8,266,066 B1 | 9/2012 | Wezter et al. |
| 8,353,012 B2 | 1/2013 | Del Real |
| 8,392,845 B2 | 3/2013 | Cahill et al. |
| 8,451,753 B2 | 5/2013 | Vanga et al. |
| 8,468,272 B2 | 6/2013 | Giroti |
| 8,484,250 B2 | 7/2013 | Sujeet et al. |
| 8,686,871 B2 | 4/2014 | Jensen et al. |
| 8,914,300 B2 | 12/2014 | Sustaeta et al. |
| 8,924,328 B1 | 12/2014 | Kozlovsky et al. |
| 9,024,955 B2 | 5/2015 | Ramarao et al. |
| 9,117,076 B2 | 8/2015 | Devost |
| 9,438,648 B2 | 9/2016 | Asenjo et al. |
| 9,507,807 B1 | 11/2016 | Florissi et al. |
| 9,685,053 B2 | 6/2017 | Palmeri |
| 9,690,669 B2 | 6/2017 | Bernal et al. |
| 9,703,902 B2 | 7/2017 | Asenjo et al. |
| 9,709,978 B2 | 7/2017 | Asenjo et al. |
| 10,026,049 B2 | 7/2018 | Asenjo et al. |
| 10,054,914 B2 | 8/2018 | Vartiainen et al. |
| 2001/0035729 A1 | 11/2001 | Graiger et al. |
| 2002/0004796 A1 | 1/2002 | Vange et al. |
| 2002/0004798 A1 | 1/2002 | Babula et al. |
| 2002/0016839 A1 | 2/2002 | Smith et al. |
| 2002/0042756 A1 | 4/2002 | Kumar et al. |
| 2002/0046239 A1 | 4/2002 | Stawikowski et al. |
| 2002/0049833 A1 | 4/2002 | Kikinis |
| 2002/0065898 A1 | 5/2002 | Leontiev et al. |
| 2002/0068983 A1 | 6/2002 | Sexton |
| 2002/0068984 A1 | 6/2002 | Alexander et al. |
| 2002/0073236 A1 | 6/2002 | Helgeson et al. |
| 2002/0077711 A1 | 6/2002 | Nixon et al. |
| 2002/0078432 A1 | 6/2002 | Charisius et al. |
| 2002/0082966 A1 | 6/2002 | O'Brien et al. |
| 2002/0094588 A1 | 7/2002 | Fan et al. |
| 2002/0095483 A1 | 7/2002 | Lee et al. |
| 2002/0096077 A1 | 7/2002 | Frankenberger |
| 2002/0107904 A1 | 8/2002 | Talluri et al. |
| 2002/0138378 A1 | 9/2002 | Leskuski |
| 2002/0156562 A1 | 10/2002 | Berger et al. |
| 2002/0156872 A1 | 10/2002 | Brown |

(56) References Cited

U.S. PATENT DOCUMENTS

| | | |
|---|---|---|
| 2002/0156926 A1 | 10/2002 | Batke et al. |
| 2002/0161745 A1 | 10/2002 | Call |
| 2002/0169993 A1 | 11/2002 | Woods et al. |
| 2003/0004937 A1 | 1/2003 | Salmenkaita et al. |
| 2003/0009253 A1 | 1/2003 | McIntyre et al. |
| 2003/0009572 A1 | 1/2003 | Thurner |
| 2003/0011467 A1 | 1/2003 | Suomela |
| 2003/0014149 A1 | 1/2003 | Kreidler et al. |
| 2003/0023336 A1 | 1/2003 | Kreidler et al. |
| 2003/0033179 A1 | 2/2003 | Katz et al. |
| 2003/0041089 A1 | 2/2003 | Mauro |
| 2003/0051074 A1 | 3/2003 | Edwards |
| 2003/0056224 A1 | 3/2003 | Stone |
| 2003/0069002 A1 | 4/2003 | Hunter et al. |
| 2003/0084016 A1 | 5/2003 | Norgaard et al. |
| 2003/0105535 A1 | 6/2003 | Rammler |
| 2003/0105585 A1 | 6/2003 | Ukita |
| 2003/0109942 A1 | 6/2003 | Yeh et al. |
| 2003/0120817 A1 | 6/2003 | Ott et al. |
| 2003/0150908 A1 | 8/2003 | Pokorny et al. |
| 2003/0156639 A1 | 8/2003 | Liang |
| 2003/0167238 A1 | 9/2003 | Zeif |
| 2003/0167449 A1 | 9/2003 | Warren et al. |
| 2003/0177169 A1 | 9/2003 | Nutt et al. |
| 2003/0177201 A1 | 9/2003 | Shen |
| 2003/0183456 A1 | 10/2003 | Hatzor |
| 2003/0198188 A1 | 10/2003 | Castlebury et al. |
| 2003/0200285 A1 | 10/2003 | Hansen et al. |
| 2003/0208545 A1 | 11/2003 | Eaton et al. |
| 2003/0217100 A1 | 11/2003 | Kronk |
| 2003/0224769 A1 | 12/2003 | Solve et al. |
| 2003/0236576 A1 | 12/2003 | Resnick et al. |
| 2004/0024572 A1 | 2/2004 | Pagnano et al. |
| 2004/0025173 A1 | 2/2004 | Levonai et al. |
| 2004/0032935 A1 | 2/2004 | Mills et al. |
| 2004/0083165 A1 | 4/2004 | Lawrence |
| 2004/0111512 A1 | 6/2004 | Barth |
| 2004/0148039 A1 | 7/2004 | Farchmin et al. |
| 2004/0148187 A1 | 7/2004 | Boettcher et al. |
| 2004/0148383 A1 | 7/2004 | Gonsalves et al. |
| 2004/0159113 A1 | 8/2004 | Singh et al. |
| 2004/0199573 A1 | 10/2004 | Schwartz et al. |
| 2004/0203895 A1 | 10/2004 | Balasuriya |
| 2004/0214566 A1 | 10/2004 | Suzuki et al. |
| 2004/0215551 A1 | 10/2004 | Eder |
| 2004/0225629 A1 | 11/2004 | Eder |
| 2004/0267729 A1 | 12/2004 | Swaminathan et al. |
| 2005/0005093 A1 | 1/2005 | Bartels et al. |
| 2005/0021158 A1 | 1/2005 | De meyer et al. |
| 2005/0038528 A1 | 2/2005 | McKelvey et al. |
| 2005/0055429 A1 | 3/2005 | Abele et al. |
| 2005/0080799 A1 | 4/2005 | Harnden et al. |
| 2005/0090911 A1 | 4/2005 | Ingargiola et al. |
| 2005/0091410 A1 | 4/2005 | Gibart et al. |
| 2005/0120112 A1 | 6/2005 | Wing et al. |
| 2005/0125441 A1 | 6/2005 | Clemens et al. |
| 2005/0137735 A1 | 6/2005 | Loy et al. |
| 2005/0149922 A1 | 7/2005 | Vincent |
| 2005/0203869 A1 | 9/2005 | Minamino et al. |
| 2005/0203960 A1 | 9/2005 | Suarez et al. |
| 2005/0209902 A1 | 9/2005 | Iwasaki et al. |
| 2005/0257204 A1 | 11/2005 | Bryant et al. |
| 2005/0278441 A1 | 12/2005 | Bond et al. |
| 2006/0022048 A1 | 2/2006 | Johnson |
| 2006/0026193 A1 | 2/2006 | Hood |
| 2006/0046712 A1 | 3/2006 | Shamp et al. |
| 2006/0067209 A1 | 3/2006 | Sheehan et al. |
| 2006/0077095 A1 | 4/2006 | Tucker et al. |
| 2006/0078859 A1 | 4/2006 | Mullin |
| 2006/0149813 A1 | 7/2006 | Janik |
| 2006/0153089 A1 | 7/2006 | Silverman |
| 2006/0173873 A1 | 8/2006 | Prompt et al. |
| 2006/0190106 A1 | 8/2006 | Kay et al. |
| 2006/0236374 A1 | 10/2006 | Hartman |
| 2006/0253205 A1 | 11/2006 | Gardiner |
| 2006/0259154 A1 | 11/2006 | Hood et al. |
| 2006/0259472 A1 | 11/2006 | MacClellan |
| 2006/0282432 A1 | 12/2006 | Cassidy et al. |
| 2007/0008129 A1 | 1/2007 | Soliman |
| 2007/0019641 A1 | 1/2007 | Pai et al. |
| 2007/0021968 A1 | 1/2007 | Amir et al. |
| 2007/0043674 A1* | 2/2007 | DiFalco ............... G06F 16/128 705/51 |
| 2007/0050206 A1 | 3/2007 | Whikehart et al. |
| 2007/0061018 A1 | 3/2007 | Callaghan et al. |
| 2007/0067145 A1 | 3/2007 | Miller et al. |
| 2007/0073850 A1 | 3/2007 | Callaghan et al. |
| 2007/0078525 A1 | 4/2007 | Chand |
| 2007/0078536 A1 | 4/2007 | Gordon et al. |
| 2007/0078537 A1 | 4/2007 | Chand et al. |
| 2007/0078736 A1 | 4/2007 | Chand et al. |
| 2007/0078862 A1 | 4/2007 | Chand et al. |
| 2007/0095907 A1 | 5/2007 | Robinson et al. |
| 2007/0112801 A1 | 5/2007 | McGreevy et al. |
| 2007/0118560 A1 | 5/2007 | Bornhoevd et al. |
| 2007/0130112 A1 | 6/2007 | Lin |
| 2007/0168057 A1 | 7/2007 | Blevins et al. |
| 2007/0192213 A1 | 8/2007 | Wu et al. |
| 2007/0194097 A1 | 8/2007 | Jones et al. |
| 2007/0213989 A1 | 9/2007 | Cooksy et al. |
| 2007/0244892 A1 | 10/2007 | Narancic |
| 2007/0245169 A1 | 10/2007 | Farchmin et al. |
| 2007/0247789 A1 | 10/2007 | Benson et al. |
| 2007/0255431 A1 | 11/2007 | Kinsey |
| 2008/0004739 A1 | 1/2008 | Varadhan et al. |
| 2008/0027704 A1 | 1/2008 | Kephart et al. |
| 2008/0049013 A1 | 2/2008 | Nasle |
| 2008/0065243 A1 | 3/2008 | Fallman et al. |
| 2008/0077512 A1 | 3/2008 | Grewal |
| 2008/0082186 A1 | 4/2008 | Hood et al. |
| 2008/0109099 A1 | 5/2008 | Moshier |
| 2008/0125887 A1 | 5/2008 | Case |
| 2008/0155064 A1 | 6/2008 | Kosuge et al. |
| 2008/0162688 A1 | 7/2008 | Reumann et al. |
| 2008/0189637 A1 | 8/2008 | Krajewski et al. |
| 2008/0208365 A1 | 8/2008 | Grgic et al. |
| 2008/0209211 A1 | 8/2008 | Grgic et al. |
| 2008/0214104 A1 | 9/2008 | Baumert et al. |
| 2008/0229754 A1 | 9/2008 | Goebel et al. |
| 2008/0263514 A1 | 10/2008 | DeMesa et al. |
| 2008/0303472 A1 | 12/2008 | John et al. |
| 2009/0024440 A1 | 1/2009 | Spahn |
| 2009/0037378 A1 | 2/2009 | Moor et al. |
| 2009/0037872 A1 | 2/2009 | Schnabele et al. |
| 2009/0063258 A1 | 3/2009 | Mueller et al. |
| 2009/0065578 A1 | 3/2009 | Peterson et al. |
| 2009/0070163 A1 | 3/2009 | Angell et al. |
| 2009/0083204 A1 | 3/2009 | Baier et al. |
| 2009/0086692 A1 | 4/2009 | Chen |
| 2009/0088875 A1 | 4/2009 | Baier et al. |
| 2009/0089032 A1 | 4/2009 | Sturrock et al. |
| 2009/0089233 A1 | 4/2009 | Gach et al. |
| 2009/0089359 A1 | 4/2009 | Siorek et al. |
| 2009/0089682 A1 | 4/2009 | Baier et al. |
| 2009/0109889 A1 | 4/2009 | Budampati et al. |
| 2009/0125460 A1 | 5/2009 | Hewison et al. |
| 2009/0127325 A1 | 5/2009 | Macurek et al. |
| 2009/0132458 A1 | 5/2009 | Edwards et al. |
| 2009/0182689 A1 | 7/2009 | Chiles et al. |
| 2009/0204234 A1 | 8/2009 | Sustaeta et al. |
| 2009/0210071 A1 | 8/2009 | Agrusa et al. |
| 2009/0210814 A1 | 8/2009 | Agrusa et al. |
| 2009/0216341 A1 | 8/2009 | Enkerud et al. |
| 2009/0265157 A1 | 10/2009 | Piepenbrock et al. |
| 2009/0300151 A1 | 12/2009 | Friedman et al. |
| 2009/0316977 A1 | 12/2009 | Juncker et al. |
| 2009/0319831 A1 | 12/2009 | Kruchinin et al. |
| 2009/0319848 A1 | 12/2009 | Thaper |
| 2010/0010859 A1 | 1/2010 | Ratakonda et al. |
| 2010/0023562 A1 | 1/2010 | Kreuch et al. |
| 2010/0042704 A1 | 2/2010 | Chakra et al. |
| 2010/0057660 A1 | 3/2010 | Kato |
| 2010/0076575 A1 | 3/2010 | Vasko et al. |
| 2010/0077160 A1 | 3/2010 | Liu et al. |

(56) References Cited

U.S. PATENT DOCUMENTS

| | | |
|---|---|---|
| 2010/0082127 A1 | 4/2010 | Plache et al. |
| 2010/0082129 A1 | 4/2010 | McGreevy et al. |
| 2010/0082142 A1 | 4/2010 | Usadi et al. |
| 2010/0082314 A1 | 4/2010 | Pritchard et al. |
| 2010/0082453 A1 | 4/2010 | Speers et al. |
| 2010/0082669 A1 | 4/2010 | Obitko et al. |
| 2010/0083232 A1 | 4/2010 | Chouinard et al. |
| 2010/0083356 A1 | 4/2010 | Steckley et al. |
| 2010/0118895 A1 | 5/2010 | Radulescu |
| 2010/0146014 A1 | 6/2010 | Ionescu et al. |
| 2010/0153487 A1 | 6/2010 | Greven et al. |
| 2010/0192144 A1 | 7/2010 | Schmit |
| 2010/0210240 A1 | 8/2010 | Mahaffey et al. |
| 2010/0211509 A1 | 8/2010 | Jacobs |
| 2010/0219950 A1 | 9/2010 | Kong et al. |
| 2010/0223212 A1 | 9/2010 | Manolescu et al. |
| 2010/0241260 A1 | 9/2010 | Kilibarda et al. |
| 2010/0256795 A1 | 10/2010 | Mclaughlin et al. |
| 2010/0257227 A1 | 10/2010 | McLaughlin et al. |
| 2010/0257228 A1 | 10/2010 | Staggs et al. |
| 2010/0306377 A1 | 12/2010 | DeHaan et al. |
| 2010/0318392 A1 | 12/2010 | Cassels et al. |
| 2010/0318837 A1 | 12/2010 | Murphy et al. |
| 2010/0324855 A1 | 12/2010 | Parker |
| 2010/0332008 A1 | 12/2010 | Knipfer et al. |
| 2011/0004446 A1 | 1/2011 | Dorn et al. |
| 2011/0016058 A1 | 1/2011 | Pinchuk |
| 2011/0035253 A1 | 2/2011 | Mason et al. |
| 2011/0047230 A1 | 2/2011 | McGee |
| 2011/0078300 A9 | 3/2011 | Grelewicz et al. |
| 2011/0093308 A1 | 4/2011 | Majeed |
| 2011/0161378 A1 | 6/2011 | Williamson |
| 2011/0173127 A1 | 7/2011 | Ho et al. |
| 2011/0257766 A1 | 10/2011 | Sundaram et al. |
| 2011/0265020 A1 | 10/2011 | Fields et al. |
| 2011/0276498 A1 | 11/2011 | Madhok |
| 2011/0288667 A1 | 11/2011 | Noda et al. |
| 2011/0295634 A1 | 12/2011 | Bhamidipaty et al. |
| 2012/0005242 A1 | 1/2012 | Feng et al. |
| 2012/0022700 A1 | 1/2012 | Dress et al. |
| 2012/0054246 A1 | 3/2012 | Fischer |
| 2012/0072597 A1 | 3/2012 | Teather et al. |
| 2012/0079461 A1 | 3/2012 | Copass et al. |
| 2012/0083906 A1 | 4/2012 | Weatherhead et al. |
| 2012/0084400 A1 | 4/2012 | Almadi et al. |
| 2012/0089920 A1 | 4/2012 | Eick |
| 2012/0095808 A1 | 4/2012 | Kattapuram et al. |
| 2012/0101801 A1 | 4/2012 | Van Dorsselaer |
| 2012/0143374 A1 | 6/2012 | Mistry et al. |
| 2012/0147894 A1 | 6/2012 | Mulligan et al. |
| 2012/0191439 A1 | 7/2012 | Meagher et al. |
| 2012/0197911 A1 | 8/2012 | Banka et al. |
| 2012/0232876 A1 | 9/2012 | Misra |
| 2012/0257544 A1 | 10/2012 | Schein et al. |
| 2012/0262069 A1 | 10/2012 | Reed |
| 2012/0290104 A1 | 11/2012 | Holt et al. |
| 2012/0290266 A1 | 11/2012 | Jain et al. |
| 2012/0297249 A1 | 11/2012 | Yang et al. |
| 2012/0304007 A1 | 11/2012 | Hanks et al. |
| 2012/0306620 A1 | 12/2012 | Karaffa et al. |
| 2012/0311387 A1 | 12/2012 | Santhosh et al. |
| 2013/0004281 A1 | 1/2013 | Anders et al. |
| 2013/0012220 A1 | 1/2013 | Waris et al. |
| 2013/0018696 A1 | 1/2013 | Meldrum |
| 2013/0024542 A1 | 1/2013 | Keller et al. |
| 2013/0031158 A1 | 1/2013 | Salsburg |
| 2013/0036198 A1 | 2/2013 | Galm et al. |
| 2013/0041705 A1 | 2/2013 | Tampapur et al. |
| 2013/0097563 A1 | 4/2013 | Pacheco Rodrigues Velho et al. |
| 2013/0097710 A1 | 4/2013 | Basavapatna et al. |
| 2013/0104236 A1 | 4/2013 | Ray et al. |
| 2013/0107772 A1 | 5/2013 | Splitz et al. |
| 2013/0111019 A1 | 5/2013 | Tjew et al. |
| 2013/0111034 A1 | 5/2013 | Upadhya |
| 2013/0117064 A1 | 5/2013 | Sadeghi et al. |
| 2013/0117806 A1 | 5/2013 | Parthasarathy et al. |
| 2013/0125233 A1 | 5/2013 | Bush et al. |
| 2013/0138812 A1 | 5/2013 | Assuncao et al. |
| 2013/0138818 A1 | 5/2013 | Wolf |
| 2013/0145033 A1 | 6/2013 | Polla et al. |
| 2013/0159500 A1 | 6/2013 | Reus et al. |
| 2013/0182107 A1 | 7/2013 | Anderson |
| 2013/0191106 A1 | 7/2013 | Kephart et al. |
| 2013/0204982 A1 | 8/2013 | Kim et al. |
| 2013/0211546 A1 | 8/2013 | Lawson et al. |
| 2013/0211547 A1 | 8/2013 | Buchdunger et al. |
| 2013/0211555 A1 | 8/2013 | Lawson et al. |
| 2013/0211559 A1 | 8/2013 | Awson et al. |
| 2013/0211870 A1 | 8/2013 | Lawson et al. |
| 2013/0212420 A1 | 8/2013 | Lawson et al. |
| 2013/0212521 A1 | 8/2013 | Fedoseyeva et al. |
| 2013/0218971 A1 | 8/2013 | Sasaki et al. |
| 2013/0237204 A1 | 9/2013 | Buck et al. |
| 2013/0257627 A1 | 10/2013 | Rafael |
| 2013/0262654 A1 | 10/2013 | Masli et al. |
| 2013/0274899 A1 | 10/2013 | Hamzaoui et al. |
| 2013/0282150 A1 | 10/2013 | Panther et al. |
| 2013/0283265 A1 | 10/2013 | Acharya et al. |
| 2013/0304237 A1 | 11/2013 | Schroeder et al. |
| 2013/0311827 A1 | 11/2013 | Drory et al. |
| 2013/0325545 A1 | 12/2013 | Mordvinova et al. |
| 2013/0347003 A1 | 12/2013 | Whitmore |
| 2014/0013100 A1 | 1/2014 | Menzel et al. |
| 2014/0046618 A1 | 2/2014 | Arunachalam et al. |
| 2014/0046977 A1 | 2/2014 | Gopalakrishnan et al. |
| 2014/0047107 A1 | 2/2014 | Maturana et al. |
| 2014/0052499 A1 | 2/2014 | Wagner et al. |
| 2014/0059056 A1 | 2/2014 | Chaney et al. |
| 2014/0067360 A1 | 3/2014 | Bhamidipaty et al. |
| 2014/0081691 A1 | 3/2014 | Wendell |
| 2014/0095231 A1 | 4/2014 | Cherusseri et al. |
| 2014/0095654 A1 | 4/2014 | Finnerty et al. |
| 2014/0116341 A1* | 5/2014 | Kopic ............... A01J 99/00 119/14.02 |
| 2014/0121789 A1 | 5/2014 | Brandes et al. |
| 2014/0137257 A1 | 5/2014 | Martinez et al. |
| 2014/0156032 A1 | 6/2014 | Jenkins et al. |
| 2014/0156584 A1 | 6/2014 | Motukuri et al. |
| 2014/0215487 A1 | 7/2014 | Cherkasova et al. |
| 2014/0250153 A1 | 9/2014 | Nixon et al. |
| 2014/0250337 A1 | 9/2014 | Yamaji et al. |
| 2014/0278738 A1 | 9/2014 | Feit et al. |
| 2014/0279201 A1 | 9/2014 | Iyoob et al. |
| 2014/0279641 A1 | 9/2014 | Singh et al. |
| 2014/0279948 A1 | 9/2014 | Mahate et al. |
| 2014/0282015 A1 | 9/2014 | Nixon et al. |
| 2014/0282257 A1 | 9/2014 | Nixon et al. |
| 2014/0297354 A1 | 10/2014 | Kogiso et al. |
| 2014/0306533 A1 | 10/2014 | Paquin et al. |
| 2014/0316794 A1 | 10/2014 | Goll et al. |
| 2014/0335480 A1 | 11/2014 | Asenjo et al. |
| 2014/0336785 A1 | 11/2014 | Asenjo et al. |
| 2014/0336786 A1 | 11/2014 | Asenjo et al. |
| 2014/0336791 A1 | 11/2014 | Asenjo et al. |
| 2014/0336795 A1* | 11/2014 | Asenjo ............... G05B 19/4083 700/86 |
| 2014/0337000 A1* | 11/2014 | Asenjo ............... G06Q 10/06 703/13 |
| 2014/0337086 A1 | 11/2014 | Asenjo et al. |
| 2014/0358606 A1 | 12/2014 | Hull |
| 2014/0372347 A1 | 12/2014 | Cohen et al. |
| 2015/0012763 A1 | 1/2015 | Cohen et al. |
| 2015/0019191 A1 | 1/2015 | Maturana et al. |
| 2015/0032242 A1 | 1/2015 | Schouwenburg et al. |
| 2015/0032886 A1 | 1/2015 | Wang |
| 2015/0048952 A1 | 2/2015 | Murphy |
| 2015/0235161 A1 | 8/2015 | Azar et al. |
| 2015/0278407 A1 | 10/2015 | Vennelakanti et al. |
| 2015/0304193 A1 | 10/2015 | Ishii et al. |
| 2015/0378356 A1 | 12/2015 | Hefeeda et al. |
| 2016/0154693 A1 | 6/2016 | Uhde et al. |
| 2016/0188769 A1* | 6/2016 | Aylott ............... G06Q 50/06 703/6 |
| 2016/0217378 A1 | 7/2016 | Bellala et al. |

(56) References Cited

U.S. PATENT DOCUMENTS

| | | |
|---|---|---|
| 2016/0217410 A1 | 7/2016 | Santos et al. |
| 2017/0019483 A1 | 1/2017 | Maturana et al. |
| 2017/0236391 A1 | 8/2017 | Palmeri |
| 2018/0157995 A1 | 6/2018 | O'Malley |
| 2018/0205803 A1 | 7/2018 | Asenjo et al. |

FOREIGN PATENT DOCUMENTS

| | | |
|---|---|---|
| CN | 1529837 A | 9/2004 |
| CN | 1605958 A | 4/2005 |
| CN | 1690685 A | 11/2005 |
| CN | 1833424 A | 9/2006 |
| CN | 101086760 A | 12/2007 |
| CN | 101091195 A | 12/2007 |
| CN | 100362442 C | 1/2008 |
| CN | 101114160 A | 1/2008 |
| CN | 101276209 | 10/2008 |
| CN | 101326471 A | 12/2008 |
| CN | 101536002 A | 9/2009 |
| CN | 101553763 A | 10/2009 |
| CN | 201444256 U | 4/2010 |
| CN | 101739007 A | 6/2010 |
| CN | 101776862 A | 7/2010 |
| CN | 102262401 | 11/2011 |
| CN | 102435870 A | 5/2012 |
| CN | 102449567 A | 5/2012 |
| CN | 102483837 A | 5/2012 |
| CN | 102640475 A | 8/2012 |
| CN | 102830666 A | 12/2012 |
| CN | 102927937 A | 2/2013 |
| CN | 103019102 A | 4/2013 |
| CN | 103403753 A | 11/2013 |
| CN | 104142629 A | 11/2014 |
| CN | 104142630 A | 11/2014 |
| CN | 104142662 A | 11/2014 |
| CN | 104142664 A | 11/2014 |
| CN | 104142679 A | 11/2014 |
| CN | 104144204 A | 11/2014 |
| DE | 19834456 A1 | 2/2000 |
| DE | 19880479 | 10/2009 |
| DE | 102014102844 A1 | 9/2014 |
| EP | 1209558 A2 | 5/2002 |
| EP | 1491977 A2 | 12/2004 |
| EP | 1531373 A2 | 5/2005 |
| EP | 1686442 A1 | 8/2006 |
| EP | 1 868 152 A1 | 12/2007 |
| EP | 1933214 A2 | 6/2008 |
| EP | 2189900 A1 | 5/2010 |
| EP | 2293164 A1 | 3/2011 |
| EP | 2453326 A1 | 5/2012 |
| EP | 2469466 A1 | 6/2012 |
| EP | 2 509 042 A1 | 10/2012 |
| EP | 2660667 A2 | 11/2013 |
| EP | 2704401 B1 | 3/2014 |
| EP | 2778816 B1 | 9/2014 |
| EP | 2790101 B1 | 10/2014 |
| EP | 2801935 B1 | 11/2014 |
| EP | 2801936 A1 | 11/2014 |
| EP | 2801938 A1 | 11/2014 |
| EP | 2801940 A1 | 11/2014 |
| EP | 2801941 A1 | 11/2014 |
| EP | 3037901 B1 | 6/2016 |
| EP | 3070550 A1 | 7/2018 |
| JP | 2001242931 A | 9/2001 |
| WO | 0111586 A1 | 2/2001 |
| WO | 0169329 A2 | 9/2001 |
| WO | 0217131 A2 | 2/2002 |
| WO | 02/057856 A2 | 7/2002 |
| WO | 03/007097 A1 | 1/2003 |
| WO | 03058506 A1 | 7/2003 |
| WO | 2008133715 A2 | 11/2008 |
| WO | 2009046095 A1 | 4/2009 |
| WO | 2011050482 A1 | 5/2011 |
| WO | 2013007866 A1 | 1/2013 |
| WO | 2014/090310 A1 | 6/2014 |
| WO | 2016001718 A1 | 1/2016 |

OTHER PUBLICATIONS

Non-Final Office Action received for U.S. Appl. No. 17/344,118 dated Aug. 31, 2022, 164 pages.

Second Office Action received for Chinese Patent Application Serial No. 201810240055.8 dated Dec. 16, 2021, 8 pages.

Second Office Action received for Chinese Patent Application Serial No. 201610151380.8 dated Jan. 18, 2019, 8 pages.

Third Office Action received for Chinese Patent Application Serial No. 201610149668.1 dated Apr. 26, 2019, 18 pages.

Communication Pursuant to Rules 94(3) EPC received for EP Patent Application Serial No. 16160602.5 dated Sep. 23, 2022, 08 pages.

Communication Pursuant to Article 94(3) EPC received for EP Patent Application Serial No. 16160610.8 dated Sep. 23, 2022, 10 pages.

First Office Action received for Chinese Patent Application Serial No. 201710244682.4 dated Dec. 10, 2018, 14 pages.

Non Final Office Action received for U.S. Appl. No. 17/223,385 dated Apr. 29, 2022, 295 pages.

Final Office Action received for U.S. Appl. No. 17/223,385 dated Jul. 21, 2022, 41pages.

Talha et al., Design for an irrigation and monitoring system of an automated dam, IMECS 2012 vol. II, Mar. 14-16, 2012, Hong Kong, 4 pgs.

Notice of Allowance received for U.S. Appl. No. 14/658,365 dated Jul. 29, 2022, 86 pages.

Final Office Action received for U.S. Appl. No. 14/087,970 dated Apr. 12, 2017, 59 pages.

Non-Final Office Action received for U.S. Appl. No. 14/658,394 dated Apr. 21, 2017, 97 pages.

Non-Final Office Action receveid for U.S. Appl. No. 15/388,260 dated Apr. 24, 2017, 101 pages.

Non-Final Office Action received for U.S. Appl. No. 14/658,345 dated Mar. 17, 2017, 95 pages.

Non-Final Office Action received for U.S. Appl. No. 14/658,327 dated May 1, 2017, 99 pages.

Notice of Allowance received for U.S. Appl. No. 14/087,835 dated Jan. 31, 2017, 25 pages. (do not cite per Ham).

Givehchi et al., "Control-as-a-Service from the Cloud: A Case Study for using Virtualized PLCs," 2014 10th IEEE Workshop on Factory Communication Systems (WFCS 2014), May 5, 2014 IEEE, 4 pages.

Non-Final Office Action received for U.S. Appl. No. 14/088,011 dated May 17, 2017, 10 Pages.

Rouse et al. "Definition Industrial Control System (ICS," whatis.techtarget.com, ed. Mar. 2016 (accessed from <<http://whatis.techtarget.com/definition/industrial-control-system-ICS>> on Jan. 11, 2017).

Examiner Answer to Appeal Brief for U.S. Appl. No. 14/087,977, dated Feb. 1, 2017, 12 pages.

Communication pursuant to Article 94(3) EPC received for European Application Serial No. 16160604.1-1802 dated May 17, 2017, 6 pages.

Final Office Action received for U.S. Appl. No. 14/658,365 dated Sep. 8, 2017, 59 pages.

Non-Final Office Action received for U.S. Appl. No. 14/087,821 dated Sep. 7, 2017, 63 pages.

Final Office Action received for U.S. Appl. No. 14/087,730 dated Aug. 18, 2017, 72 pages.

Non-Final Office Action received for U.S. Appl. No. 15/214,583 dated Aug. 28, 2017, 80 pages.

Final Office Action received for U.S. Appl. No. 14/658,345 dated Sep. 25, 2017, 52 pages.

Final Office Action received for U.S. Appl. No. 15/388,260 dated Oct. 18, 2017, 76 pages.

Non-Final Office Action received for U.S. Appl. No. 15/206,744 dated Nov. 6, 2017, 48 pages.

(56) References Cited

OTHER PUBLICATIONS

Final Office Action received for U.S. Appl. No. 14/658,327 dated Oct. 30, 2017, 48 pages.
Final Office Action for U.S. Appl. No. 14/658,394 dated Nov. 16, 2017, 49 pages.
Non-Final Office Action received for U.S. Appl. No. 15/490,076 dated Dec. 20, 2017, 37 pages.
Non-Final Office Action received for U.S. Appl. No. 15/278,139 dated Jan. 11, 2018, 103 pages.
Final Office Action received for U.S. Appl. No. 14/087,821 dated Dec. 14, 2017, 37 pages.
Final Office Action received for U.S. Appl. No. 14/088,011 dated Nov. 22, 2017, 77 pages.
Non-Final Office Action received for U.S. Appl. No. 14/087,970 dated Feb. 12, 2018, 69 pages.
Chinese Fifth Office Action received for Chinese Application Serial No. 201410196114.8, dated Dec. 13, 2017, 26 pages.
Non-Final Office Action received for U.S. Appl. No. 15/143,733 dated Mar. 8, 2018, 141 pages.
Final Office Action received for U.S. Appl. No. 15/490,076 dated Apr. 2, 2018, 23 pages.
Non-Final Office Action received for U.S. Appl. No. 14/658,327 dated Apr. 10, 2018, 43 pages.
Non-Final Office Action received for U.S. Appl. No. 14/658,345 dated Mar. 14, 2018, 56 pages.
Non-Final Office Action received for U.S. Appl. No. 14/658,365 dated Apr. 5, 2018, 64 pages.
Non-Final Office Action received for U.S. Appl. No. 14/658,394 dated Apr. 6, 2018, 40 pages.
Final Office Action received for U.S. Appl. No. 15/143,733, dated Jun. 18, 2018, 76 pages.
Non-Final Office Action received for U.S. Appl. No. 15/599,921, dated Jun. 29, 2018, 75 pages.
Final Office Action received for U.S. Appl. No. 14/087,970, dated Aug. 1, 2018, 68 pages.
Wikipedia; "PID Controller"; Jul. 20, 2018; https://en.wikipedia.org/wiki/PID_controller (Year: 2018).
Communication pursuant to Article 94(3) EPC for EP Application Serial No. 14167714.6 dated Aug. 3, 2018, 5 pages.
Communication pursuant to Article 94(3) EPC for EP Application Serial No. 14167708.8 dated Aug. 3, 2018, 5 pages.
Communication pursuant to Article 94(3) EPC for EP Application Serial No. 14167712.0 dated Aug. 3, 2018, 5 pages.
Search Report received for Chinese Application Serial No. 201610149668.1 dated Apr. 2, 2018, 1 page.
Search Report received for Chinese Application Serial No. 201610149635.7 dated Apr. 2, 2018, 1 page.
Chinese First Office Action received for Chinese Patent Application Serial No. 201610151380.8, dated Jul. 17, 2018, 65 pages.
Final Office Action received for U.S. Appl. No. 14/658,345 dated Sep. 13, 2018, 49 pages.
Final Office Action received for U.S. Appl. No. 14/658,365 dated Oct. 16, 2018, 42 pages.
Notice of Allowance received for U.S. Appl. No. 15/923,127 dated Nov. 21, 2018, 85 pages.
Non-Final Office Action received for U.S. Appl. No. 14/658,327 dated Nov. 1, 2018, 58 pages.
Final Office Action received for U.S. Appl. No. 14/658,394 dated Nov. 1, 2018, 51 pages.
Chinese Second Office Action received for Chinese Application Serial No. 201610149668.1, dated Oct. 24, 2018, 18 pages.
Chinese Second Office Action received for Chinese Application Serial No. 201610149635.7, dated Oct. 24, 2018, 24 pages.
Chinese First Office Action received for Chinese Application Serial No. 201610151417.7, dated Sep. 18, 2018, 28 pages.
Non-Final Office Action received for U.S. Appl. No. 17/344,118 dated May 25, 2023, 108 pages.
Communication pursuant to Article 94(3) EPC received for European Application No. 14167707.0-1955 dated Sep. 22, 2015, 9 pages.

Extended European search report received for European Application No. 14167714.6 dated Aug. 11, 2014, 5 pages.
Extended European search report received for European Application No. 14167706.2 dated Aug. 11, 2014, 7 pages.
Extended European search report received for European Application No. 14167626.2 dated Aug. 11, 2014, 9 pages.
Extended European search report received for European Application No. 14167627.0 dated Aug. 11, 2014, 6 pages.
Extended European search report received for European Application No. 14167703.9 dated Aug. 11, 2014, 7 pages.
Extended European search report received for European Application No. 14167707.0 dated Aug. 11, 2014, 7 pages.
Extended European search report received for European Application No. 14167708.8 dated Aug. 11, 2014, 5 pages.
Extended European search report received for European Application No. 14167712.0 dated Aug. 11, 2014, 5 pages.
Extended European search report received for European Application No. 14167511.6 dated Aug. 11, 2014, 6 pages.
Non-Final Office Action received for U.S. Appl. No. 10/162,315 dated Dec. 27, 2004, 10 pages.
Final Office Action received for U.S. Appl. No. 10/162,315 dated Jun. 15, 2005, 11 pages.
Non-Final Office Action received for U.S. Appl. No. 10/162,315 dated Sep. 9, 2005, 22 pages.
Vasudevan Venu., "A Web Services Primer", http://webservices.xml.com/pub/a/ws/2001/04/04/webservices/index.html, XML.com, Apr. 4, 2001, 10 pages.
Non-Final Office Action received for U.S. Appl. No. 10/162,315 dated Mar. 6, 2006, 10 pages.
W3C, "Web Services Description Language (WSDL) 1.1", http://www.w3.org/TR/wsd1, Mar. 15, 2001, 36 pages.
European Search Report dated Apr. 6, 2004 for European U.S. Appl. No. 03/026,339, 3 Pages.
Compuquest, Inc., SPM-IM-Instant Messaging Client for SpreadMsg Wireless Messaging Software, http://www.compuquestinc.com/spmim.html, Aug. 13, 2002, 4 pages.
Compuquest, Inc., SpreadMsg Lite—Data Capture, Scanning, Extraction & Rule Based Instant Messaging Software, http://web.archive.org/web/20020813080848/ http://www.compuquestinc.com/spmsgl.html, retrieved Jul. 21, 2006, 6 pages.
International Business Machines Corporation, Cross platform instant messaging using web services, Research Disclosure, Kenneth Mason Publications, Hampshire, GB, vol. 458, No. 156, Jun. 2002.
Non-Final Office Action received for U.S. Appl. No. 13/725,578 dated Jun. 18, 2014, 13 pages.
Non-Final Office Action received for U.S. Appl. No. 13/615,195 dated Aug. 19, 2014, 22 pages.
Non-Final Office Action received for U.S. Appl. No. 13/725,543, dated Oct. 9, 2014, 10 pages.
Final Office Action received for U.S. Appl. No. 13/725,578 dated Dec. 12, 2014, 24 pages.
Final Office Action received for U.S. Appl. No. 13/615,195, dated Jan. 20, 2015, 22 pages.
Third Party Submission under 37 CFR 1.290 received for U.S. Appl. No. 14/087,873 dated Nov. 21, 2014, 26 pages.
Final Office Action received for U.S. Appl. No. 13/725,543, dated May 20, 2015, 15 pages.
Non-final Office Action received for U.S. Appl. No. 13/608,821 dated Jun. 1, 2015, 44 pages.
Non-Final Office Action recevied for U.S. Appl. No. 13/608,850 dated Jun. 1, 2015, 38 pages.
Non-Final Office Action received for U.S. Appl. No. 13/677,060 dated Apr. 24, 2015, 54 pages.
Non-Final Office Action received for U.S. Appl. No. 13/725,619, dated Jul. 17, 2015, 45 pages.
Non-Final Office Action received for U.S. Appl. No. 13/725,660 dated Aug. 18, 2015, 131 pages.
Colombo, A.W., et al., "Factory of the Future: A Service-Oriented System of Modular, Dynamic Reconfigurable and Collaborative Systems," Artificial Intelligence Techniques for Networked Manufacturing Enterprises Management, Springer Series in Advanced Manufacuring 2010, pp. 459-481.

(56) References Cited

OTHER PUBLICATIONS

Colombo et al., "Towards the Factory of the Future: A Service-Oriented Cross-layer Infrastructure," ICT Shaping the World: A Scientific View, 2009, pp. 65-81.
Notice of Allowance received for U.S. Appl. No. 13/725,578, dated Apr. 24, 2015, 23 pages.
Final Office Action received for U.S. Appl. No. 13/677,060, dated Oct. 20, 2015, 48 pages.
Non-Final Office Action received for U.S. Appl. No. 13/615,195, dated Sep. 21, 2015, 19 pages.
Final Office Action received for U.S. Appl. No. 13/725,660, dated Oct. 26, 2015, 79 pages.
Non-Final Office Action received for U.S. Appl. No. 14/087,873 dated Nov. 25, 2015, 57 pages.
Final Office Action received for U.S. Appl. No. 13/725,619, dated Dec. 4, 2015, 21 pages.
Final Office Action recevied for U.S. Appl. No. 13/608,821, dated Dec. 7, 2015, 39 pages.
Final Office Action received for U.S. Appl. No. 13/615,195, dated Feb. 11, 2016, 19 pages.
Non-Final Office Action received for U.S. Appl. No. 13/725,543, dated Feb. 2, 2016, 15 pages.
Non-Final Office Action received for U.S. Appl. No. 13/725,660, dated Jan. 21, 2016, 72 pages.
Final Office Action received for U.S. Appl. No. 13/608,850, dated Dec. 9, 2015, 25 pages.
Communication pursuant to Article 94(3) EPC received for European Application No. 14167706.2-1955 dated Nov. 24, 2015, 8 pages.
Communication pursuant to Article 94(3) EPC received for European Application No. 14167626.2-1955 dated Nov. 24, 2015, 8 pages.
Notice of Allowance received for U.S. Appl. No. 13/725,619, dated Mar. 31, 2016, 26 pages.
Non-Final Office Action recieved for U.S. Appl. No. 13/677,060 dated Mar. 10, 2016, 66 pages.
Notice of Allowance received for U.S. Appl. No. 13/725,660 dated Feb. 3, 2016, 47 pages.
Notice of Allowance received for U.S. Appl. No. 17/223,385 dated Jan. 30, 2023, 37 pages.
Final Office Action received for U.S. Appl. No. 17/344,118 dated Feb. 28, 2023, 83 pages.
Summons to attend oral proceedings pursuant to Rule 115(1) EPC received for European Patent Application Serial No. 13166670.3 dated Mar. 17, 2023, 39 pages.
Non-Final Office Action for U.S. Appl. No. 14/087,730 dated Mar. 11, 2016, 81 pages.
Non-Final Office Action received for U.S. Appl. No. 14/087,821 dated Mar. 2, 2016, 86 pages.
Non-Final Office Action received for U.S. Appl. No. 14/087,977 dated Mar. 17, 2016, 83 pages.
"Recursion Software, ""SCADA-Aware Mobile""", Frisco, TX, Aug. 29, 2012 (accessed from <<http://www.emsenergyautomation.com/brochures/scada.pdf on Feb. 11, 2016)".
"Ars Technica, ""Windows 7 themes: how to unlock them or create your own""", Nov. 12, 2009 (accessed fromhttp://arstechnica.com/information-technology/2009/11/unlock-hidden-windows-7-themesl on Mar. 8, 2016)".
Non-Final Office Action received for U.S. Appl. No. 14/088,014 dated Mar. 22, 2016, 98 pages.
"Microsoft," "Sharing Outlook 2010 Contact\Notes/Field?", microsoft.com, Jun. 23, 2011 (accessed on Mar. 11, 2016 from http://answers.microsoft.com/en-us/office/forum/office_2010-outlook/sharing-outlook-2010-contactnotes-field/c7e74273-ff60-4da3-a3aa-ccb6cadcd25e?auth=1).
Notice of Allowance received for U.S. Appl. No. 13/608,850 dated Apr. 12, 2016, 37 pages.
Notice of Allowance received for U.S. Appl. No. 14/087,873 dated Apr. 18, 2016, 26 pages.
Chinese First Office Action received for Chinese Application No. 201410196198.5, dated Mar. 29, 2016, 18 pages.
Non-Final Office Action received for U.S. Appl. No. 14/088,011 dated May 12, 2016, 96 pages.
Chinese First Office Action received for Chinese Application No. 201410198289.2, dated Apr. 5, 2016, 18 pages.
Chinese First Office Action received for Chinese Application No. 201410196905.0, dated Apr. 5, 2016, 20 pages.
Chinese First Office Action received for Chinese Application No. 201410196127.5, dated Apr. 7, 2016, 13 pages.
Chinese Office Action for Chinese Application No. 201410196114.8 dated Apr. 25, 2016, 20 pages.
Chinese First Office Action received for Chinese Application No. 201410196775.0, dated May 5, 2016, 14 pages.
Chinese First Office Action received for Chinese Application No. 201410196525.7, dated May 5, 2016, 13 pages.
Non-Final Office Action received for U.S. Appl. No. 13/615,195, dated Jun. 21, 2016, 29 pages.
Final Office Action received for U.S. Appl. No. 13/725,543, dated Jun. 17, 2016, 19 pages.
Non-final Office Action received for U.S. Appl. No. 14/087,970 dated Jun. 17, 2016, 36 pages.
Chinese First Office Action received for Chinese Application Serial No. 201410195780.X, dated May 26, 2016, 16 pages (Including English Translation).
Final Office Action received for U.S. Appl. No. 14/087,977 dated Jul. 13, 2016, 59 pages.
Final Office Action received for U.S. Appl. No. 14/088,014 dated Jul. 15, 2016, 65 pages.
Non-Final Office Action received for U.S. Appl. No. 14/087,922 dated Jul. 19, 2016, 120 pages.
Extended European Search Report received for European Application No. 16160604.1 dated Aug. 17, 2016, 9 pages.
Extended European Search Report received for European Application No. 16160611.6 dated Aug. 24, 2016, 10 pages.
Final Office Action received for U.S. Appl. No. 14/087,730 dated Aug. 24, 2016, 113 pages.
Extended European Search Report received for European Application No. 16160602.5 dated Sep. 2, 2016, 9 pages.
Non-Final Office Action received for U.S. Appl. No. 14/087,835 dated Sep. 23, 2016, 82 pages.
Final Office Action recieved for U.S. Appl. No. 14/087,821 dated Sep. 9, 2016, 97 pages.
Extended European Search Report received for European Application No. 13166670.3 dated Jun. 14, 2016, 10 pages.
"Cloud Computing," Whatis.com, Oct. 27, 2009, http://searchcloudcomputing.techtarget.com/sDefinition/0,,sid201_gci1287881,00.html, 2 pages.
Mell, P., et al., "The NIST Definition of Cloud Computing," Oct. 7, 2009, http://csrc.nist.gov/groups/SNS/cloud/computing/index.html, 2 pages.
European Office Action for EP Patent Application Serial No. 16160611.6, dated Sep. 26, 2016, 2 pages.
European Office Action for EP Patent Application Serial No. 13166670.3, dated Jul. 18, 2016, 2 pages.
European Office Action for EP Patent Application Serial No. 16160604.1, dated Sep. 26, 2016, 2 pages.
Final Office Action received for U.S. Appl. No. 13/615,195 dated Oct. 21, 2016, 44 pages.
Final Office Action received for U.S. Appl. No. 14/088,011 dated Nov. 1, 2016, 79 pages.
Communication pursuant to Rule 69 EPC received for European Application Serial No. 16160610.8 dated Oct. 17, 2016, 2 pages.
Communication pursuant to Rule 69 EPC received for European Application Serial No. 16160602.5 dated Oct. 10, 2016, 2 pages.
Non-Final Office Action received for U.S. Appl. No. 14/088,014, dated Nov. 17, 2016, 61 pages.
Chinese second Office Action received for Chinese Application Serial No. 201410196114.8, dated Nov. 9, 2016, 19 pages.
Chinese Second Office Action received for Chinese Application Serial No. 201410196905.0, dated Nov. 18, 2016, 6 pages.
Final Office Action received for U.S. Appl. No. 14/087,922, dated Nov. 25, 2016, 65 pages.

(56) References Cited

OTHER PUBLICATIONS

Non-Final Office Action for U.S. Appl. No. 14/087,730, dated Feb. 9, 2017, 78 pages.
Chinese Second Office Action received for Chinese Application Serial No. 201410198289.2, dated Dec. 15, 2016, 21 pages.
Chinese Second Office Action received for Chinese Application Serial No. 201410196127.5 dated Nov. 30, 2016, 13 pages.
Chinese Second Office Action received for Chinese Application Serial No. 201410195780.X, dated Feb. 3, 2017, 18 pages.
Non-Final Office Action received for U.S. Appl. No. 14/658,365 dated Mar. 23, 2017, 100 pages.
Chinese First Office Action received for Chinese Application Serial No. 201410196150.4, dated Mar. 2, 2017, 37 pages (with English Translation).
Non-Final Office Action received for U.S. Appl. No. 10/234,504 dated Oct. 18, 2006, 15 pages.
Final Office Action received for U.S. Appl. No. 10/234,504 dated Feb. 7, 2007, 12 pages.
Final Office Action received for U.S. Appl. No. 10/234,504 dated May 1, 2007, 12 pages.
Non-Final Office Action received for U.S. Appl. No. 10/162,314 dated Dec. 15, 2005, 17 pages.
Final Office Action received for U.S. Appl. No. 10/162,314 dated Jun. 5, 2006, 23 pages.
Non-Final Office Action received for U.S. Appl. No. 10/162,314 dated Nov. 16, 2006, 20 pages.
Final Office Action received for U.S. Appl. No. 10/162,314 dated Apr. 30, 2007, 35 pages.
Non-Final Office Action received for U.S. Appl. No. 10/162,314 dated Oct. 25, 2007, 28 pages.
Final Office Action received for U.S. Appl. No. 10/162,314 dated May 5, 2008, 31 pages.
Non-Final Office Action received for U.S. Appl. No. 10/161,848 dated Nov. 15, 2005, 15 pages.
Final Office Action received for U.S. Appl. No. 10/161,848 dated Mar. 27, 2006, 13 pages.
Non-Final Office Action received for U.S. Appl. No. 10/161,848 dated Sep. 5, 2006, 15 pages.
Final Office Action received for U.S. Appl. No. 10/161,848 dated Feb. 23, 2007, 17 pages.
Non-Final Office Action received for U.S. Appl. No. 10/161,848 dated May 7, 2007, 14 pages.
Final Office Action received for U.S. Appl. No. 10/161,848 dated Oct. 17, 2007, 15 pages.
Non-Final Office Action received for U.S. Appl. No. 10/161,848 dated Feb. 7, 2008, 14 pages.
Final Office Action received for U.S. Appl. No. 10/161,848 dated Sep. 9, 2008, 17 pages.
Non-Final Office Action received for U.S. Appl. No. 12/410,632 dated Feb. 1, 2011, 56 pages.
Final Office Action received for U.S. Appl. No. 12/410,632 dated May 17, 2011, 17 pages.
Non-Final Office Action received for U.S. Appl. No. 12/410,632 dated Sep. 2, 2011, 11 pages.
Non-Final Office Action received for U.S. Appl. No. 10/298,366 dated Apr. 20, 2006, 13 pages.
Final Office Action received for U.S. Appl. No. 10/298,366 dated Sep. 29, 2006, 16 pages.
Non-Final Office Action received for U.S. Appl. No. 10/298,366 dated Jan. 31, 2007, 12 pages.
Final Office Action received for U.S. Appl. No. 10/298,366 dated Jul. 18, 2007, 14 pages.
Non-Final Office Action received for U.S. Appl. No. 10/298,366 dated Dec. 17, 2007, 10 pages.
Non-Final Office Action received for U.S. Appl. No. 10/298,366 dated Jun. 11, 2008, 24 pages.
Final Office Action received for U.S. Appl. No. 10/298,366 dated Nov. 18, 2008, 20 pages.
Notice of Allowance received for U.S. Appl. No. 10/298,366 dated Feb. 2, 2009, 23 pages.
Non-Final Office Action received for U.S. Appl. No. 13/615,195 dated Aug. 19, 2014, 24 pages.
Communication pursuant to Article 96(2) EPC for EP Application Serial No. 03026339.6 dated Apr. 6, 2006, 6 pages.
Communication pursuant to Article 96(2) EPC for EP Application Serial No. 13166670.3 dated Dec. 14, 2018, 4 pages.
Chinese Third Office Action for Chinese Application No. 201410196114.8 dated Apr. 12, 2017, 25 pages.
Chinese Fourth Office Action for Chinese Application No. 201410196114.8 dated Aug. 15, 2017, 24 pages.
Chinese Second Office Action for Chinese Application No. 201410196198.5 dated Dec. 21, 2016, 10 pages.
Chinese Third Office Action for Chinese Application No. 201410196198.5 dated Mar. 28, 2017, 10 pages.
Chinese Second Office Action for Chinese Application No. 201410196525.7 dated Dec. 21, 2016, 8 pages.
Chinese Second Office Action for Chinese Application No. 201410196775.0 dated Dec. 7, 2016, 8 pages.
Chinese Third Office Action for CN Application Serial No. 201410196150.4, dated Nov. 29, 2017, 10 pages (with English Translation).
Communication pursuant to Article 94(3) EPC for EP Application Serial No. 14167511.6 dated Jan. 23, 2019, 7 pages.
Communication pursuant to Article 94(3) EPC for EP Application Serial No. 14167703.9 dated Jan. 23, 2019, 6 pages.
Anonymous: "Hash function—Wikipedia", Wikipedia, Apr. 19, 2009, URL:https://en.wikipedia.org/w/index.php?title=Hash_function &oldid=284890279.
Communication pursuant to Article 94(3) EPC for EP Application Serial No. 16160611.6 dated Apr. 5, 2017, 5 pages.
Communication pursuant to Article 94(3) EPC for EP Application Serial No. 16160611.6 dated May 10, 2017, 5 pages.
Second Office Action received for Chinese Patent Application Serial No. 201610151417.7 dated Jan. 22, 2019, 7 pages.
Communication pursuant to Article 94(3) EPC for EP Application Serial No. 16160604.1 dated Jun. 13, 2017, 6 pages.
Summons to attend oral proceedings pursuant to Rule 115(1) EPC received for EP Patent Application Serial No. 14167706.2 dated Dec. 13, 2018, 65 pages.
Second Office Action received for Chinese Patent Application Serial No. 201410196150.4 dated Aug. 3, 2017, 10 pages.
Extended European Search Report received for European Application No. 16160610.8 dated Sep. 8, 2016, 9 pages.
Chinese First Office Action for Chinese Application No. 20170339669.7 dated Dec. 11, 2018, 25 pages (Including English Translation).
Non-Final Office Action received for U.S. Appl. No. 15/621,206 dated Mar. 22, 2019, 118 pages.
Non-Final Office Action received for U.S. Appl. No. 14/658,345 dated May 13, 2019, 78 pages.
Non-Final Office Action received for U.S. Appl. No. 14/658,365 dated Jun. 3, 2019, 70 pages.
Third Office Action received for Chinese Patent Application Serial No. 201610149635.7 dated Apr. 26, 2019, 23 pages (including English Translation).
Notice of opposition received for European Patent Application Serial No. 16160611.6 dated Apr. 11, 2019, 789 pages.
Wen et al., "Current Trends and Perspectives in Wireless Virtualization", 2013 International Conference on Selected Topics in Mobile and Wireless Networking (MoWNeT), 2013, 6 pages.
Wang et al., "The Research of Chemical Plant Monitoring Base on the Internet of Things and 3D Visualization Technology", Proceeding ofthe IEEE International Conference on Information and Automation, Aug. 2013, 5 pages.
Non-Final Office Action received for U.S. Appl. No. 15/714,333 dated Jul. 17, 2019, 113 pages.
Notice of Allowance received for U.S. Appl. No. 15/621,206 dated Aug. 19, 2019, 52 pages.
Non-Final Office Action received for U.S. Appl. No. 14/658,394 dated Aug. 19, 2019, 70 pages.
First Office Action received for Chinese Patent Application Serial No. 201710778822.6 dated Jun. 24, 2019, 29 pages (Including English Translation).

(56) References Cited

OTHER PUBLICATIONS

Second Office Action received for Chinese Patent Application Serial No. 201710339669.7 dated Jul. 2, 2019, 20 pages (Including English Translation).
Final Office Action received for U.S. Appl. No. 15/714,333 dated Oct. 25, 2019, 36 pages.
Non-Final Office Action received for U.S. Appl. No. 15/970,932 dated Nov. 14, 2019, 122 pages.
Second Office Action received for Chinese Patent Application Serial No. 201710778822.6 dated Sep. 20, 2019, 5 pages.
Final Office Action received for U.S. Appl. No. 14/658,345 dated Nov. 26, 2019, 48 pages.
Final Office Action received for U.S. Appl. No. 14/658,365 dated Nov. 29, 2019, 48 pages.
Supplementary Search Report received for Chinese Patent Application Serial No. 201710339669.7 dated Sep. 18, 2019, 2 pages.
Non-Final Office Action received for U.S. Appl. No. 14/658,394 dated Feb. 20, 2020, 67 pages.
Third Office Action received for Chinese Patent Application Serial No. 201710778822.6 dated Mar. 3, 2020, 43 pages (Including English Translation).
Communication pursuant to Article 94(3) EPC received for EP Patent Application Serial No. 14167627.0 dated Jan. 23, 2020, 6 pages.
Summons to attend oral proceedings pursuant to Rule 115(1) EPC received for EP Patent Application Serial No. 14167703.9 dated Feb. 6, 2020, 8 pages.
Notification of Grant of Patent for Invention received for Chinese Patent Application Serial No. 201710339669.7 dated Dec. 31, 2019, 7 pages (Including English Translation).
Summons to attend oral proceedings pursuant to Rule 115(1) EPC received for EP Patent Application Serial No. 16160611.6 dated Dec. 19, 2019, 26 pages.
Non-Final Office Action received for U.S. Appl. No. 16/129,116 dated Apr. 1, 2020, 142 pages.
Non-Final Office Action received for U.S. Appl. No. 15/714,333 dated Apr. 15, 2020, 44 pages.
Final Office Action received for U.S. Appl. No. 15/970,932 dated Apr. 13, 2020, 37 pages.
Non-Final Office Action received for U.S. Appl. No. 14/658,345 dated May 14, 2020, 83 pages.
Communication pursuant to Article 94(3) EPC received for EP Patent Application Serial No. 16160602.5 dated May 19, 2020, 07 pages.
Communication pursuant to Article 94(3) EPC received for EP Patent Application Serial No. 16160610.8 dated May 27, 2020, 08 pages.
Final Office Action received for U.S. Appl. No. 16/129,116 dated Jul. 2, 2020, 58 pages.
Final Office Action received for U.S. Appl. No. 15/714,333 dated Jul. 22, 2020, 40 pages.
Non-Final Office Action received for U.S. Appl. No. 14/658,365 dated Jul. 13, 2020, 72 pages.
Non-Final Office Action received for U.S. Appl. No. 14/658,394 dated Aug. 5, 2020, 59 pages.
Notice of Allowance received for U.S. Appl. No. 15/714,333 dated Dec. 17, 2020, 59 pages.
Final Office Action received for U.S. Appl. No. 14/658,345 dated Nov. 4, 2020, 62 pages.
Summons to attend oral proceedings pursuant to Rule 115(1) EPC received for EP Patent Application Serial No. 16160611.6 dated Oct. 30, 2020, 05 pages.
Notification of Reexamination received for Chinese Application No. 201610149635.7, dated Nov. 5, 2020, 17 pages.
Notification of Reexamination received for Chinese Application No. 201610149668.1, dated Oct. 20, 2020, 3 pages.
Final Office Action received for U.S. Appl. No. 14/658,365 dated Jan. 21, 2021, 96 pages.
Non-Final Office Action received for U.S. Appl. No. 16/129,116 dated Nov. 16, 2020, 51 pages.
Notice of Allowance received for U.S. Appl. No. 14/658,394 dated Feb. 9, 2021, 92 pages.
Advisory Office Action received for U.S. Appl. No. 14/658,365 dated Mar. 25, 2021, 09 pages.
Summons to attend oral proceedings pursuant to Rule 115(1) EPC received for European Patent Application Serial No. 14167708.8 dated Mar. 18, 2021, 09 pages.
Non-Final Office Action received for U.S. Appl. No. 16/234,039 dated May 13, 2021, 149 pages.
Non-Final Office Action received for U.S. Appl. No. 16/900,022 dated May 27, 2021, 146 pages.
Communication Pursuant to Rules 94(3) EPC received for EP Patent Application Serial No. 16160602.5 dated May 11, 2021, 07 pages.
Non-Final Office Action received for U.S. Appl. No. 14/658,345 dated Jun. 24, 2021, 73 pages.
Non-Final Office Action received for U.S. Appl. No. 14/658,365 dated Jul. 30, 2021, 108 pages.
Communication pursuant to Article 94(3) EPC received for European application No. 16160610.8 dated May 27, 2021, 9 pages.
First Office Action received for Chinese application No. 201810240055.8 dated Jun. 25, 2021, 22 pages (Including English Translation).
Search report received for Chinese application No. 201810240055.8 dated Jun. 17, 2021, 2 pages.
Notice of Allowance received for U.S. Appl. No. 16/234,039 dated Oct. 25, 2021, 24 pages.
Non-Final Office Action received for U.S. Appl. No. 16/599,276 dated Dec. 3, 2021, 172 pages.
Communication pursuant to Article 94(3) EPC received for European Application Serial No. 11152520.0-1205 dated Nov. 8, 2021, 8 pages.
European Office Action for EP Patent Application Serial No. 14167708.8, dated Oct. 20, 2021, 10 pages.
Final Office Action received for U.S. Appl. No. 16/900,022 dated Dec. 30, 2021, 66 pages.
Non-Final Office Action received for U.S. Appl. No. 17/812,894 dated Sep. 21, 2023, 189 pages.
Final Office Action received for U.S. Appl. No. 17/344,118 dated Sep. 6, 2023, 12 pages.
Communication pursuant to Article 94(3) EPC received for EP Patent Application Serial No. 16160602.5 dated Jul. 20, 2023, 13 pages.

* cited by examiner

CLOUD-BASED ANALYTICS FOR INDUSTRIAL AUTOMATION

CROSS-REFERENCE TO RELATED APPLICATION

This application is a continuation of, and claims priority to, U.S. patent application Ser. No. 14/658,345, filed Mar. 16, 2015, and entitled "CLOUD-BASED ANALYTICS FOR INDUSTRIAL AUTOMATION," the entirety of which is hereby incorporated herein by reference.

TECHNICAL FIELD

The subject application relates generally to industrial automation, and, more particularly, to cloud-based analytics for industrial automation.

BACKGROUND

Industrial controllers and their associated input/output (I/O) devices can be useful to the operation of modern industrial automation systems. These industrial controllers can interact with field devices on the plant floor to control automated processes relating to such objectives as product manufacture, material handling, batch processing, supervisory control, and other such applications. Industrial controllers can store and execute user-defined control programs to effect decision-making in connection with the controlled process. Such programs can include, but are not limited to, ladder logic, sequential function charts, function block diagrams, structured text, or other such programming structures. In general, industrial controllers can read input data from sensors and metering devices that can provide discreet and telemetric data regarding one or more states of the controlled system, and can generate control outputs based on these inputs in accordance with the user-defined program.

In addition to industrial controllers and their associated I/O devices, some industrial automation systems also can include low-level control systems, such as vision systems, barcode marking systems, variable frequency drives, industrial robots, and the like, which can perform local control of portions of the industrial process, or which can have their own localized control systems.

During operation of a given industrial automation system, comprising a collection of industrial devices, industrial processes, other industrial assets, and network-related assets, users (e.g., operators, technicians, maintenance personnel, etc.) typically can monitor or manage operations of the industrial automation system, perform maintenance, repairs, or upgrades on the industrial automation system, or perform other tasks in connection with operation of the industrial automation system. The above-described description of today's industrial control and business systems is merely intended to provide a contextual overview of relating to conventional industrial automation systems, and is not intended to be exhaustive.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

Presented herein are various systems, methods, and techniques of the disclosed subject matter that relate to the use of data analysis (e.g., big data analysis) in a cloud platform to facilitate performing analytics on an industrial automation system(s) to improve performance of the industrial automation system(s). An analytics component (e.g., a cloud-based analytics engine) can be interfaced with an industrial automation system(s) via a cloud gateway(s). A collection component (e.g., cloud-based collection component) can collect industrial-related data obtained from the industrial automation system(s) and/or other data sources (e.g., extrinsic data sources). The industrial-related data can be stored in a data store (e.g., cloud-based data store) of or associated with the analytics component.

The analytics component can analyze the data relating to an industrial automation system(s) that can be obtained from the industrial automation system(s) or other sources (e.g., extrinsic data sources) to facilitate enhancing operation of the industrial automation system(s). Based at least in part on the results of the data analysis, the analytics component can determine one or more correlations between respective portions or aspects of (e.g., respective items of interest associated with) the industrial automation system(s), between a portion(s) or aspect(s) of the industrial automation system(s) and extrinsic events or conditions, or between an employee(s) and a portion(s) or aspect(s) of the industrial automation system(s). The analytics component can determine recommendations or instructions in connection with the industrial automation system(s) to enhance system performance based at least in part on the determined correlation(s). The analytics component can provide (e.g., transmit) the recommendations or instructions to a user (e.g., employee) associated with the industrial automation system(s) or to the industrial automation system(s) to facilitate enhancing operational performance of the industrial automation system(s).

The analytics component also can determine when there is a deviation or a potential for deviation from desired (e.g., optimal, suitable, acceptable) performance (e.g., from a performance baseline) by an industrial asset or an employee in connection with operation of the industrial automation system(s), based at least in part on the results of the analysis of the industrial-related data. The analytics component can generate a notification, a recommendation, or an instruction to facilitate rectifying or avoiding the deviation. The analytics component can communicate the notification, recommendation, or instruction to a user associated with the industrial automation system(s) or to the industrial automation system(s) (e.g., to the industrial asset), wherein the user or industrial automation system(s) can consider or take action (e.g., corrective or preventive action) in response to the notification, recommendation, or instruction to facilitate rectifying or avoiding the deviation.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
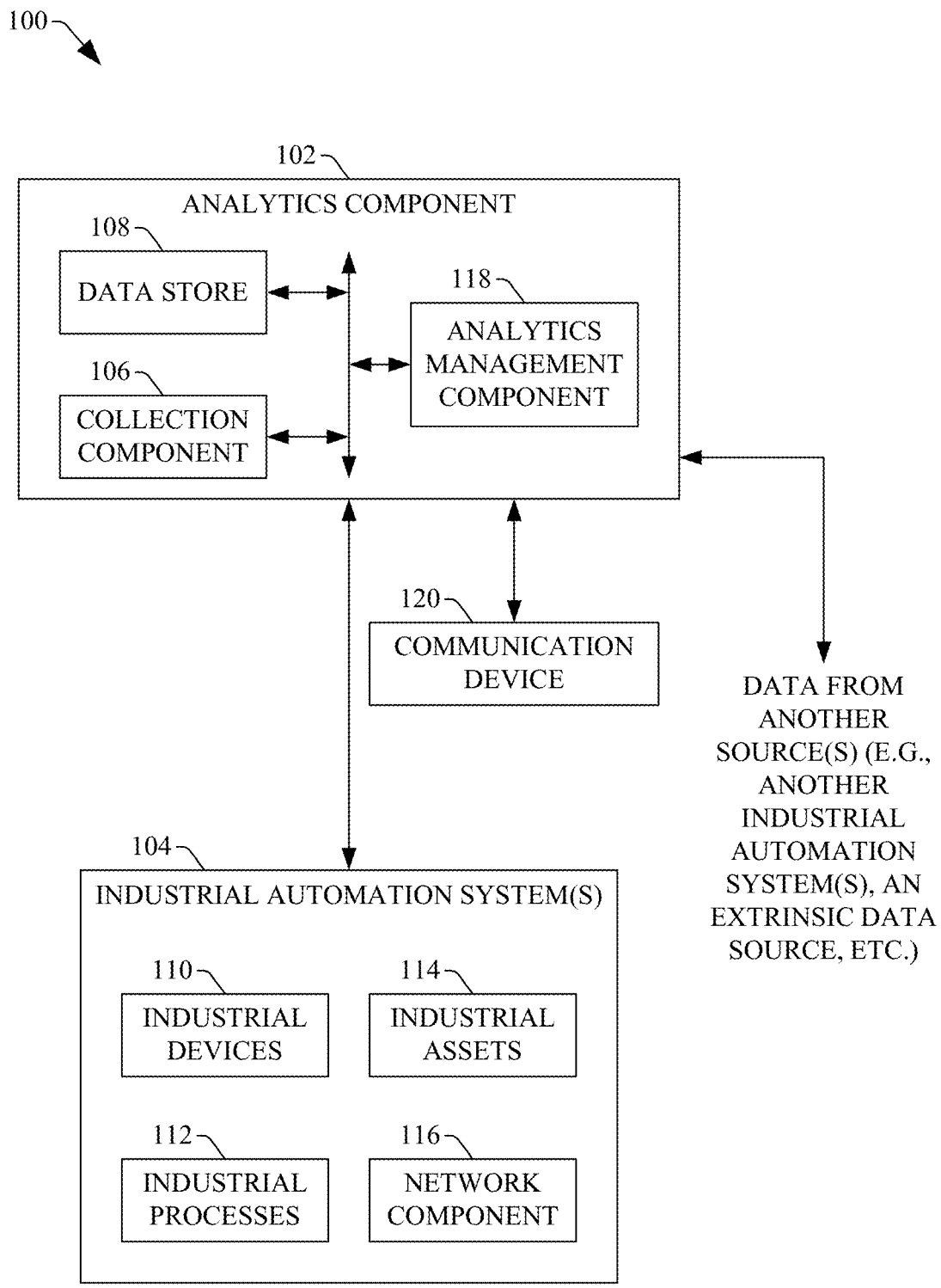
FIG. 1 illustrates a block diagram of an example system that can perform analytics on data associated with an industrial automation system associated with an industrial enterprise to facilitate determining correlations between respective aspects of the industrial automation system to facilitate improving operations associated with the industrial automation system, in accordance with various implementations and embodiments of the disclosed subject matter.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

Industrial automation systems can perform various processes to produce desired products or processed materials. An industrial automation system can comprise various industrial devices, industrial processes, other industrial assets, and network-related assets (e.g., communication network devices and software). During operation of a given industrial automation system, users, such as, for example, operators, technicians, maintenance personnel, typically can monitor or manage operations of the industrial automation system, perform maintenance, repairs, or upgrades on the industrial automation system, or perform other tasks in connection with operation of the industrial automation system.

To that end, presented are various systems, methods, and techniques of the disclosed subject matter that relate to the use of data analysis (e.g., big data analysis) in a cloud platform to facilitate performing analytics on an industrial automation system(s) to improve performance of the industrial automation system(s). An analytics component (e.g., a cloud-based analytics component) can be interfaced with an industrial automation system(s) via a cloud gateway(s). A collection component (e.g., cloud-based collection component) can collect industrial-related data obtained from the industrial automation system(s) and/or other data sources (e.g., extrinsic data sources). The industrial-related data can be stored in a data store (e.g., cloud-based data store) of or associated with the analytics component.

The analytics component can analyze the industrial-related data obtained from the industrial automation system(s) to facilitate enhancing operation of the industrial automation system(s). Based at least in part on the results of the data analysis, the analytics component can determine one or more correlations between respective portions or aspects of the industrial automation system(s), between a portion(s) or aspect(s) of the industrial automation system(s) and extrinsic events or conditions, or between an employee(s) and a portion(s) or aspect(s) of the industrial automation system(s). The analytics component can determine recommendations or instructions in connection with the industrial automation system(s) to enhance system performance based at least in part on the determined correlation(s). The analytics component can provide (e.g., transmit) the recommendations or instructions to a user (e.g., employee) associated with the industrial automation system(s) or to the industrial automation system(s) to facilitate enhancing operational performance of the industrial automation system(s).

The analytics component also can determine when there is a deviation or a potential for deviation from desired (e.g., optimal, suitable, acceptable) performance (e.g., from a performance baseline) by an industrial asset or an employee in connection with operation of the industrial automation system(s), based at least in part on the results of the analysis of the industrial-related data. The analytics component can generate a notification, a recommendation, or an instruction to facilitate rectifying or avoiding the deviation. The analytics component can communicate the notification, recommendation, or instruction to a user associated with the industrial automation system(s) or to the industrial automation system(s) (e.g., to the industrial asset), wherein the user or industrial automation system(s) can consider or take action (e.g., corrective or preventive action) in response to the notification, recommendation, or instruction to facilitate rectifying or avoiding the deviation.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removably affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or application programming interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 illustrates a block diagram of an example system 100 that can perform analytics on data (e.g., cloud-based data) associated with an industrial automation system associated with an industrial enterprise to facilitate determining correlations between respective aspects of the industrial automation system to facilitate improving operations associated with the industrial automation system, in accordance with various implementations and embodiments of the disclosed subject matter. The system 100 can comprise an analytics component 102 that can collect a vast array of data (e.g., industrial device related data, industrial process related data, other industrial asset related data, network related data, other data) from industrial automation systems 104, process (and store) such data, perform analytics on such data (e.g., in the cloud), and determine or identify correlations between respective aspects (e.g., between industrial assets, between parameters, or between a portion of an industrial automation system 104 and an extrinsic event(s) or condition(s)) associated with the industrial automation system(s) 104 to facilitate improving operations associated with the industrial automation system(s) 104. The analytics component 102 can leverage such correlations to generate recommendations or instructions regarding how to improve (e.g., enhance, optimize) operations of the industrial automation system(s) 104 given current or anticipated conditions relating to the industrial automation system(s) 104.

In some implementations, the analytics component 102 can reside in a cloud platform, and can provide cloud-based services (e.g., analytics services, remote monitoring services, modeling services, data and/or correlation visualization services, virtualization services) in connection with an industrial automation system(s) 104. The analytics component 102 can use data analysis (e.g., big data analysis) in the cloud platform to facilitate performing analytics in connection with an industrial automation system(s) 104 to improve performance of the industrial automation system(s) 104. In other implementations, the analytics component 102 can reside locally with an industrial automation system 104, wherein the analytics component can perform services to facilitate improving performance of the industrial automation system 104.

An analytics component 102 (e.g., a cloud-based analytics engine) can be interfaced with the industrial automation system(s) 104 via a cloud gateway(s) (not shown in FIG. 1). For instance, an industrial device 110 (e.g., an industrial controller) can comprise or be associated with a cloud gateway component that can be employed to interface the analytics component 102 with the industrial device 110. The analytics component 102 can monitor (e.g., remotely monitor) operations of the industrial automation system(s) 104. The analytics component can comprise or be associated with a collection component 106 (e.g., cloud-based collection component) that can collect or obtain data (e.g., industrial-automation-system-related data) from the industrial automation system(s) 104 and/or other data sources (e.g., extrinsic data sources). The collection component 106 can store the collected data in a data store 108 (e.g., cloud-based data store) of or associated with the analytics component 102 for future data analysis, and/or the analytics component 102 can analyze the data as it is received by the analytics component 102.

The industrial automation system 104 can comprise one or more industrial devices 110, industrial processes 112, or other industrial assets 114 that can be distributed throughout an industrial facility(ies) in accordance with a desired industrial-automation-system configuration. The industrial automation system 104 can perform industrial processes or other actions to facilitate producing desired products, processed materials, etc., as an output.

The industrial automation system 104 also can include a network component 116 that can be associated with (e.g., integrated with, interfaced with, and/or communicatively connected to) the various industrial devices 110, industrial processes 112, and/or other industrial assets 114 of the industrial automation system 104 to facilitate communication of information (e.g., command or control information, status information, production information, etc.) between the various industrial devices 110, industrial processes 112, and/or other industrial assets 114 via the network component 116. The network component 116, and/or all or a portion of the industrial device 110 or other industrial assets 114, can be associated with (e.g., interfaced with, communicatively connected to (e.g., via a cloud gateway component(s)) the collection component 106 to facilitate the communication of data between the industrial automation system 104 and the collection component 106. The network component 116 can comprise network-related devices (e.g., communication devices, routers (e.g., wireline or wireless routers), switches, etc.), wherein respective network-related devices can be connected to or interfaced with certain other network-related devices to form a communication network having a desired communication network configuration. In some implementations, one or more network-related devices of the network component 116 can be connected to or interfaced with one or more industrial devices 110, industrial processes 112, and/or other industrial assets 114 to facilitate collecting data (e.g., industrial-automation-system-related data) from the one or more industrial devices 110, industrial processes 112, and/or other industrial assets 114 or communicating information (e.g., control signals, parameter data, configuration data, etc.) to the one or more industrial devices 110, industrial processes 112, and/or other industrial assets 114.

The analytics component 102 can monitor or track the operation of the industrial automation system 104, including monitoring and tracking the respective operations of respective industrial devices 110, industrial processes 112, industrial assets 114, and/or network-related devices of the network component 116, and monitoring and tracking the configuration of the industrial automation system 104. The collection component 106 can receive, obtain, detect, or collect data relating to the operation and configuration of the industrial automation system 104, as desired (e.g., automatically, dynamically, or continuously, in real or near real time), in accordance with the defined analytics criteria. For example, the collection component 106 can receive data relating to the industrial devices 110 (e.g., operation, status, or configurations of the industrial devices, properties or characteristics of the industrial devices, maintenance records of the industrial devices, employees associated with respective industrial devices), industrial processes 112 (e.g., operation, status, or configurations of the industrial processes, properties or characteristics of the industrial processes, maintenance records associated with the industrial processes, employees associated with respective industrial processes), and the other industrial assets 114 (e.g., operation, status, or configurations of the industrial assets, properties or characteristics of the industrial assets, maintenance records associated with the industrial assets, employees associated with respective industrial assets). The collection component 106 also can receive or collect data relating to operation of the sub-components (e.g., network-related devices) of the network component 116 (e.g., operation or status of the network devices or assets, communication conditions associated with a communication channel, total bandwidth of a communication channel, available bandwidth of a communication channel, properties or characteristics of the network devices or assets, maintenance records associated with the network devices or assets, configurations of the network devices or assets, employees associated with respective network-related devices).

The analytics component 102 can comprise an analytics management component 118 that can manage and implement the various services (e.g., cloud-based services, such as analytics services, remote monitoring services, visualization services, which, for example, can be available as subscription services by an entity that owns, operates, or manages the cloud platform and cloud-based services). The analytics management component 118 can analyze the industrial-automation-system-related data obtained from the industrial automation system(s) 104 or other sources to facilitate enhancing operation of the industrial automation system(s) 104.

Based at least in part on the results of the data analysis, the analytics management component 118 can determine one or more correlations between respective portions or aspects of the industrial automation system(s) (e.g., between a first industrial device 110 and a second industrial device), between a portion(s) or aspect(s) of the industrial automation system(s) and extrinsic events or conditions (e.g., between an industrial device 110 and a weather condition, or between an industrial process 112 and an inventory of a material supplier that provides a material(s) used in the industrial process 112), or between an employee(s) and a portion(s) or aspect(s) of the industrial automation system(s) (e.g., between an employee and an industrial device(s) 110).

In some implementations, the analytics component 102 can normalize or standardize the respective pieces of collected data to facilitate easier determination or identification of dependencies or correlations between respective subsets of data. This can facilitate enabling an "apples-to-apples" comparison of data, as opposed to an "apples-to-oranges" comparison of data. For example, the analytics component can normalize or standardize respective pieces of data based at least in part on a unit of measurement of the data, a type of data, a type or characteristic of a data value represented by the data (e.g., average data value, median data value, peak data value, standard deviation associated with a data value, an amount of error associated with a data value), source of the data, and/or other factors, in accordance with defined analytics criteria.

Based at least in part on one or more correlations determined by the analytics management component 118, the analytics management component 118 can determine one or more recommendations or instructions in connection with the industrial automation system(s) 104 to enhance performance of the industrial automation system(s) 104, or an employee(s) associated with the industrial automation system(s) 104. The analytics component can provide (e.g., transmit) the recommendations or instructions to a communication device 120 associated with a user (e.g., operator, technician, maintenance person, supervisor, information technology (IT) personnel, or other personnel) associated with the industrial automation system(s) 104 or to the industrial automation system(s) 104 (e.g., to an industrial device 110 or industrial process 112) to facilitate enhancing operational performance of the industrial automation system(s) 112 or an associated employee. The communication device 120 can be, for example, (a handheld communication device), such as a computer (e.g., a laptop computer), a mobile phone (e.g., a smart phone or other type of cellular phone), an electronic tablet, electronic eyeglasses (e.g., electronic eyeglasses (e.g., smart glasses) with computing and communication functionality), or other type of communication device.

For example, based at least in part on a data analysis of collected data, the analytics management component 118 can determine a correlation between an industrial device 110 (e.g., industrial controller) associated with a first industrial process 112 and a second industrial process 112, wherein the operation of the second industrial process 112 can be positively or negatively affected changes in the operation of the industrial device 110. The analytics management component 118 can determine that the current parameter settings of the industrial device 110 are having a negative impact on (e.g., causing undesirable (e.g., sub-optimal, unacceptable) performance by) the second industrial process 112. The analytics management component 118 can determine modified parameter settings for the industrial device 110 that can improve the operation of the second industrial process 112, while still performing in a desired (e.g., suitable, acceptable) manner with respect to the first industrial process 112.

The analytics component 102 can be interfaced with the industrial device 110 via a cloud gateway component (e.g., integrated or otherwise associated with the industrial device 110). The analytics management component 118 can generate instructions that can facilitate changing the current parameter settings to the modified parameter settings, and can communicate the instructions to the industrial device 110 via the cloud gateway component. The respective configurations and interfacing of the analytics component 102 and industrial device 110 can thereby yield a closed-loop control configuration that can facilitate enabling the analytics component 102 to control (e.g., control configuration, parameter settings, operations of) the industrial device 110.

The industrial device 110 can configure (e.g., reconfigure) its parameter settings to change them from the current settings to the modified parameter settings, in response to the received instructions. The industrial device 110 can operate, based at least in part on the modified parameter settings, to facilitate improving the operation of the second industrial process 112. In other implementations (e.g., alternatively), the analytics management component 118 can generate the instructions or a corresponding recommendation to change the current parameter settings of the industrial device 110 to the modified parameter settings, and/or other information relating to (e.g., detailing) the correlation, and can communicate the instructions, recommendation, or other correlation-related information to a user (e.g., to a communication device 120 of the user) for consideration and/or action by the user to facilitate improving the operation of the second industrial process 112. In response to the instructions, recommendation, or other correlation-related information, the user can take appropriate action (e.g., can change the current parameter settings of the industrial device 110 to the modified parameter settings).

As another example, based at least in part on a data analysis of collected data, the analytics management component 118 can determine a correlation between an external event, such as unusually high product inventory levels for a particular product in a chain of stores that were identified in recently obtained product inventory data, and an order for the particular product that is scheduled to be serviced using a set of industrial devices 110 associated with an industrial process 112 of the industrial automation system 104 used to produce the particular product. Further, based at least in part on the determined correlation, the analytics management component 118 can determine that servicing the order will result in unnecessarily producing more of the particular product and negatively impacting (e.g., reducing) the amount of revenue generated by the customer associated with the industrial facility. In response to these determinations, the analytics management component 118 can determine a different order for a different product that can and should be serviced using the set of industrial devices 110 instead of the order, and can generate a notification, a recommendation, and/or an instruction that can notify a user of the problems (e.g., undesirably high product inventory levels for the particular product, reduced revenue) associated with servicing the order, recommend running (e.g., servicing) the different order using the set of industrial devices 110 instead of the order, and/or instructing that the different order be serviced on the set of industrial devices 110 instead of the order. The analytics management component 118 can transmit the notification, recommendation, and/or instruction to the user (e.g., via the communication device 120) and/or the industrial automation system 104 for consideration and/or action by the user and/or industrial automation system 104.

As still another example, based at least in part on a data analysis of collected data, the analytics management component 118 can determine a correlation between a weather condition indicated in a weather forecast to occur at a particular geographical region at a particular time and a supply of an ingredient used in an industrial process 112 of the industrial automation system 104. Further, based at least in part on the determined correlation, the analytics management component 118 can determine that the weather condition will or at least is predicted to negatively affect the supplying of the ingredient to the industrial facility wherein the industrial automation system 104 resides, and this will or at least is predicted to have a negative affect on producing a particular product that uses that ingredient via the industrial process 112. In response to these determinations, the analytics management component 118 can determine that the industrial process should be modified to a different industrial process that does not use or uses less of the ingredient to produce a different product than the industrial process used to produce the particular product, to facilitate compensating for the negative impact (e.g., process interruption or downtime) or at least potential negative impact on the industrial process that may result from the negative affect or potential negative affect on the supply of the ingredient due to the forecasted weather condition. The analytics management component 118 can generate a notification, a recommendation, and/or an instruction that can notify a user of the problem or potential problem with the supply of the ingredient and its negative impact or potential negative impact on the production of the particular product, recommend modifying the industrial process to a different industrial process to produce a different product, and/or instructing that the industrial process be modified to a different industrial process to produce a different product. The analytics management component 118 can transmit the notification, recommendation, and/or instruction to the user (e.g., via the communication device 120) and/or the industrial automation system 104 for consideration and/or action by the user and/or industrial automation system 104.

To enhance the analysis (e.g., "golden batch" analysis to achieve the "golden batch" for production (e.g., optimal level of production) by the industrial automation system 104), the analytics component 102 can incorporate other types of information, such as user (e.g., employee) behaviors with respect to the industrial automation system 104, the amount of time since an industrial device 110 has been maintained, serviced, repaired, or replaced, etc. For instance, the analytics component 102 can monitor the work of employees in connection with an industrial automation system 104 and can collect (e.g., via the collection component 106) industrial-automation-system-related data relating to the employees and the industrial automation system 104. Based at least in part on results from the analysis of such data, the analytics management component 118 can identify one or more correlations between one or more employees and the operation of the industrial automation system 104 relating to the impact (e.g., negative impact, positive impact) the one or more employees have on the operation of the industrial automation system 104. For example, based at least in part on results from the analysis of such data, the analytics management component 118 can determine, identify, or learn that a certain employee is more influential (e.g., in a positive manner) than another employee on production outcomes for the industrial automation system 104. For instance, the analytics management component 118 can learn that when the certain influential employee is absent from work, not only is there a direct negative impact on production in the industrial automation system 104 due to that's employee's absence, but other employees do not work as productively with respect to the industrial automation system 104 as when certain influential employee is at work (e.g., due to a negative change in mood of the other employees due to the certain influential employee being absent, due to the lack of work guidance to those other employees from the certain influential employee, or for other reasons). The analytics management component 118 can generate a notification or recommendation relating to the correlation between the employees and the operation of the industrial automation system, and can communicate the notification or recommendation to the user (e.g., to the communication device 120 of the user) to facilitate improving operation of the employees, improve operation of the industrial automation system 104, and/or at least notify the user regarding such correlation relating to the employees in connection with production outcomes for the industrial automation system 104.

In some implementations, the analytics component 102 can monitor and collect data (e.g., via the collection component 106) regarding the respective focuses of attention of employees in connection with their work with the industrial automation system 104. Based at least in part on results from an analysis of such data, the analytics management component 118 can determine or identify correlations between the respective focuses of attention of employees (e.g., with regard to where and when each employee's attention is focused) and production outcomes for the industrial automation system 104. The analytics management component 118 also can determine one or more changes or recommendations that can be made to facilitate improving production outcomes for the industrial automation system 104, wherein the changes or recommendations can be, for example, changes in work schedules for the employees to facilitate improving their attention and focus, changes in work tasks of respective employees, instructions regarding how employees can improve their attention or focus in connection with their work with the industrial automation system 104, or other changes or recommendations.

For each industrial asset (e.g., 110, 112, 114) of the industrial automation system 104, the analytics component 102 can monitor and collect (e.g., via the collection component 106) information regarding the amount of time that has elapsed since a particular industrial asset has been maintained, serviced, repaired, or replaced, as well as other information (e.g., information, such as specifications, relating to the industrial asset). Based at least in part on results from the analysis of such data, the analytics management component 118 can determine or identify one or more correlations between the amount of time that has elapsed since a particular industrial asset has been maintained, serviced, repaired, or replaced and the operation of the industrial automation system 104 relating to the impact (e.g., negative impact, positive impact) that the amount of time that has elapsed since the maintenance, servicing, repair, or replacement of the particular industrial asset has on the operation of the industrial automation system 104.

For example, based at least in part on the analysis of information with respect to an amount of time since a particular industrial device 110 has been replaced, the analytics management component 118 can determine that, with respect to the operation of the particular industrial device 110, the production output for the industrial automation system 104 can be expected to be desirable (e.g., optimal, suitable, acceptable) for a particular length of time (e.g., 1 month, . . . , 6 months, . . . , 1 year, . . . ), but after that particular length of time, the operation of the particular industrial device 110 can become less desirable (e.g., less than optimal, suitable, acceptable), which can correlate to a less than desirable (e.g., less than optimal, suitable, acceptable) production output for the industrial automation system 104. In response to this analysis, the analytics management component 118 can determine, and can generate a recommendation, that the industrial device 110 is to be replaced when the particular length of time of operation of the industrial device 110 has elapsed. The recommendation can be provided to a user (e.g., a maintenance technician, a service technician, or other plant personnel) for appropriate action (e.g., replacement of the industrial device 110) to be taken or considered.

When an industrial enterprise comprises or is associated with multiple industrial automation systems 104 (e.g., multiple facilities or plants), the analytics component 102 can monitor and collect (e.g., via the collection component 106) respective industrial-automation-system-related data from the respective industrial automation systems 104, including the respective industrial devices 110, industrial processes 112, other industrial assets 114, and network-related devices of the network components 116 of the respective industrial automation systems 104 in connection with the respective operations of the respective industrial automation systems 104. The analytics management component 118 can aggregate the respective industrial-automation-system-related data collected from the respective industrial automation systems 104. The analytics management component 118 also can analyze the respective industrial-automation-system-related data, and can determine correlations between industrial automation systems 104, correlations between an industrial device and another industrial device (e.g., that can span across multiple industrial automation systems 104), correlations between an operation and another operation (e.g., that can span across multiple industrial automation systems 104), and/or other correlations based at least in part on the analysis results. The analytics management component 118 can generate one or more instructions, recommendations, or notifications that can provide information to facilitate modification of one or more of the industrial automation systems 104 and/or notify a user regarding system-related correlations or recommended modifications to facilitate improving the overall operations of the multiple industrial automation systems 104 for the industrial enterprise. The analytics management component 118 can communicate the one or more instructions, recommendations, or notifications to the appropriate industrial automation system(s) 104 or the appropriate user(s) for action or consideration by the appropriate industrial automation system(s) 104 or appropriate user(s).

For example, based at least in part on a data analysis across multiple industrial automation systems 104, the analytics management component 118 can determine a correlation between transportation costs to transport products produced by the industrial enterprise at one or more of the industrial automation systems 104 and the location of demand for the products by consumers. Also, the analytics management component 118 can determine that shifting a portion of the production load relating to production of the product from a first industrial automation system 104 to a second industrial automation system 104 that is closer to the location of the consumer demand for the product can be accomplished with respect to the first industrial automation system 104 and second industrial automation system 104, and can result in a reduction in transportation costs associated with transporting the product to product distributors or retail stores that service the area of the consumer demand and an increase in overall profit for the industrial enterprise, based at least in part on the analysis results. The analytics management component 118 can generate one or more instructions, recommendations, or notifications relating to the determination that shifting a portion of the production load from the first industrial automation system 104 to the second industrial automation system 104 can result in transportation cost reduction and increased profits for the industrial enterprise. The analytics management component 118 can communicate the one or more instructions, recommendations, or notifications to the first industrial automation system 104, the second industrial automation system 104, and/or associated users (e.g., communication devices 120 of the associated users), for action or consideration by the first industrial automation system 104, the second industrial automation system 104, and/or associated users.

In some implementations, the analytics component 102 can monitor and track operations of the industrial automation system(s) 104 over time, and collect and store data (e.g., via the collection component 106 and data store 108, respectively) relating to such monitoring and tracking. The analytics management component 118 can analyze the data to generate pertinent analysis results that can facilitate improving operation of the industrial automation system 104. Based at least in part on the results of the data analysis, the analytics management component 118 can determine respective baselines (e.g., performance baselines, guidelines) or formulas for respective variables associated with the industrial automation system 104 that can indicate suitable (e.g., optimal, acceptable, preferred) operation of the industrial automation system 104, or portion thereof, wherein the respective variables can be variables that can affect output of the industrial automation system 104, efficiency or power consumption of the industrial automation system 104, material usage of an industrial device or process of the industrial automation system 104, employee performance or behavior with respect to the industrial automation system 104, etc. The respective formulas of the respective variables can indicate the respective effects the respective variables can have on the output of the industrial automation system 104, efficiency or power consumption of the industrial automation system 104, material usage of an industrial device or process of the industrial automation system 104, employee performance or behavior with respect to the industrial automation system 104, etc. The defined analytics criteria can indicate or specify a defined threshold level of suitability or acceptability that can be applied to a baseline (e.g., performance baseline) by the analytics management component 118. The analytics management component 118 can set the respective baselines for the respective variables, wherein the respective baselines can be used as respective guidelines for satisfying (e.g., achieving) a desired production goal(s) (e.g., desirably high or efficient production output) for the industrial automation system 104, in accordance with defined operation criteria. The variables can be or can relate to, for example, a configuration of an industrial asset (e.g., 110, 112, 114) or network-related device, operational variable (e.g., speed of a conveyor), a production output(s), material inventory level, raw material cost, energy cost, employee behavior (e.g., amount or quality of work performed, attentiveness or focus on work tasks), or other variables. Based at least in part on the results of the data analysis, the analytics management component 118 also can determine respective impacts (e.g., negative impacts, positive impacts) of the respective variables on the operation of the industrial automation system 104, and can use these determined respective impacts of the respective variables to facilitate maintaining the respective baselines and satisfying the desired production goal(s).

With the respective baselines for the respective variables associated with the industrial automation system 104 set, the analytics management component 118 can monitor and track operation of the industrial automation system 104 and respective employees' behaviors in connection with the operation of the industrial automation system 104. The analytics management component 118 can identify and track respective employees based at least in part on recognition techniques (e.g., facial recognition, fingerprint recognition, iris recognition), identifiers associated with their respective communication devices (e.g., 120), or respective radio-frequency identification (RFID) tags, for example. The analytics component 102 can collect and store data (e.g., via the collection component 106 and data store 108, respectively) relating to this monitoring and tracking. The analytics management component 118 can analyze this data to generate pertinent analysis results that can facilitate improving or maintaining desired operation of the industrial automation system 104, for example, by satisfying the desired production goal(s) associated with the industrial automation system 104. Based at least in part on the results of the data analysis and the respective baselines for the respective variables, the analytics management component 118 can determine when there is a deviation or a potential for deviation from suitable (e.g., optimal, acceptable, preferred) performance by an industrial asset (e.g., 110, 112, 114) or an employee in connection with operation of the industrial automation system 104. For instance, the analytics management component 118 can determine when there is a deviation or a potential for deviation (e.g., a trend towards deviation) from a baseline for a variable in connection with operation of the industrial automation system 104, wherein the deviation or potential for deviation can indicate that the variable is unsuitable (e.g., not optimal, not acceptable, not preferred) or at least has the potential to be or become unsuitable.

In response to determining or detecting a deviation or potential for deviation from a set baseline for a variable associated with operation of the industrial automation system 104, the analytics management component 118 can generate a notification, a recommendation, or an instruction that can comprise information and/or commands that can facilitate rectifying or avoiding the deviation from the set baseline for the variable. The analytics management component 118 can communicate the notification, recommendation, or instruction to a user (e.g., via the communication device 120) associated with the industrial automation system 104 or to the industrial automation system 104 (e.g., to an industrial device 110), wherein the user or industrial automation system 104 can consider or take action (e.g., corrective or preventive action) in response to the notification, recommendation, or instruction to facilitate rectifying or avoiding the deviation from the set baseline for the variable. The information relating to the deviation or potential for deviation can comprise, for example, a recommendation or instruction (e.g., command) to alter operation of one or more industrial assets (e.g., 110, 112, 114) to compensate for or rectify the deviation or potential for deviation from the set baseline(s) for the variable(s) based at least in part on the determined or estimated (e.g., by the analytics management component 118) effect of altering operation of the one or more industrial assets with respect to the deviation or potential for deviation, or a recommendation to have one or more employees change how they perform certain work tasks in connection with operation of the industrial automation system 104 based at least in part on the determined or estimated (e.g., by the analytics management component 118) effect of changing how the one or more employees perform the certain work tasks with respect to the deviation or potential for deviation.

The analytics component 102 can continue to monitor and track operations of the industrial automation system(s) 104 over time, and collect and store data (e.g., via the collection component 106 and data store 108, respectively) relating to such monitoring and tracking. The analytics management component 118 can analyze additional data that is collected to generate pertinent analysis results that can facilitate maintaining desirable operation and/or improving operation of the industrial automation system 104.

Based at least in part on the results of the data analysis, the analytics management component 118 can determine whether respective baselines (e.g., performance baselines, guidelines) or formulas for the respective variables associated with the industrial automation system 104 are to be modified to facilitate maintaining desirable operation and/or improving operation of the industrial automation system 104. If the analytics management component 118 determines that a formula associated with a variable has changed over time, wherein, for example, the analytics management component 118 determines that the variable no longer has the same influence on the output (e.g., production output) of the industrial automation system 104, efficiency or power consumption of the industrial automation system 104, material usage of an industrial device or process of the industrial automation system 104, employee performance or behavior with respect to the industrial automation system 104, and/or other aspects associated with the industrial automation system 104, the analytics management component 118 can determine that the baseline for the variable is to be modified to a new value or level.

For example, if the analytics management component 118 determines that a formula associated with a particular variable has changed over time, with the particular variable becoming more of an influence on an output (e.g., a desired or critical production output) of the industrial automation system 104, the analytics management component 118 can adjust the formula and the baseline for the particular variable to reflect or correspond to the increased influence that the particular variable has on the output of the industrial automation system 104 (e.g., relative to other variables that can have an influence on the output of the industrial automation system 104. Conversely, if the analytics management component 118 determines that a formula associated with a particular variable has changed over time, with the particular variable becoming less of an influence on an output of the industrial automation system 104, the analytics management component 118 can adjust the formula and the baseline for the particular variable to reflect or correspond to the decreased influence that the particular variable has on the output of the industrial automation system 104 (e.g., relative to other variables that can have an influence on the output of the industrial automation system 104).

The analytics management component 118 also can perform data analysis (e.g., big data analysis) on aggregated customer data relating to respective industrial automation systems (e.g., 104) of respective customers to facilitate anonymous knowledge sharing among the customers, wherein the collection component 106 can collect respective customer data from the respective industrial automation systems (e.g., 104) of the respective customers. The analytics management component 118 can have information that can enable the analytics management component 118 to be aware of the respective industry(ies) of respective customers. The analytics management component 118 can aggregate respective subsets of customers, and respective portions of data associated with those customers, based at least in part on the respective industry(ies) of the respective customers, to facilitate collective analysis of those portions of data associated with a same or similar industry (e.g., to facilitate identifying industry-specific trends or industry-specific correlations). Based at least in part on the data analysis on the aggregated customer data, the analytics management component 118 can determine or learn that a particular system configuration for performing a particular industrial process (e.g., 112) in a given industry (e.g., beverage industry) can result in a relatively higher output or less downtime than other system configurations. In response to this determination, the analytics management component 118 can generate a recommendation to adopt the particular system configuration for performing the particular industrial process, and can communicate the recommendation to one or more customers (e.g., to one or more communication devices of the one or more communication devices) in the given industry that may find such recommendation beneficial to them (e.g., can improve their respective industrial automation systems). The information in the recommendation (e.g., recommendation message) can be tailored such that it does not include any data of a particular customer that can enable another customer to identify the data as being related to or obtained from the particular customer to facilitate maintaining the anonymity of customers with respect to particular pieces of data that have been collected by the collection component 106.

In some implementations, the analytics component 102 can generate and maintain an asset strategy library that can be employed to facilitate managing the use, maintenance or servicing, replacement, and/or other aspects of a set of industrial assets (e.g., 110, 112, 114) associated with an industrial automation system(s) 104. Based at least in part on the results of the analysis of the data, the analytics management component 118 can determine use, maintenance, and replacement strategies and schedules for use in managing the industrial assets. In some implementations, the analytics management component 118 can employ predictive analysis to facilitate predicting or determining the use, maintenance, and replacement strategies and schedules to be used in connection with the industrial assets. The analytics management component 118 can generate notifications, recommendations, and/or instructions relating to the determined use, maintenance, and replacement strategies and schedules associated with the industrial assets. The analytics management component 118 can communicate such notifications, recommendations, and/or instructions to a user (e.g., via a communication device 120 of the user) and/or the industrial automation system(s) 104 for consideration and/or action by the user and/or industrial automation system(s) 104.

In certain implementations, the analytics component 102 can enable analysis functions relating to use, maintenance or servicing, replacement, and/or other aspects of an industrial asset (e.g., 110, 112, or 114) to be distributed among the analytics component 102 and the industrial asset. For example, from the cloud platform, the analytics management component 118 can provide (e.g., communicate) information (e.g., information relating to the specification of an industrial device 110, maintenance of the industrial device 110, replacement of the industrial device 110 (e.g., lifespan of the industrial device 110), etc.), instructions (e.g., analysis instructions), and/or an algorithm (e.g., analysis algorithm) to the industrial device 110. Based at least in part on the information, instructions, and/or algorithm provided to the industrial device 110, the industrial device 110 can perform analysis functions locally on itself (e.g., can self-analyze itself) to, for example, determine when the industrial device 110 should have maintenance or servicing performed on it or when the industrial device 110 should be replaced with a new industrial device 110. If, based at least in part on its self-analysis, the industrial device 110 determines that it should have maintenance or servicing performed on it or determines the industrial device 110 should be replaced with a new industrial device 110, the industrial device 110 can communicate a notification to the analytics component 102 or to a user (e.g., a maintenance or service technician or other plant personnel) to inform the analytics component 102 or the user that the industrial device 110 should have maintenance or servicing performed on it or the industrial device 110 should be replaced with a new industrial device 110, wherein the analytics component 102 or user can take or consider taking appropriate action (e.g., action to have the industrial device 110 maintained, serviced, or replaced), as desired.

As disclosed herein, the analytics component 102 can reside on the cloud platform, can collect data (e.g., via the collection component 106) from the industrial automation system 104 of the industrial facility (e.g., plant floor at the industrial facility) via cloud gateways, perform analytics on the data and determine correlations relating to respective aspects associated with the industrial automation system 104, and can communicate notifications, recommendations, or instructions (e.g., control instructions) to the industrial automation system 104 or users based at least in part on the results of the analytics. In other implementations, the analytics component 102 can reside locally (e.g., on a private cloud platform or server) with respective to the industrial automation system 104, for example, if a customer does not desire to migrate certain data (e.g., sensitive data associated with the customer) to the cloud platform.

Figure 2:
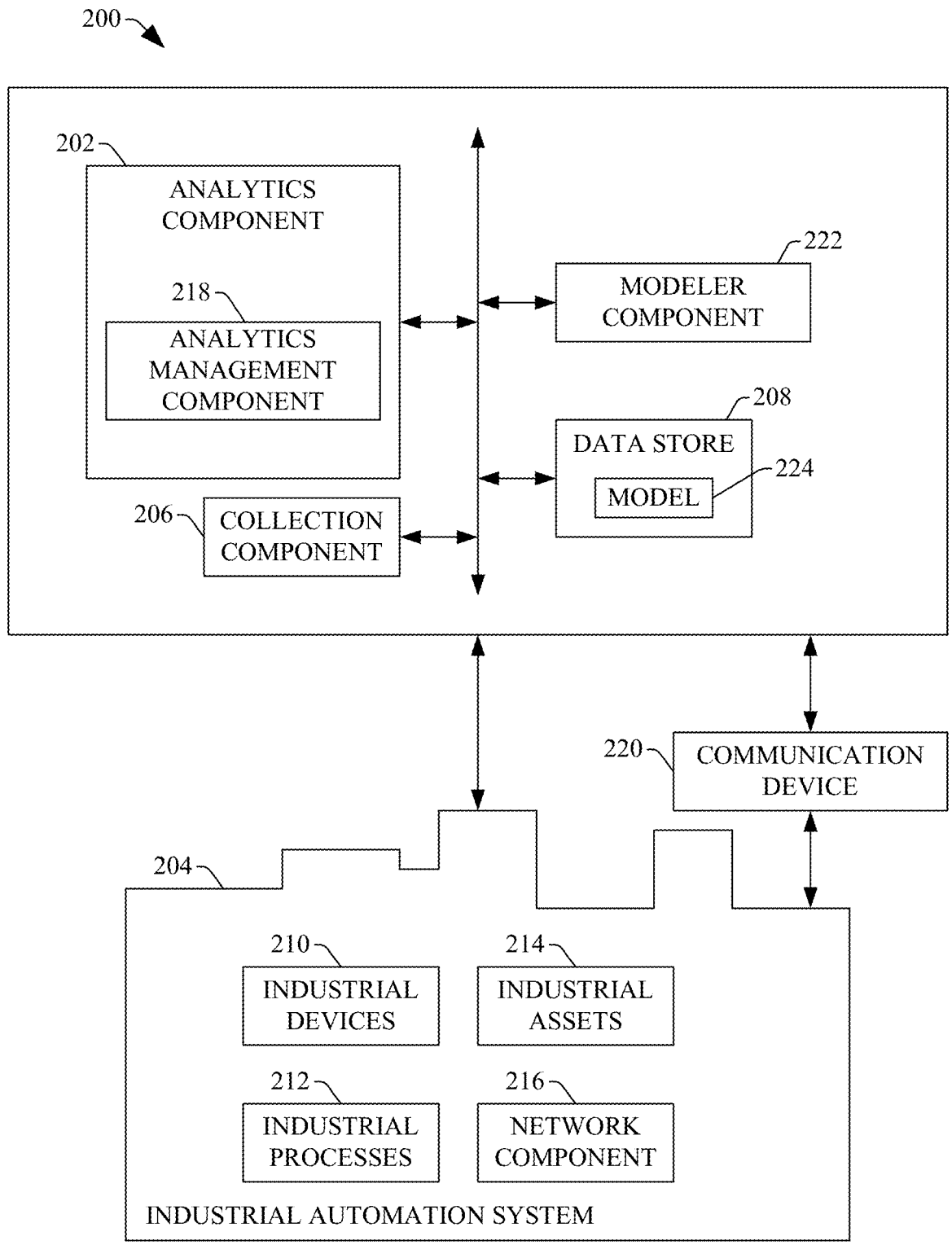
FIG. 2 depicts a block diagram of an example system that can perform analytics in connection with an industrial automation system(s) using a model(s) of the industrial automation system(s) to facilitate improving operations of the industrial automation system(s), in accordance with various implementations and embodiments of the disclosed subject matter.

Referring to FIG. 2, depicted is a block diagram of an example system 200 that can perform analytics in connection with an industrial automation system(s) using a model(s) of the industrial automation system(s) to facilitate improving operations of the industrial automation system(s), in accordance with various implementations and embodiments of the disclosed subject matter. The system 200 can comprise an analytics component 202, an industrial automation system(s) 204, a collection component 206, and a data store 208, wherein the industrial automation system(s) 204 can comprise industrial devices 210, industrial processes 212, other industrial assets 214, and a network component 216, and wherein the analytics component 202 can comprise an analytics management component 218. The system 200 also can comprise or be associated with a communication device 220, which can be associated with the analytics component 202, industrial automation system(s) 204, collection component 206, and/or data store 208.

The system 200 also can comprise a modeler component 222 (e.g., a cloud-based modeler component) that can employ and provide a variety of services including a cloud-based model generation service. The modeler component 222 can facilitate generation and management of a model 224 that can correspond to the industrial automation system 204 based at least in part on data (e.g., industrial-automation-system-related data) obtained from the industrial automation system 204, another industrial automation system(s), or from other sources (e.g., extrinsic sources), in accordance with defined modeling criteria. As more fully disclosed herein, the collection component 206 can collect industrial-automation-system-related data from one or more industrial automation systems 204 of one or more industrial customers (e.g., industrial enterprises) for storage (e.g., in the data store 208) and analysis (e.g., by the modeler component 222 and/or analytics component 202) on a cloud platform. As part of providing the cloud-based model generation service, the modeler component 222 (and/or the analytics component 202) can perform data analysis (e.g., big data analysis) on the data in a cloud platform to facilitate generating the model 224 of the industrial automation system 204 that can be used to facilitate interacting with (e.g., remotely monitoring operation of, tracking operation of, controlling operation of, troubleshooting problems with, providing assistance relating to, etc., via a communication device) the industrial automation system 204.

The modeler component 222 (and/or the analytics component 202) can monitor or track the operation of the industrial automation system 204, including monitoring and tracking the respective operations of respective industrial devices 210, industrial processes 212, industrial assets 214, and/or network-related devices of the network component 216, and monitoring and tracking the configuration of the industrial automation system 204. The modeler component 222 can generate an interactive model(s) 104 of one or more industrial automation systems 204 (e.g., of an industrial plant environment(s)), based at least in part on the data analysis performed on the data (e.g., industrial-automation-system-related data) relating to the operation of the industrial automation system 204 by the modeler component 222 and/or analytics component 202.

In some implementations, the modeler component 222 can facilitate providing cloud-based services (e.g., modeling services, troubleshooting services, optimization services, remote viewing or controlling services, and/or other cloud-based services) to users and an industrial automation system(s) 204. Users (e.g., operators, technicians, maintenance personnel, supervisors, IT personnel, or other plant personnel) can interact with a model 224 (e.g., interactive model), or a virtualized industrial automation system generated based on the model 224, of an industrial automation system(s) 204 to perform various work tasks, functions, and/or operations, etc. For instance, a user can interact with the model 224 or the corresponding virtualized industrial automation system to facilitate remote viewing of, interaction with, troubleshooting of problems with, controlling operation of, and/or optimization of industrial assets (e.g., industrial devices 210, industrial processes 212, other assets 214) or the network-related devices of the network component 216 of the industrial automation system(s) 204.

The industrial assets (e.g., industrial devices 210, industrial processes 212, other assets 214) and network-related components of the network component 216 of an industrial automation system(s) 204 can be equipped with or associated with components, tools, functions, etc., that can allow the modeler component 222 or analytics component 202 to inventory such industrial assets (e.g., 210, 212, 214) and network-related components of the network component 216 from the cloud, wherein the modeler component 222 can generate a model 224 of the industrial automation system(s) 202 based at least in part on the data obtained from such inventory. The modeler component 222 or analytics component 202 can poll (e.g., request information from) industrial assets, such as industrial devices 210, industrial processes 212, or other industrial assets 214, and/or network-related components of the network component 216 via cloud gateway components (not shown in FIG. 2) to facilitate obtaining information regarding the industrial assets (e.g., 210, 212, 214) or network-related components of the network component 216 from the industrial assets (e.g., 210, 212, 214) or network-related components. For example, an industrial asset (e.g., 210, 212, 214) and/or a network-related component of the network component 216 can comprise (e.g., be integrated with) or be associated with a cloud gateway component that can enable the industrial asset (e.g., 210, 212, 214) and/or network-related component to communicate with the modeler component 222 or analytics component 202 in the cloud to facilitate the modeler component 222 or analytics component 202 discovering, obtaining information from, analyzing information relating to, and/or modeling the industrial asset (e.g., 210, 212, 214) and/or network-related component of the network component 216. The information can comprise, for example, identification information (e.g., identifiers) that can identify an industrial asset (e.g., 210, 212, 214) or network-related component, configuration information that can identify a configuration of an industrial asset (e.g., 210, 212, 214) or network-related component, contextual information relating to an industrial asset (e.g., 210, 212, 214) or network-related device of the network component 216, information relating functional or geographical relationships between industrial assets (e.g., 210, 212, 214) or between an industrial asset (e.g., 210, 212, 214) and a network-related device of the network component 216, information relating to a layout (e.g., functional layout, logic layout, geographical layout) of an industrial automation system 204, communication network connections, or other information.

In some implementations, an industrial automation system 204 can contain legacy industrial assets (e.g., legacy industrial devices or other legacy industrial assets) or legacy network-related components that do not comprise or are not directly associated with a cloud gateway component. The communication device 220 (e.g., computer, mobile phone, electronic tablet or pad, electronic glasses) can be employed to facilitate inventorying and collecting information relating to such legacy industrial assets or legacy network-related components. For instance, the communication device 220 can comprise a camera that can be used to take one or more pictures of legacy industrial assets, legacy network-related components, other industrial assets or network-related components in proximity to the legacy industrial assets or legacy network-related components, and/or an area of the plant in proximity to a legacy industrial asset or legacy network-related component. For instance, the communication device 220 can take a picture of nameplate or other identifier information on a legacy industrial asset or legacy network-related component to facilitate identifying the legacy industrial asset or legacy network-related component. The communication device 220 can comprise a recognizer component (not shown in FIG. 2) that can recognize (e.g. using pattern or optical character recognition (OCR) recognition) or identify the legacy industrial asset or legacy network-related component based at least in part on information obtained via the photograph. Information relating to legacy industrial assets or legacy network-related components also can be input to the communication device 220 by a user via a keyboard, keypad, or audio interface (e.g., a microphone that receives information from the user via the user's voice).

The communication device 220 can interface with the cloud (e.g., via a wireline or wireless communication connection), including with the analytics component 202 and/or modeler component 222, to communicate (e.g., migrate) the information relating to legacy industrial assets or legacy network-related components to the analytics component 202 and/or modeler component 222 (e.g., via the collection component 206). The collection component 206 can facilitate storing this information in the data store 208.

The modeler component 222 can model the industrial automation system 204, including modeling industrial assets (e.g., 210, 212, 214), legacy industrial assets, network-related devices (e.g., of the network component 216), and/or legacy network-related devices, based at least in part on the respective information obtained from the industrial assets (e.g., 210, 212, 214), network component 216, and/or communication device 220, to generate the interactive model 224 (e.g., a data-rich interactive model) of the industrial automation system 204. To facilitate generating a model 224 that can correspond to and be associated with (e.g., can interact or be interfaced with) the industrial automation system 204, the modeler component 222 can access the data store 208 (e.g., cloud-based data store) to obtain a set of data relating to the industrial automation system 204 and/or another industrial automation system (e.g., another system comprising an industrial device(s), process(es), and/or asset(s) that can be the same or similar to an industrial device(s) 210, process(es) 212, and/or asset(s) 214 of the industrial automation system 204). The set of data can comprise information relating to, for example, analytics data generated by the analytics component 202 based at least in part on an analysis of data obtained from the industrial automation system 204 or from another data source; a pre-deployed model of an industrial asset (e.g., 210, 212, 214) or a network-related device that can be stored on the industrial asset or network-related device and provided to the analytics component 202 or modeler component 222 by the industrial asset or network-related device (or by an extrinsic data source); the respective properties, characteristics, functions, configurations, etc., of respective industrial devices 210, industrial processes 212, other industrial assets 214, or network-related devices of the network component 216; or the configuration of industrial devices 210, industrial processes 212, and/or other industrial assets 214 in relation to each other. For example, the properties or characteristics for industrial devices 210 or industrial processes 212 can comprise mechanical or process properties or characteristics associated with industrial devices or processes (e.g., mechanical latency, process cycle times, operating schedules, etc., associated with industrial devices). As another example, the properties or characteristics for network-related devices can comprise communication properties or characteristics (e.g., wireless and/or wireline communication functionality, type(s) of network or communication protocol(s), network or communication specifications, total bandwidth, etc.) of the respective network-related devices.

The set of data also can comprise information relating to, for example, the configuration of the network-related devices in relation to each other, or the configuration of network-related devices in relation to the industrial devices 210, industrial processes 212, and/or other industrial assets 214; software, firmware, and/or operating system utilized by the industrial automation system 204 (e.g., type(s), version(s), revision(s), configuration(s), etc., of the software, firmware, and/or operating system); functional and communicative relationships between industrial devices 210, industrial processes 212, industrial assets 214, network-related devices of the network component 216, etc. (e.g., communication connections or conditions between industrial devices, types of connections between industrial devices, communication connections between industrial devices and network-related devices, etc.). The set of data further can include information relating to, for example, human behavior or interaction in connection with the industrial automation system 204 (e.g., maintenance schedules, shift-specific or operator-specific behavior or interaction of operators with the industrial automation system); production or process flows of the industrial automation system 204 at particular times or in connection with particular projects; and/or other aspects or features of the industrial automation system 204.

The modeler component 222 can analyze the set of data and can generate the model 224 of the industrial automation system 204 based at least in part on the results of the analysis of the set of data. In some implementations, the modeler component 222 can generate the model 224, which can be a multidimensional (e.g., two-dimensional (2-D) or three-dimensional (3-D)) model, in accordance with an International Standardization Organization (ISO) standard(s).

The modeler component 222 also can facilitate generation of a multi-dimensional (e.g., 2-D or 3-D) visualization or virtualization of the industrial automation system 204. The multi-dimensional virtualization of the industrial automation system 204 can be used (e.g., interacted with by a user) to facilitate remote viewing of, interaction with, troubleshooting of problems with, controlling operation of, determining and/or generating optimization recommendations for, and/or optimization of industrial assets (e.g., 210, 212, 214) or the network component 216 of the industrial automation system 204.

When there are multiple industrial plant facilities, the modeler component 222 can generate a model 224 that can represent (e.g., model) the multiple industrial automation systems (e.g., 204) of the multiple industrial plant facilities and/or respective models (e.g., sub-models) of the respective industrial automation systems (e.g., 204) of the respective industrial plant facilities. The modeler component 222 also can facilitate generation of a multi-dimensional visualization or virtualization of the multiple industrial automation systems (e.g., 204) that can be interacted with by users to facilitate remote viewing of, interaction with, troubleshooting of problems with, controlling operation of, determining and/or generating optimization recommendations for, and/or optimization of industrial assets (e.g., 210, 212, 214) of the multiple industrial automation systems (e.g., 204).

In response to any changes to the industrial automation system 204 (e.g., modification of settings of an industrial device, replacement of an industrial asset, software update to an industrial device, modification of an industrial process), the analytics component 202 or modeler component 222 can detect and/or receive information relating to the changes to the industrial automation system 204. The analytics component 202 or modeler component 222 can analyze the information relating to the changes to the industrial automation system 204. Based at least in part on the results of the data analysis, the modeler component 222 can update the model 224 to generate a modified model (e.g., new model 224) that can reflect and incorporate the changes made to the industrial automation system 204 to facilitate accurately modeling the industrial automation system 204 and improving operation of the industrial automation system 204. Also, based at least in part on the results of the data analysis, the analytics management component 218 can update (e.g., modify) correlations or generate new correlations relating to respective portions (e.g., industrial assets) or aspects of the industrial automation system 204, or update correlations or generate new correlations between respective portions (e.g., industrial assets) or aspects of the industrial automation system 204 and extrinsic conditions or events, to facilitate improving operation of the industrial automation system 204.

As disclosed, the modeler component 222 can generate the model 224 of the industrial automation system 204 based at least in part on the results of the analysis of the industrial-automation-system-related data by the analytics component 202. The generated model 224 can be used by the analytics component 202 to facilitate performing analytics on the industrial automation system 204 and determining correlations relating to respective portions (e.g., industrial assets) or aspects of the industrial automation system 204, or correlations between respective portions (e.g., industrial assets) or aspects of the industrial automation system 204 and extrinsic conditions or events. In some implementations, the analysis performed by the analytics management component 218 can be based in part on the aggregation of data relating to respective industrial assets (e.g., 210, 212, 214) and/or network-related devices of the network component 216, wherein the data aggregation can be modeled, in the model 224, on the physical structure of the industrial automation system 204. Such data aggregation and structuring can allow (e.g., enable) the analytics management component 218 to locate respective industrial assets (e.g., 210, 212, 214) and/or network-related devices within the industrial-automation-system context (e.g., the analytics management component 218 can identify an asset, a device, or production area in the industrial automation system 204 in which a sensor resides, based at least in part on the data aggregation and data structuring associated with the model 224.)

In accordance with other aspects and implementations of the disclosed subject matter, once the model 224 of an industrial automation system 204 is constructed, the model 224 can be an active part of the enterprise entity's industrial automation system 204 and can be integrated with other services (e.g., analytics services, correlation or data visualization services, virtualization services, custom data services, remote services) and applications.

Figure 3:
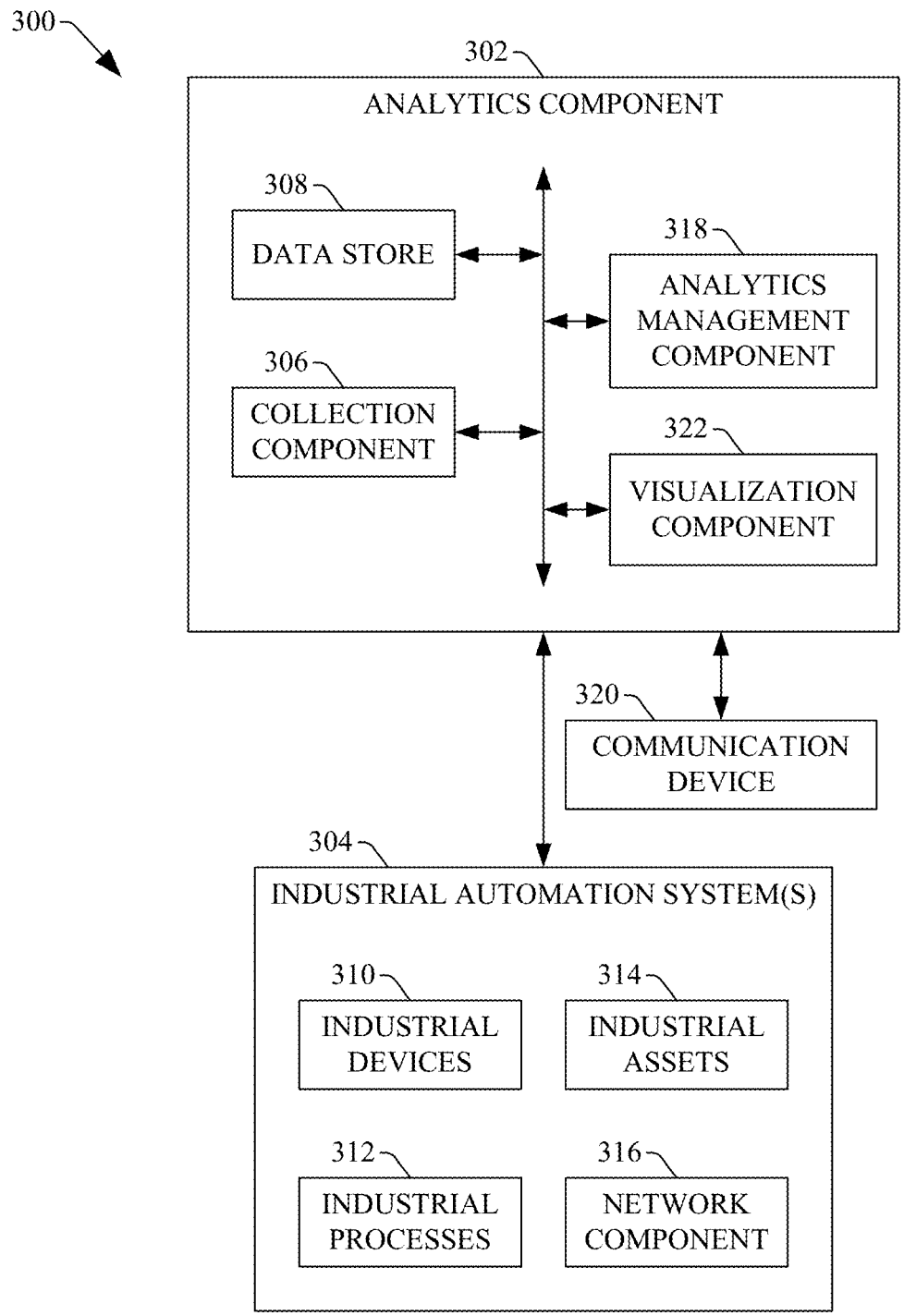
FIG. 3 illustrates a block diagram of an example system that can employs visualization tools or techniques that can facilitate presenting analytics-related information relating to an industrial automation system(s) to users, in accordance with various implementations and embodiments of the disclosed subject matter.

Turning to FIG. 3, illustrated is a block diagram of an example system 300 that can employs visualization tools or techniques that can facilitate presenting analytics-related information relating to an industrial automation system(s) to users, in accordance with various implementations and embodiments of the disclosed subject matter. The system 300 can comprise an analytics component 302, an industrial automation system(s) 304, a collection component 306, and a data store 308, wherein the industrial automation system(s) 304 can comprise industrial devices 310, industrial processes 312, other industrial assets 314, and a network component 316, and wherein the analytics component 302 can comprise an analytics management component 318. The system 300 also can comprise or be associated with a communication device 320, which can be associated with the analytics component 302, industrial automation system(s) 304, collection component 306, and/or data store 308. In some implementations, the analytics component 302, collection component 306, and/or data store 308 can reside in a cloud platform that can be associated with (e.g., interfaced or communicatively connected to) the industrial automation system 304.

The analytics component 302 can comprise a visualization component 322 that can generate and present (e.g., communicate, display) information relating to the operation of the industrial automation system 304 for viewing by a user, for example, via the communication device 320. For instance, the visualization component 322 can generate and present information relating to the correlations determined or identified by the analytics management component 318. The visualization component 322 can present the correlation-related information, or other industrial-automation-system-related information, in virtually any desired form, such as, for example, as a set of data values (e.g., customized data), a chart (e.g., a pie chart, a bar chart, a distribution chart, a geographical or logical location chart) or graph (e.g., line graph), a heat map (e.g., a graphical representation of data comprising respective data values that can be represented by respective colors), a dashboard comprising correlation-related data, a visual diagram of the industrial automation system, or portion thereof, with correlation-related data overlaid in proximity to the industrial asset (e.g., 310, 312, 314) or other device (e.g., of the network component 316) associated with the correlation, a Venn diagram, or another type of data visualization.

The visualization component 322 also can generate and present the respective correlations relating to the industrial automation system 304 in a desired ranked order (e.g., highest ranked priority correlation to lowest ranked priority correlation) or can emphasize correlations that have higher priority (e.g., display higher priority correlations in a larger form than lower priority correlations, display higher priority correlations using a different color than that of lower priority correlations). The analytics management component 318 or visualization component 322 can determine and assign respective priority rankings for respective correlations, based at least in part on the relative importance of the respective correlations with respect to each other and/or the relative impact on a goal(s) (e.g., production goal and/or other goal) relating to the industrial automation system 304 with respect to each other. The analytics management component 318 or visualization component 322 can determine the relative importance of the respective correlations with respect to each other and/or the relative impact on a goal(s) relating to the industrial automation system 304 with respect to each other based at least in part on the results of the analysis of the industrial-automation-system-related data.

Figure 4:
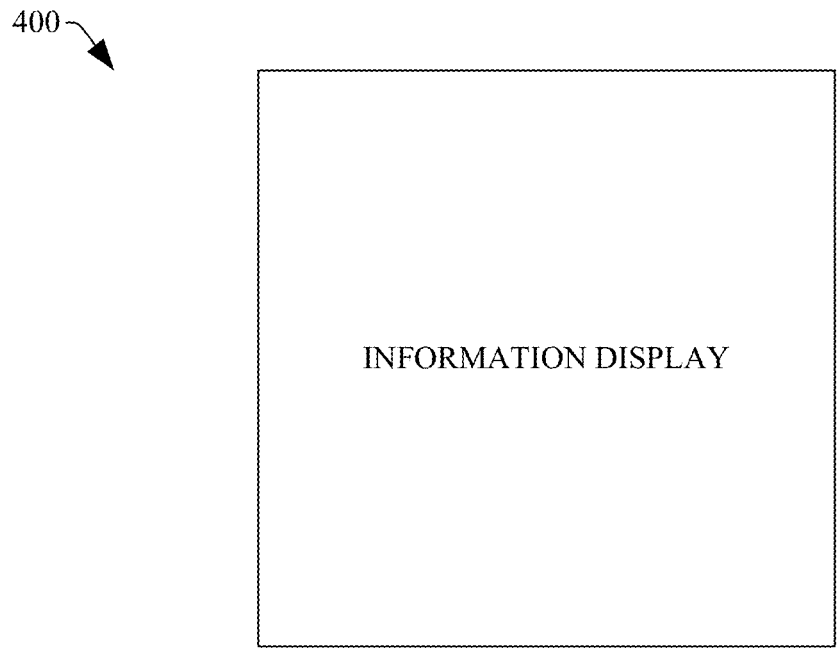
FIG. 4 presents a diagram of an example information display relating to the industrial automation system, in accordance with various implementations and embodiments of the disclosed subject matter.
Figure 5:
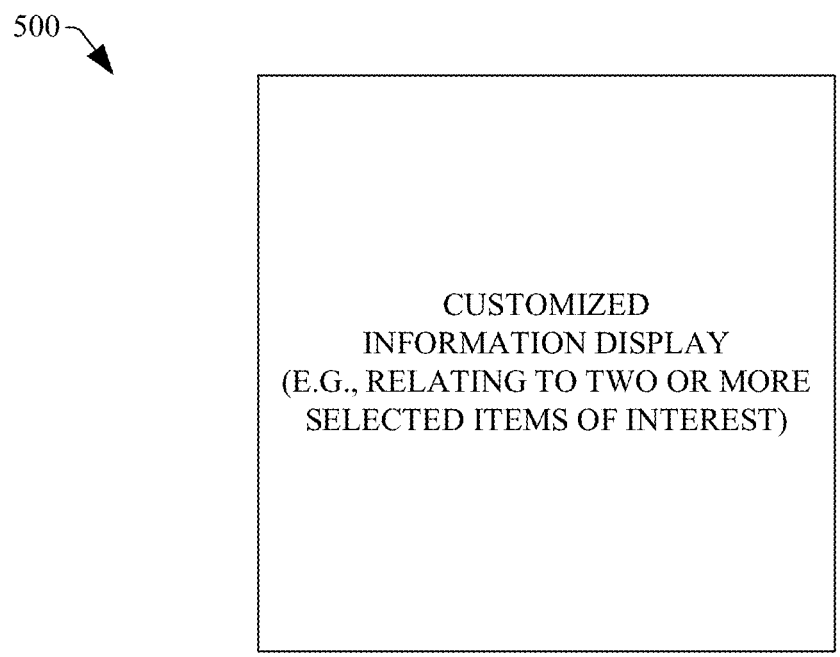
FIG. 5 presents a diagram of an example customized information display relating to two or more selected items of interest in relation to the industrial automation system, in accordance with various implementations and embodiments of the disclosed subject matter.

The visualization component 322 also can modify the visualization and presentation of information relating to the operation of the industrial automation system 304, for example, based at least in part on (e.g., in response to) a user (e.g., input information received from a user). Referring briefly to FIGS. 4 and 5 (along with FIG. 3), FIG. 4 presents a diagram of an example information display 400 relating to the industrial automation system 304, and FIG. 5 presents a diagram of an example customized information display 500 (e.g., selected information display) relating to two or more selected items of interest in relation to the industrial automation system 304, in accordance with various implementations and embodiments of the disclosed subject matter. For purposes of this illustrative example, the visualization component 322 can generate and present the information display 400 relating to the industrial automation system 304 to the user (e.g., via the communication device 320). The information display 400 can relate to certain aspects or portions (e.g., an industrial process 312, a production output of the industrial automation system 304 or portion thereof, or an extrinsic condition or event) of or associated with the industrial automation system 304, for example, that can be relevant to a work task the user is performing with respect to the industrial automation system 304. While, for purposes of this illustrative example, the information display 400 is not referred to as a customized information display (wherein display 500 is referred to as a customized information display), it is to be appreciated and understood that the information display 400 also can be a customized information display (which can be different from the customized information display 500), wherein the information display 400 can be customized by the visualization component 322 based at least in part on an identifier, a role, an authentication credential, a user preference, or access rights to the industrial-automation-system-related information associated with the user and/or other factors, in accordance with defined analytics criteria.

While the user is viewing the information display 400, the user may desire to see any correlations between two or more items (e.g., industrial asset, aspect, condition, event) of or associated with an industrial automation system 304. In response to input information selecting the two or more items (e.g., as received from the communication device 320 or as received via another user interface) and/or based at least in part on an identified role (e.g., operator, supervisor, technician, or other type of role) of the user with respect to the industrial automation system 304, the visualization component 322 can modify the information visualization (e.g., information display 400) being presented to the user (e.g., via a user interface of the communication device 320 or the other user interface) to present (e.g., display), to the user, a customized visualization (e.g., customized information display 500) that can comprise information relating to the two or more selected items of interest, including information relating to the respective correlations (if any) between the two or more items of interest selected by the user. As desired (e.g., when pertinent to the user), the customized information display 500 generated and presented by the visualization component 322 can convey (e.g., present) a statistical relationship of each selected item of interest (e.g., each selected variable) to a specified goal (e.g., product output, energy costs, inventory levels, revenue, etc.) associated with the industrial automation system 304. The two or more items of interest can be or relate to, for example, internal plant aspects (e.g., industrial asset (e.g., 310, 312, or 314), a network-related device of the network component 316, a production output or production goal relating to the industrial automation system 304, an internal inventor of materials, downtime of a selected industrial device 310 or industrial process 312, or other internal condition or event within the industrial automation system 304), or extrinsic (e.g., external) events or conditions (e.g., a price of raw materials or processed products (e.g., grain price), energy cost for energy that is used in connection with production or distribution of products, inventory of an external supplier of materials, weather conditions that can have an effect on production or operations associated with the industrial automation system 304, or other extrinsic events or conditions).

The visualization component 322 can generate and present the information display 400 and customized information display 500 to the user (e.g., via the communication device 320) in virtually any desired (e.g., optimal, acceptable, suitable) format. For example, the respective formats of visualization of the information display 400 and customized information display 500 by the visualization component 322 can be determined by the visualization component 322 based at least in part on an identifier, a role, an authentication credential, a user preference, or access rights to the industrial-automation-system-related information associated with the user, one or more items of interest selected by the user, and/or other factors, in accordance with the defined analytics criteria. The format of visualization of an information display can relate to, for example, the type of information presented, the amount of information being presented, the type of information presentation (e.g., bar graph, pie chart, list of data values, etc.) used, the type of correlation being presented, or other factors.

In some implementations, the analytics management component 318 or visualization component 322 can generate correlation rankings relating to the industrial automation system 304 that can be specific to the particular vertical or industry being analyzed. For example, one type of enterprise (e.g., food and drug enterprise) may value certain types of correlations differently than another type of enterprise (e.g., automotive enterprise) values such certain types of correlations, based at least in part on the respective goals and imperatives of the respective types of enterprises. In generating the correlation rankings, the analytics management component 318 or visualization component 322 can tailor or customize the correlation rankings based at least in part on the respective goals and imperatives of the respective types of enterprises. For instance, the analytics management component 318 or visualization component 322 can rank a first type of correlation higher than a second type of correlation with respect to a first type of industrial enterprise, in accordance with the goals and imperatives of the first type of enterprise, while ranking the second type of correlation higher than the first type of correlation with respect to a second type of industrial enterprise, in accordance with the goals and imperatives of the second type of enterprise.

Figure 6:
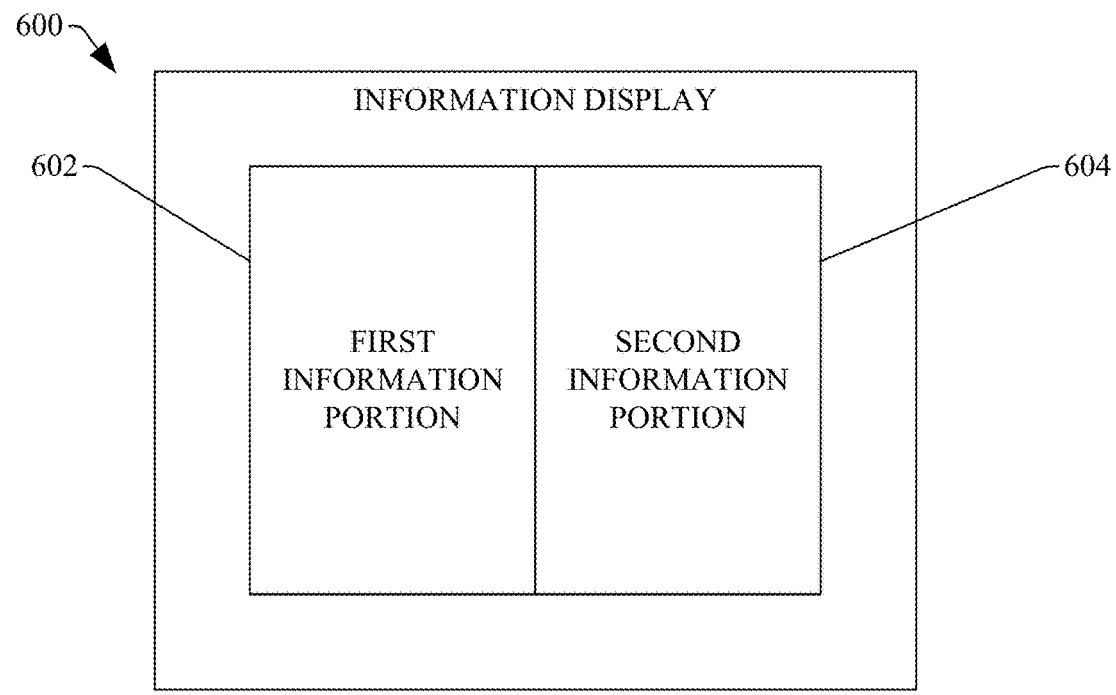
FIG. 6 presents a diagram of an example information display relating to the industrial automation system, in accordance with various implementations and embodiments of the disclosed subject matter.
Figure 7:
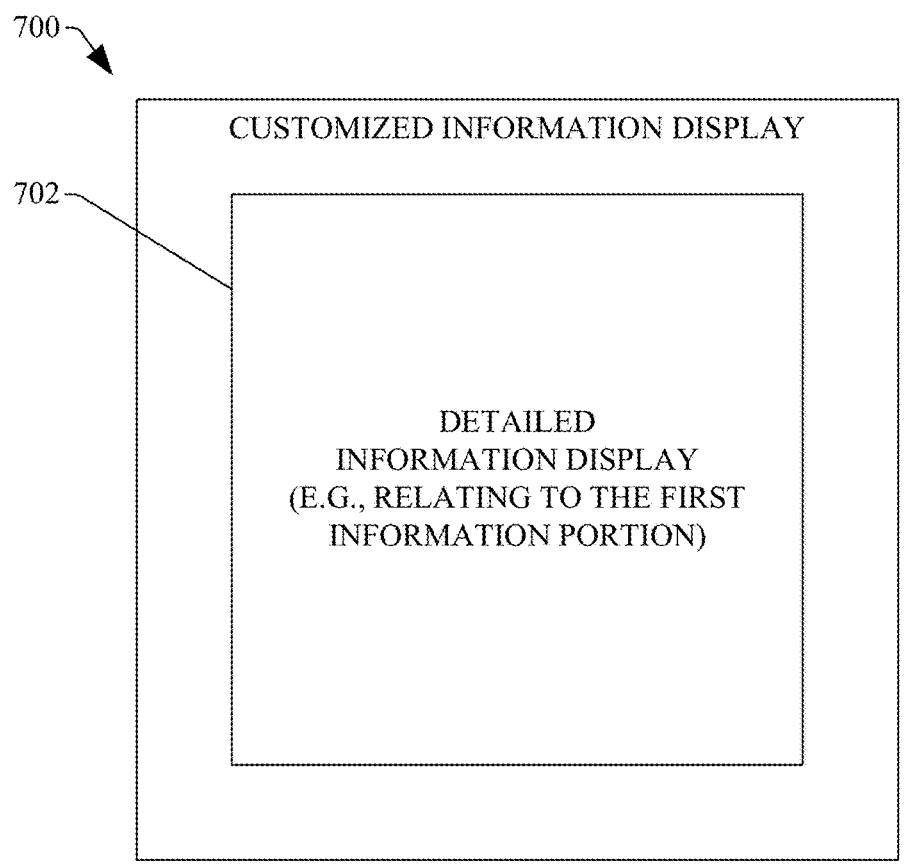
FIG. 7 presents a diagram of an example customized information display relating to selection of a portion of the information display in relation to the industrial automation system, in accordance with various implementations and embodiments of the disclosed subject matter.

The visualization component 322 also can modify the visualization and presentation of information relating to the operation of the industrial automation system 304 to enable a user to focus on and/or see more detailed information regarding a particular portion of the information being presented to the user, for example, based at least in part on (e.g., in response to) a user (e.g., input information received from a user). Referring briefly to FIGS. 6 and 7 (along with FIG. 3), FIG. 6 presents a diagram of an example information display 600 relating to the industrial automation system 304, and FIG. 7 presents a diagram of an example customized information display 700 (e.g., selected information display) relating to selection of a portion of the information display (e.g., 600) in relation to the industrial automation system 304, in accordance with various implementations and embodiments of the disclosed subject matter. For purposes of this illustrative example, the visualization component 322 can generate and present the information display 600 relating to the industrial automation system 304 to the user (e.g., via the communication device 320). The information display 600 can relate to certain aspects or portions (e.g., an industrial device 310, an industrial process 312, a production output associated with the industrial automation system 304 or portion thereof, or an extrinsic condition or event) of or associated with the industrial automation system 304, for example, that can be relevant to a work task the user is performing with respect to the industrial automation system 304. While, for purposes of this illustrative example, the information display 600 is not referred to as a customized information display (wherein display 700 is referred to as a customized information display), it is to be appreciated and understood that the information display 600 also can be a customized information display (which can be different from the customized information display 700), wherein the information display 600 can be customized by the visualization component 322 based at least in part on an identifier, a role, an authentication credential, a user preference, or access rights to the industrial-automation-system-related information associated with the user and/or other factors, in accordance with defined analytics criteria.

The information display 600 of FIG. 6 can comprise a first information portion 602 that can comprise a first subset of information relating to the industrial automation system 304, and a second information portion 604 that can comprise a second subset of information relating to the industrial automation system 304. The first subset of information can be, for example, an information summary, an abstract of information, alert data, notification data, relating to the portion(s) or aspect(s) of the industrial automation system 304 for which the first information portion 602 is presenting information. The second subset of information can be, for example, a different information summary, a different abstract of information, different alert data, different notification data, relating to the portion(s) or aspect(s) of the industrial automation system 304 for which the second information portion 604 is presenting information.

While the user is viewing the information display 600, the user may desire to see more information (e.g., drill down further into the data) regarding some of the first subset of information being presented in the first information portion 602, for example, to gain more information regarding the operations relating to the portion(s) or aspect(s) of the industrial automation system 304 represented by the first information portion 602. The visualization component 322 can enable the user to drill down into (e.g., to expose more detailed) industrial-automation-system-related data to a desired level of granularity.

For instance, in response to input information selecting an item(s) of information on the first information portion 602 (e.g., as received from the communication device 320 or as received via another user interface) and/or based at least in part on an identified role (e.g., operator, supervisor, technician, or other type of role) of the user with respect to the industrial automation system 304, the visualization component 322 can modify the information visualization (e.g., information display 600) being presented to the user (e.g., via the communication device 320 or the other user interface) to present (e.g., display), to the user, a customized visualization (e.g., customized information display 700) that can comprise a detailed (e.g., more detailed) information display 702 that can provide (e.g., expose, present) additional information regarding the selected item(s) of information in the first information portion 602 that can be beyond the amount of information presented for that item(s) of information in the first information portion 602.

For example, the first subset of information in the first information portion 602 may provide a summary of production data for a first portion (e.g., a first industrial process 312) of the industrial automation system 304 over the course of a day. The user (e.g., a plant supervisor) can desire to drill down into the production data to find out more information regarding the production data for the first portion of the industrial automation system 304 on an hourly basis or shift basis. The user can select the production data summary via a user interface on the communication device 320 or another user interface. In response, the visualization component 322 can generate and present the customized information display 700 comprising the detailed information display 702, which can comprise additional information regarding the respective production data for the first portion of the industrial automation system 304 for each hour or each shift over the course of the day.

To facilitate presenting the additional information provided in the detailed information display 702, as desired or as necessary, the visualization component 322 can increase the amount of the display screen used to display the detailed information display 702, decrease the amount of the display screen used to display other parts of the first subset of information associated with the first information portion 602, de-emphasize the other parts of the first subset of information associated with the first information portion 602, remove the other parts of the first subset of information associated with the first information portion 602, decrease the amount of the display screen used to display the first subset of information associated with the second information portion 604, de-emphasize the second subset of information associated with the second information portion 604, and/or remove the other parts of the first subset of information associated with the second information portion 604, in accordance with the defined analytics criteria and/or a user preference(s) of the user. In some implementations, respective information display portions can be displayed in a picture-in-picture (PIP) format, wherein one information display portion can be displayed more prominently over most of a display screen of a user interface (e.g., of a communication device) and another information display portion can be displayed in a smaller portion of the display screen within or in proximity to the larger portion of the display screen that is displaying the more prominently displayed information portion.

Figure 8:
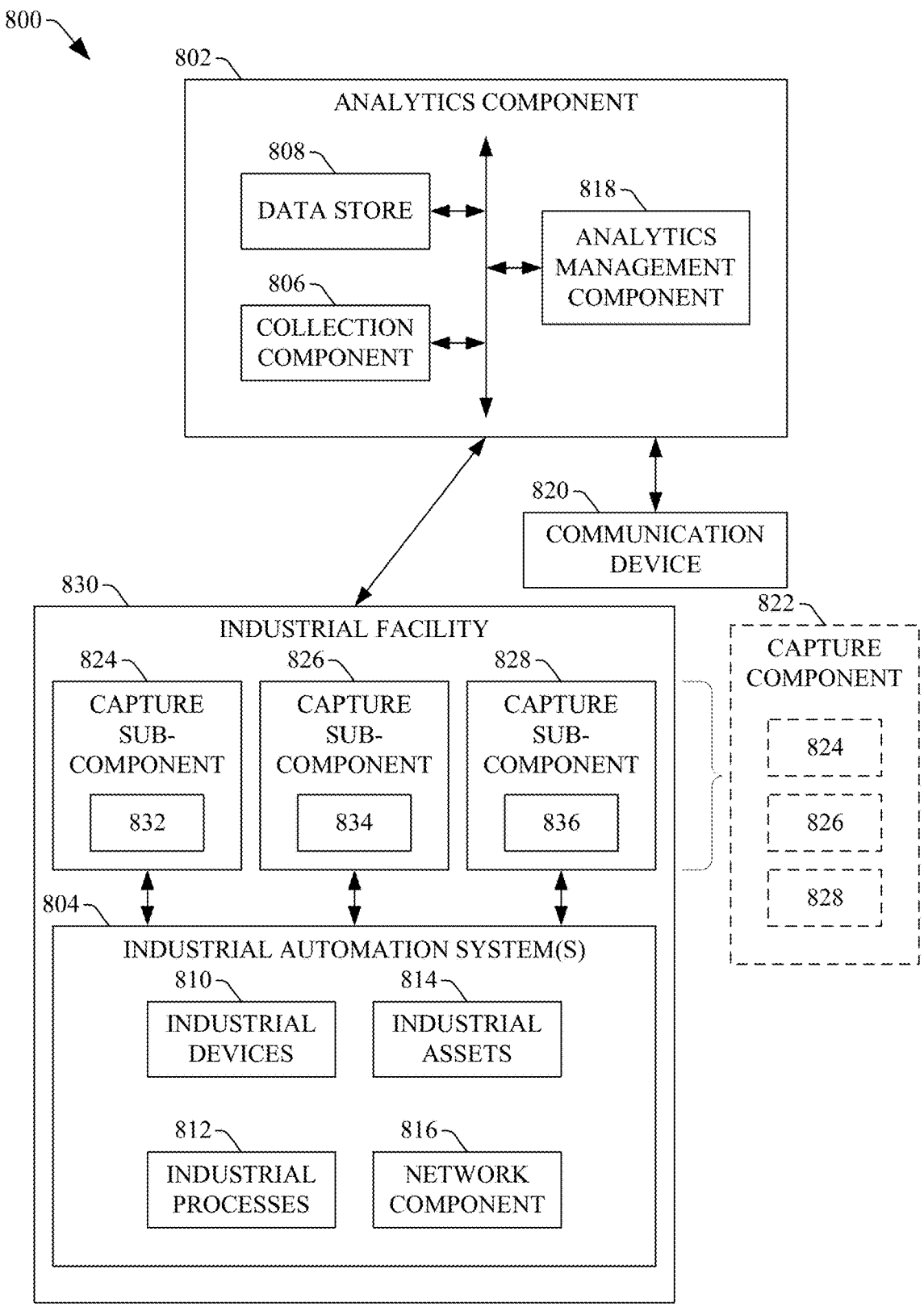
FIG. 8 illustrates a block diagram of an example system that can capture video of operations of an industrial automation system to facilitate performing analytics in connection with the industrial automation system, in accordance with various implementations and embodiments of the disclosed subject matter.

FIG. 8 illustrates a block diagram of an example system 800 that can capture video of operations of an industrial automation system to facilitate performing analytics in connection with the industrial automation system, in accordance with various implementations and embodiments of the disclosed subject matter. The system 800 can comprise an analytics component 802, an industrial automation system(s) 804, a collection component 806, and a data store 808, wherein the industrial automation system(s) 804 can comprise industrial devices 810, industrial processes 812, other industrial assets 814, and a network component 816, and wherein the analytics component 802 can comprise an analytics management component 818. The system 800 also can comprise or be associated with a communication device 820, which can be associated with the analytics component 802, industrial automation system(s) 804, collection component 806, and/or data store 808. In some implementations, the analytics component 802, collection component 806, and/or data store 808 can reside in a cloud platform that can be associated with (e.g., interfaced or communicatively connected to) the industrial automation system 804.

The system 800 can comprise a capture component 822 that can comprise a set of capture sub-components (e.g., cameras), including a first capture sub-component 824, second capture sub-component 826, and third capture sub-component 828. The set of capture sub-components (e.g., 824, 826, 828) can be distributed at desired locations in the industrial facility 830 to enable the respective capture sub-components (e.g., 824, 826, 828) to capture video of respective portions of the industrial automation system 804 to generate real-time video streams of the respective portions of the industrial automation system 804. Each of the respective portions of the industrial automation system 804 can comprise one or more industrial devices 810, one or more industrial processes 812, one or more other industrial assets 814, one or more network-related devices of the network component 816, and/or one or more employees.

To facilitate communication (e.g., migration) of the respective video streams of the respective portions of the industrial automation system 804 to the cloud platform, the respective capture sub-components (e.g., 824, 826, 828) of the set of capture sub-components can comprise respective cloud gateway components, including a first cloud gateway component 832, a second cloud gateway component 834, and a third cloud gateway component 836, that can enable the respective capture sub-components (e.g., 824, 826, 828) to communicate the respective video streams to the cloud platform (e.g., to the analytics component 802, collection component 806, or other component in the cloud platform). The analytics component 802 can receive the respective video streams of the respective portions of the industrial automation system from the respective capture sub-components (e.g., 824, 826, 828) for analysis.

As part of the analysis of the respective video streams, the analytics management component 818 can perform pattern recognition analysis or other recognition analysis on the respective video streams to facilitate determining or learning (e.g., through system monitoring over time) patterns that can represent suitable or normal operation of the industrial automation system 804 and/or patterns that can represent abnormal operation of the industrial automation system 804. For example, the analytics management component 818 can analyze (e.g., using pattern recognition analysis) a video stream received from a capture sub-component (e.g., 824) and can detect or identify an operational abnormality has occurred based at least in part on detecting or identifying a deviation (e.g., a visual deviation) from a pattern that can represent suitable or normal operation of the industrial automation system 804. The deviation can be, for example, a bottle falling over on a conveyor associated with an industrial process 812, a leak from an industrial device 810, smoke emanating from an industrial device 810, or a color change in a product or material that can indicate an operational abnormality.

Based at least in part on the results of the analysis of the video and/or other data, and/or in response to identifying a visual deviation in the operation of the industrial automation system 804, the analytics management component 818 can determine correlations between respective portions or aspects of the industrial automation system 804, between a portion or aspect of the industrial automation system 804 and an extrinsic event or condition, etc., or determine other analytics relating to the industrial automation system 804. The analytics management component 818 also can generate instructions, recommendations, or notifications relating to the correlations and/or to the identified visual deviation in the operation of the industrial automation system 804. The analytics management component 818 can communicate the instructions, recommendations, or notifications relating to the correlations and/or to the identified visual deviation to the user (e.g., via a user interface of the communication device 820 or another user interface) or to the industrial automation system 804 for consideration and/or action by the user or industrial automation system 804. For example, if the deviation is a bottle that has fallen on the conveyor, the instruction, recommendation, or notification can comprise, for example, notifying a user that the bottle has fallen on the conveyor so that the user can pick up the bottle, recommend an adjustment to the conveyor or other industrial device to facilitate reducing the risk of the bottle falling on the conveyor, or instruct an industrial device to adjust its parameters to facilitate reducing the risk of the bottle falling on the conveyor.

Figure 9:
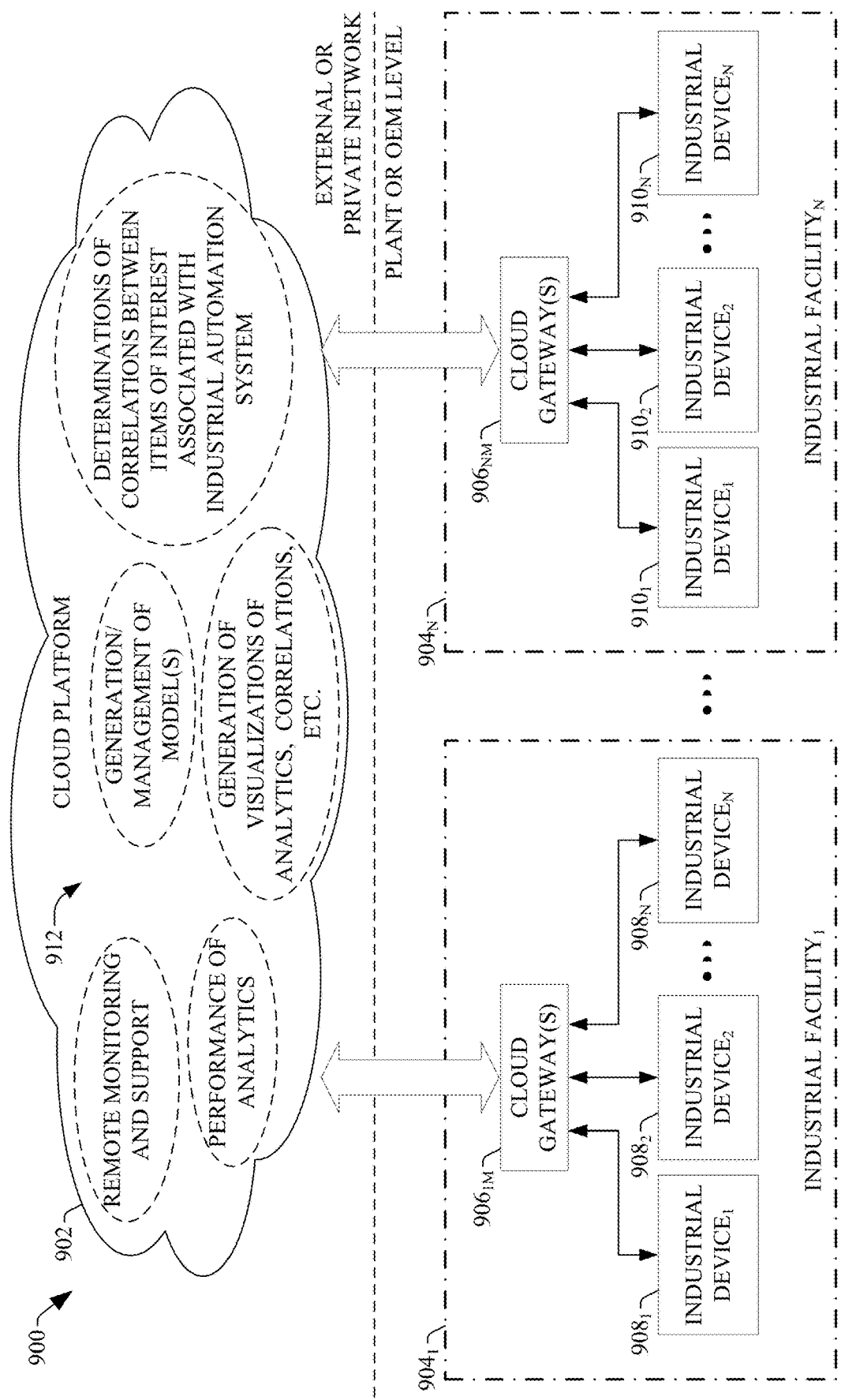
FIG. 9 illustrates a block diagram of a high-level overview of an example industrial enterprise that can leverage cloud-based services, including analytics services, modeling services, visualization services, data collection services, and data storage services, in accordance with various aspects and embodiments of the disclosed subject matter.

As disclosed herein, the systems (e.g., 100, 200, 300, 800) disclosed herein, or respective portions thereof, can be located in a cloud platform. To provide a general context for the cloud-based systems (e.g., analytics systems, modeling systems, visualization systems) and services described herein, FIG. 9 illustrates a block diagram of a high-level overview of an example industrial enterprise 900 that can leverage cloud-based services, including analytics services, modeling services, visualization services, data collection services, and data storage services, in accordance with various aspects and embodiments of the disclosed subject matter. The industrial enterprise 900 can comprise one or more industrial facilities, such as industrial facility$_1$ 904$_1$ up through industrial facility$_N$ 904$_N$, wherein each industrial facilitate can include a number of industrial devices in use. For example, industrial facility$_1$ 904$_1$ can comprise industrial device$_1$ 908$_1$ up through industrial device$_N$ 908$_N$, and industrial facility$_N$ 904$_N$ can comprise industrial device$_1$ 910$_1$ up through industrial device$_N$ 910$_N$. The industrial devices (e.g., 908$_1$, 908$_N$, 910$_1$, 910$_N$, etc.) can make up one or more industrial automation systems that can operate within the respective industrial facilities (e.g., industrial facility$_1$ 904$_1$ up through industrial facility$_N$ 904$_N$). Exemplary industrial automation systems can include, but are not limited to, batch control systems (e.g., mixing systems), continuous control systems (e.g., proportional-integral-derivative (PID) control systems), or discrete control systems. Industrial devices (e.g., $908_1$, $908_N$, $910_1$, $910_N$, etc.) can include such industrial devices as industrial controllers (e.g., programmable logic controllers or other types of programmable automation controllers); field devices such as sensors and meters; motor drives; HMIs; industrial robots, barcode markers, and readers; vision system devices (e.g., vision cameras); smart welders; or other types of industrial devices.

Exemplary industrial automation systems can include one or more industrial controllers that can facilitate monitoring and controlling of their respective industrial processes. The industrial controllers can exchange data with the field devices using native hardwired input/output (I/O) or via a plant network, such as Ethernet/Internet Protocol (IP), Data Highway Plus, ControlNet, Devicenet, or the like. A given industrial controller typically can receive any combination of digital or analog signals from the field devices that can indicate a current state of the industrial devices and/or their associated industrial processes (e.g., temperature, position, part presence or absence, fluid level, etc.), and can execute a user-defined control program that can perform automated decision-making for the controlled industrial processes based on the received signals. The industrial controller can output appropriate digital and/or analog control signaling to the field devices in accordance with the decisions made by the control program. These outputs can include device actuation signals, temperature or position control signals, operational commands to a machining or material handling robot, mixer control signals, motion control signals, and the like. The control program can comprise any suitable type of code that can be used to process input signals read into the controller and to control output signals generated by the industrial controller, including, but not limited to, ladder logic, sequential function charts, function block diagrams, structured text, or other such platforms.

Although the exemplary overview illustrated in FIG. 9 depicts the industrial devices (e.g., $908_1$, $908_N$, $910_1$, $910_N$) as residing in fixed-location industrial facilities (e.g., industrial facility$_1$ $904_1$ up through industrial facility$_N$ $904_N$, respectively), in some implementations, the industrial devices (e.g., $908_1$, $908_N$, $910_1$, and/or $910_N$) also can be part of a mobile control and/or monitoring application, such as a system contained in a truck or other service vehicle.

According to one or more embodiments of the disclosed subject matter, industrial devices (e.g., $908_1$, $908_N$, $910_1$, $910_N$, etc.) can be coupled to a cloud platform 902 to facilitate leveraging cloud-based applications and services (e.g., data collection services, data storage services, analytics services, modeling services, visualization services, etc.) associated with the cloud platform 902. That is, the industrial devices (e.g., $908_1$, $908_N$, $910_1$, $910_N$, etc.) can be configured to discover and interact with cloud-based computing services 912 that can be hosted by the cloud platform 902. The cloud platform 902 can be any infrastructure that can allow the cloud services 912 (e.g., cloud-based computing services, shared computing services) to be accessed and utilized by cloud-capable devices. The cloud platform 902 can be a public cloud that can be accessible via a public network, such as the Internet, by devices having public network connectivity (e.g., Internet connectivity) and appropriate authorizations to utilize the cloud services 912. In some scenarios, the cloud platform 902 can be provided by a cloud provider as a platform-as-a-service (PaaS) and/or reliability-as-a-service (RaaS), and the cloud services 912 can reside and execute on the cloud platform 902 as a cloud-based service. In some such configurations, access to the cloud platform 902 and associated cloud services 912 can be provided to customers as a subscription service by an owner of the cloud services 912. Additionally and/or alternatively, the cloud platform 902 can be a private cloud that can be operated internally by the industrial enterprise 900 or an associated enterprise associated with a third-party entity. An exemplary private cloud platform can comprise a set of servers that can host the cloud services 912 and can reside on a private network (e.g., an intranet, a corporate network, etc.) that can be protected by a firewall.

The cloud services 912 can include, but are not limited to, data collection, data storage, performing analytics on data, control applications (e.g., applications that can generate and deliver control instructions to industrial devices (e.g., $908_1$, $908_N$, $910_1$, $910_N$, etc.) based at least in part on analysis of real-time or near real-time system data or other factors), determining correlations between respective items of interest associated with an industrial automation system(s), determining modifications that can be made in connection with an industrial automation system(s) based at least in part on results of the analytics and/or the determined correlations, remote monitoring and support, generation and management of a model(s) of an industrial automation system(s) that can correspond to the industrial automation system(s), generation and management of visualizations of data associated with industrial automation system(s), remote control of an industrial automation system(s) via a model(s) or virtualized industrial automation system(s), customization of a model(s) or virtualized industrial automation system and/or a data overlay on the virtualized industrial automation system, generation of virtual notes, view sharing (e.g., sharing of customized view of, customized data overlay associated with, and/or a virtual note associated with, a virtualized industrial automation system), provision of security in connection with a model or virtualized industrial automation system and an associated industrial automation system, or provision of other applications or services relating to industrial automation. If the cloud platform 902 is a web-based cloud, industrial devices (e.g., $908_1$, $908_N$, $910_1$, $910_N$, etc.) at the respective industrial facilities 904 can interact with cloud services 912 via the public network (e.g., the Internet). In an exemplary configuration, the industrial devices (e.g., $908_1$, $908_N$, $910_1$, $910_N$, etc.) can access the cloud services 912 through separate cloud gateways (e.g., cloud gateway component $906_{1M}$ up through cloud gateway component $906_{NM}$) at the respective industrial facilities (e.g., industrial facility$_1$ $904_1$ up through industrial facility$_N$ $904_N$, respectively), wherein the industrial devices (e.g., $908_1$, $908_N$, $910_1$, $910_N$, etc.) can connect to the respective cloud gateway components (e.g., cloud gateway component $906_{1M}$ up through cloud gateway component $906_{NM}$) through a physical (e.g., wireline) or wireless local area network or radio link. In another exemplary configuration, the industrial devices (e.g., $908_1$, $908_N$, $910_1$, $910_N$, etc.) can access the cloud platform 902 directly using an integrated cloud gateway service. Cloud gateway components (e.g., cloud gateway component $906_{1M}$ up through cloud gateway component $906_{NM}$) also can comprise an integrated component of a network infrastructure device, such as a firewall box, router, or switch.

Providing industrial devices with cloud capability via the cloud gateway components (e.g., cloud gateway component $906_{1M}$ up through cloud gateway component $906_{NM}$) can offer a number of advantages particular to industrial automation. For instance, cloud-based storage (e.g., cloud-based data store) offered by the cloud platform 902 can be easily scaled to accommodate the large quantities of data that can be generated daily by an industrial enterprise. Further, multiple industrial facilities (e.g., industrial facility$_1$ 904$_1$ up through industrial facility$_N$ 904$_N$) at different geographical locations can migrate (e.g., communicate) their respective industrial automation data to the cloud platform 902 (e.g., via the collection component) for aggregation, collation, collective big data analysis, and enterprise-level reporting without the need to establish a private network between the respective industrial facilities. Industrial devices (e.g., 908$_1$, 908$_N$, 910$_1$, 910$_N$, etc.) and/or cloud gateway components (e.g., cloud gateway component 906$_{1M}$ up through cloud gateway component 906$_{NM}$) having smart configuration capability can be configured to automatically detect and communicate with the cloud platform 902 upon installation at any facility, which can thereby simplify integration with existing cloud-based data storage, analysis, or reporting applications used by the industrial enterprise 900. In another exemplary application, cloud-based analytics applications (e.g., employed by an analytics system comprising the analytics component) can access the data relating to an industrial automation system(s) stored in the cloud-based data store, perform analytics on the data to generate analysis results, determine correlations between respective aspects (e.g., internal or intrinsic aspects, external or extrinsic aspects) associated with an industrial automation system(s), and generate notifications, recommendations, and/or instructions based on the correlations to facilitate improved operation of the industrial automation system(s). These industrial cloud-computing applications are only intended to be exemplary, and the systems and methods described herein are not limited to these particular applications. As these examples demonstrate, the cloud platform 902, working with cloud gateway components (e.g., cloud gateway component 906$_{1M}$ up through cloud gateway component 906$_{NM}$), can allow builders of industrial applications to provide scalable solutions as a service, removing the burden of maintenance, upgrading, and backup of the underlying infrastructure and framework.

Figure 10:
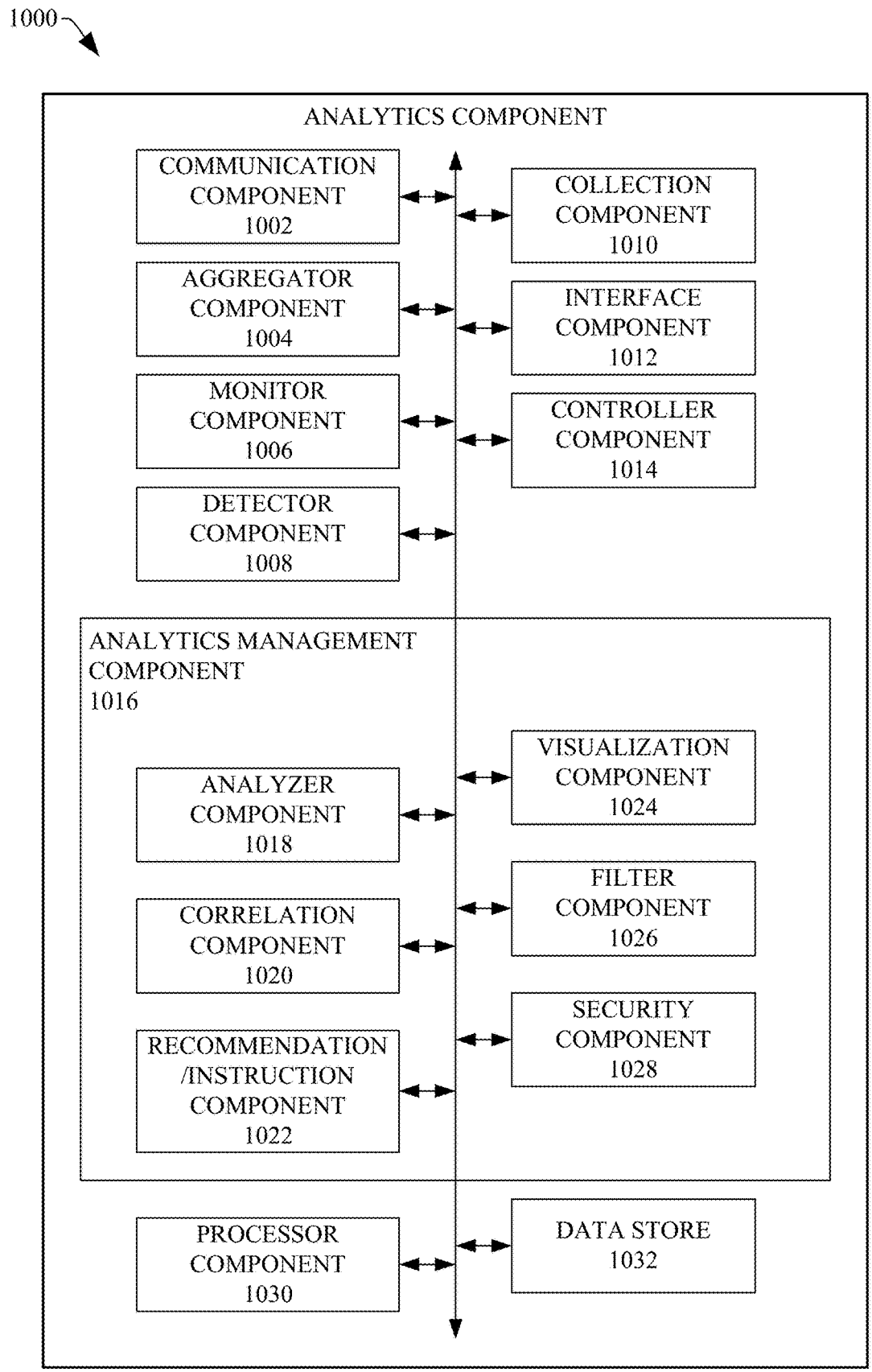
FIG. 10 presents a block diagram of an exemplary analytics component according to various implementations and embodiments of the disclosed subject matter.

FIG. 10 presents a block diagram of an exemplary analytics component 1000 (e.g., cloud-based, or partially cloud-based, analytics component) according to various implementations and embodiments of the disclosed subject matter. The analytics component 1000 can be part of an analytics system (e.g., a cloud-based analytics system). Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

The analytics component 1000 can comprise a communication component 1002 that can be used to communicate (e.g., transmit, receive) information between the analytics component 1000 and other components (e.g., communication devices, network-related devices, industrial devices, other types of industrial assets that have communication functionality, other devices with communication functionality that are associated with industrial enterprises, cloud gateways, etc.). The information can include, for example, data relating to industrial automation systems, data relating to specifications, properties, or characteristics of industrial devices or other industrial assets, customer-related data, work-order-related data relating to work orders that will or may be handled by an industrial automation system, etc.

The analytics component 1000 can comprise an aggregator component 1004 that can aggregate data received (e.g., obtained, collected, detected, etc.) from various entities (e.g., communication devices, industrial devices, industrial assets, network-related devices, cloud gateway components, modeler component, virtualization component, other devices with communication functionality that are associated with industrial enterprises, processor component(s), user interface(s), data store(s), etc.). The aggregator component 1004 can correlate respective items of data based at least in part on type of data, source of the data, time or date the data was generated or received, type of device or asset associated with the data, identifier associated with a device or asset, customer associated with the data, user (e.g., operator, supervisor or manager, engineer, technician, etc.) associated with the data, industrial automation system associated with the data, industrial enterprise associated with the system, etc., to facilitate processing of the data (e.g., analyzing of the data, determining correlations between items of interest associated with the industrial automation system, generating a model of an industrial automation system, etc.).

The analytics component 1000 also can include a monitor component 1006 that can monitor device data, process data, asset data, system data, customer data, and/or other data in connection with the industrial automation systems. For instance, the monitor component 1006 can monitor information (e.g., signals, device or process statuses, network communication of information, process flows, updates, modifications, etc.) associated with industrial automation systems, modeled industrial automation systems, virtualized industrial automation systems, industrial enterprises, and/or systems or devices of customers associated with the industrial enterprises to facilitate detecting information associated with industrial automation systems that can facilitate performing analytics on such data, determining correlations between respective items of interest associated with an industrial automation system, generating visualizations (e.g., customized information visualizations) of information relating to an industrial automation system, determining recommendations or instructions based on determined correlations to facilitate improving operations associated with the industrial automation system, generating and updating models of industrial automation systems, generating and updating virtualized industrial automation systems, remotely tracking operation of or controlling operation of an industrial automation system via an associated model or associated virtualized industrial automation system, customizing a view of and/or a data overlay associated with a model or a virtualized industrial automation system for a user, sharing a view (e.g., a customized view) of and/or a data overlay (e.g., a customized data overlay) associated with a model or a virtualized industrial automation system with a communication device of another user, generating virtual notes in connection with a virtualized industrial automation system, controlling and/or enforcing the viewability scope associated with a virtual note, and/or performing other services (e.g., cloud-based services). The monitor component 1006 can be associated with sensors, meters, HMIs, communication monitoring components, or other components associated with industrial automation systems, industrial enterprises, and/or systems or devices of the customers to facilitate the monitoring of the industrial automation systems, industrial enterprises, and/or systems or devices of the customers.

The analytics component 1000 can comprise a detector component 1008 that can detect desired information associated with industrial automation systems that can facilitate performing analytics-related services, visualization-related services, model-related services, and virtualization-related services in connection with an industrial automation system (e.g., performing analytics on data relating to industrial automation systems, determining correlations between respective items of interest relating to an industrial automation system(s), generating recommendations or instructions relating to the determined correlations between respective items of interest, generating or updating a model, generating or updating a virtualized industrial automation system, remotely interacting with (e.g., monitoring, tracking, and/or controlling, etc., operation of) an industrial automation system via interacting with a model or a virtualized industrial automation system, etc.), in accordance with the defined analytics criteria, defined modeling criteria, defined virtualization criteria, or other operation criteria. For instance, the detector component 1008 can detect or discover desired device data, process data, asset data, system data, and/or customer data in connection with the industrial automation systems that can facilitate performing analytics on data relating to industrial automation systems, determining correlations between respective items of interest relating to an industrial automation system(s), generating recommendations or instructions relating to the determined correlations between respective items of interest, generating a model or a virtualized industrial automation system that can accurately represent and/or interface with an industrial automation system, remotely interacting with and/or controlling an industrial automation system via an associated model or virtualized industrial automation system, and/or performing other analytics-related, visualization-related, model-related or virtualization-related services or functions.

The analytics component 1000 also can include a collection component 1010 that can receive, collect, or obtain data (e.g., desired device data, process data, asset data, system data, and/or customer data) from industrial automation systems, communication devices, models, virtualized industrial automation systems, extrinsic sources, etc., to facilitate performing analytics-related, visualization-related, model-related and virtualization-related services, as more fully disclosed herein. The data collected by the collection component 1010 can be stored in the data store 1032, and/or can be made available to other components (e.g., analytics management component 1016, analyzer component 1018, etc.) to facilitate performing analytics on data relating to industrial automation systems, determining correlations between respective items of interest relating to an industrial automation system(s), generating recommendations or instructions relating to the determined correlations between respective items of interest, generating and updating models of industrial automation systems, generating and updating virtualized industrial automation systems, remotely interacting with (e.g., monitoring, tracking, and/or controlling, etc.) an industrial automation system via an associated model or virtualized industrial automation system, and/or performing other analytics-related, visualization-related, model-related, or virtualization-related services or functions.

The analytics component 1000 can comprise an interface component 1012 that can be employed to facilitate interfacing the analytics component 1000 (or interfacing an associated modeler component or virtualization component) with industrial automation systems and their constituent components (e.g., industrial devices or assets, network-related devices or assets, etc.) or processes, systems or devices associated with customers, systems or devices associated with device manufacturers, etc. For instance, the interface component 1012 can be configured to receive industrial data (e.g., device data, process data, asset data, system data, configuration data, status data, process variable data, etc.) sent by one or more cloud-capable industrial devices, cloud gateway components, communication devices, or other sources of industrial data. The interface component 1012 also can be configured to receive network-related data (e.g., data relating to communication conditions, network-status data, data identifying network-related devices, etc.) communicated by one or more network-related devices of the network component of an industrial automation system. The interface component 1012 also can be configured to interface a model (or an virtualized industrial automation system) with a corresponding industrial automation system to facilitate remotely interacting with (e.g., monitoring, tracking, and/or controlling, etc., operation of) the industrial automation system via interactions (e.g., user interactions) with the model (or the virtualized industrial automation system (e.g., via virtualized control of the virtualized operation of the virtualized industrial automation system)). The interface component 1012 further can be configured to exchange data with one or more client or customer devices via an Internet connection. For example, the interface component 1012 can receive customer profile data, requests for firmware upgrades, customer service selections, information relating to work orders for products, customer preferences or requirements with regard to a work order, or other such information from a client device (e.g., an Internet-capable client device, such as a phone, a computer, an electronic tablet or pad, or other suitable Internet-capable device). The interface component 612 also can deliver upgrade notifications, firmware upgrades, reports or notifications regarding the evaluation of and determinations regarding proposed modifications to an industrial automation system, notifications of impending device failures, identification of asset or system inefficiencies, configuration recommendations, or other such data to the client device.

The analytics component 1000 also can contain a controller component 1014 that can control operations relating to processing data, performing analytics on data, visualizing information relating to an industrial automation system, determining correlations between respective items of interest associated with the industrial automation system, determining and generating recommendations or instructions relating to the determined correlations between the respective items of interest associated with the industrial automation system, facilitating generating or updating model an industrial automation system, facilitating remotely controlling an industrial automation system (e.g., using an associated model or virtualized industrial automation system), facilitating performing simulation operations using a model (e.g., simulation model) in connection with an industrial automation system, and/or performing other operations in connection with the industrial automation system. The controller component 1014 can facilitate controlling operations being performed by various components of the analytics component 1000, controlling data flow between various components of the analytics component 1000, controlling data flow between the analytics component 1000 and other components or systems associated with the analytics component 1000, etc.

The analytics component 1000 also can comprise an analytics management component 1016 that can perform analytics on data, generate visualizations of information relating to an industrial automation system, determine correlations between respective items of interest associated with the industrial automation system, determine and generate recommendations or instructions relating to the determined correlations between the respective items of interest associated with the industrial automation system, facilitate generating and/or updating a model that can represent an industrial automation system, facilitate remotely interacting with and/or controlling an industrial automation system using an associated model or virtualized industrial automation system, facilitate performing simulation operations using a model of an industrial automation system, and/or performing other operations.

The analytics management component 1016 can comprise an analyzer component 1018 that can analyze data (e.g., device data, process data, asset data, system data, customer data, user-generated or user-provided data, and/or other data) to facilitate performing analytics on data, visualizing information relating to an industrial automation system, determining correlations between respective items of interest associated with the industrial automation system, determining and generating recommendations or instructions relating to the determined correlations between the respective items of interest associated with the industrial automation system, generating or updating a model of an industrial automation system, performing simulation of operation of an industrial automation system using a model, etc. The analyzer component 1018 can parse data to facilitate identifying data that is relevant to performing an operation (e.g., performing analytics on data, visualizing information relating to an industrial automation system, determining correlations between respective items of interest associated with the industrial automation system, determining and generating recommendations or instructions relating to the determined correlations between the respective items of interest, etc.) by the analytics component 1000. Based at least in part on the analysis of the data, the analyzer component 1018 can generate analysis results that can be provided to another component (e.g., processor component 1030, data store 1032, etc.) to facilitate the performance of various operations by the analytics component 1000.

The analytics management component 1016 can include a correlation component 1020 that can determine correlations between respective items of interest associated with an industrial control system based at least in part on analytics results, in accordance with the set of defined analytics criteria, as more fully disclosed herein. For example, based at least in part on the analytics results, the correlation component 1020 can determine a correlation between a first item of interest associated with an industrial control system (e.g., production output of an industrial automation system) and a second item of interest associated with the industrial automation system (e.g., employee interaction with (e.g., performance of work tasks in connection with) the industrial automation system).

The analytics management component 1016 also can comprise a recommendation/instruction component 1022 that can determine and generate one or more recommendations or instructions that can specify one or more changes that can be made in connection with an industrial automation system, for example, based at least in part on one or more determined correlations between respective items of interest associated with an industrial automation system, to facilitate improving operations or performance associated with the industrial automation system. For example, in response to a determination that there is a correlation between a first item of interest associated with the industrial automation system (e.g., industrial device, such as a motor) and a second item of interest associated with the industrial automation system (e.g., production output from a conveyor), wherein it is determined that a current parameter for the industrial device is causing an undesirable (e.g., sub-optimal, unacceptable) production output from the conveyor, the recommendation/instruction component 1022 can determine and generate instructions that can facilitate changing (e.g., adjusting, modifying) the parameter of the industrial device to a new parameter setting that can result in desired improvement in the production output from the conveyor. As another example, in response to a determination that there is a correlation between a first item of interest associated with the industrial automation system (e.g., an employee's performance of certain work tasks in connection with the industrial automation system) and a second item of interest associated with the industrial automation system (e.g., production output from a production line on which the employee works), wherein it is determined that the employee's performance of work tasks is causing an undesirable (e.g., sub-optimal, unacceptable) production output from the production line, the recommendation/instruction component 1022 can determine and generate a recommendation that can recommend that the employee change (e.g., modify) how the employee performs the certain work tasks or recommend a change in work assignments for that employee and another employee to facilitate improving the production output from the production line. The recommendations or instructions generated by the recommendation/instruction component 1022 can be communicated to a communication device of the user (e.g., the employee, or supervisor of the employee), or to another desired destination (e.g., the industrial device to facilitate changing the parameter based on the instructions).

The analytics management component 1016 can contain a visualization component 1024 that can generate and present (e.g., communicate, display) information relating to the operation of an industrial automation system for viewing by a user, for example, via a communication device. For instance, the visualization component 1024 can generate and present information (e.g., in a multi-dimensional visualization of an information display) relating to the correlations between respective items of interest associated industrial automation system that have been determined or identified by the analytics management component 1016. The visualization component 1024 can present the correlation-related information, or other industrial-automation-system-related information, in virtually any desired format (e.g. 2-D or 3-D format), such as, for example, as a set of data values (e.g., customized data), a chart (e.g., a pie chart, a bar chart) or graph (e.g., line graph), a heat map, a dashboard comprising correlation-related data, a visual diagram of the industrial automation system, or portion thereof, with correlation-related data overlaid in proximity to the industrial asset or other device associated with the correlation, Venn diagram, or other type of information visualization. The visualization component 1024 also can determine and present (e.g., generate a visualization of) respective rankings (e.g., priority rankings) of respective correlations between respective items of interest associated with an industrial automation system, wherein the visualization component 1024 can generate a visualization of an information display in a desired format to present (e.g., display, illustrate) the respective correlations between respective items of interest associated with an industrial automation system in a desired order (e.g., in order of the highest priority correlation to the lowest priority correlation).

For respective users, the visualization component 1024 also can customize visualizations of information in an information display (e.g., customized information display) for a user based at least in part on respective items of interest associated with the industrial automation system in response to selection of the respective items of interest by the user, and/or based at least in part on an identifier, a role, an authentication credential, a user preference, access rights to the industrial-automation-system-related information associated with the user, and/or other factors, in accordance with the defined analytics criteria. For example, the visualization component 1024 initially can generate an information display that can display certain information relating to the industrial automation system in a desired visualization format (e.g., a desired 2-D or 3-D information visualization format), wherein the information display can be displayed on a display screen of a communication device of the user. The user may desire to view information relating to certain items of interest to the user with respect to the industrial automation system. Using the communication device, the user can input information to facilitate selecting two or more items of interest to the user. The communication device can communicate the input information relating to the two or more items of interest to the visualization component. Based at least in part on input information, the analytics management component 1016 can perform analytics on data relating to the two or more items of interest associated with the industrial automation system, and can determine one or more correlations between the two or more items of interest based at least in part on the analytics results. The visualization component 1024 can generate a customized information display in a desired visualization format, wherein the customized information display can comprise custom visualized information relating to the one or more correlations between the two or more items of interest associated with the industrial automation system.

The analytics component 1000 (e.g., via the communication component 1002) can communicate the customized information display to the communication device of the user, wherein the customized information display can be presented (e.g., displayed) on the display screen of the communication device for viewing by the user.

The analytics management component 1016 also can include a filter component 1026 that can facilitate filtering data to generate a subset of data (e.g., correlation information) for presentation to a user (e.g., via a customized information display), for example, in response to the user selecting two or more items of interest associated with the industrial automation system. The filter component 1026 can employ one or more different types of filters that can be used to filter data relating to the industrial automation system, wherein the filters can facilitate customizing, augmenting, and/or filtering data to provide users with personalized or customized visualizations of information associated with the industrial automation system, as more fully disclosed herein.

The analytics management component 1016 also can comprise a security component 1028 that can facilitate securing data associated with industrial automation systems, customer data, models or virtualizations of industrial automation systems, and industrial automation systems. The security component 1028 can facilitate controlling access to data associated with industrial automation systems, customer data, a model (or a particular (e.g., customized) view of a model), a virtualized industrial automation system (or a particular (e.g., customized) view of a virtualized industrial automation system), and/or an associated industrial automation system (e.g., via the model or virtualized industrial automation system), based at least in part on respective authentication credentials of respective users, respective access rights of users, respective locations of users, etc., as more fully disclosed herein.

The analytics component 1000 also can comprise a processor component 1030 that can operate in conjunction with the other components (e.g., communication component 1002, aggregator component 1004, monitor component 1006, etc.) to facilitate performing the various functions and operations of the analytics component 1000. The processor component 1030 can employ one or more processors (e.g., CPUs, GPUs, FPGAs, etc.), microprocessors, or controllers that can process data, such as industrial data (e.g., device data, process data, asset data, system data, etc.) associated with industrial control systems, customer or client related data, data relating to parameters associated with the analytics component 1000 and associated components, etc., to facilitate determining correlations between respective items of interest associated with an industrial automation system(s), visualizing information relating to the industrial automation system(s) for a user, determining changes to operations or industrial assets associated with the industrial automation system(s) that can facilitate improving operations associated with the industrial automation system(s) and/or achieving desired goals with respect to the industrial automation system(s), and/or determining and providing notifications, recommendations, or instructions relating to the correlations between the respective items of interest or the determined changes to operations or industrial assets associated with the industrial operating system(s), generating or updating a model or virtualization that can represent an industrial automation system, remotely interacting with and/or controlling an industrial automation system using an associated model or virtualized industrial automation system, generating a simulation model of an industrial automation system, performing simulation operations using simulation models performing other analytics-related, visualization-related, model-related, or virtualization-related operations; and can control data flow between the analytics component 1000 and other components associated with the analytics component 1000.

In yet another aspect, the analytics component 1000 can contain a data store 1032 that can store data structures (e.g., user data, metadata); code structure(s) (e.g., modules, objects, classes, procedures), commands, or instructions; industrial data or other data associated with industrial automation systems or industrial enterprises; customer or client related information; data relating to analytics-related, visualization-related, model-related, or virtualization-related services in connection with industrial automation systems; parameter data; algorithms (e.g., algorithm(s) relating to performing analytics, determining correlations between respective items of interest associated with an industrial automation system, generating visualizations of data, ranking correlations in order of priority; algorithm(s) relating to generating or updating model or a virtualized industrial automation system that can represent an industrial automation system, including its industrial devices, industrial processes, industrial assets, network-related devices, interrelationships between such devices, processes, or assets; or algorithm(s) relating to remotely interacting with (e.g., monitoring, tracking, controlling, etc.) an industrial automation system using an associated model or virtualized industrial automation system); defined analytics criteria; defined modeling criteria; defined virtualization criteria; other operation criteria; and so on. In an aspect, the processor component 1030 can be functionally coupled (e.g., through a memory bus) to the data store 1032 in order to store and retrieve data desired to operate and/or confer functionality, at least in part, to the communication component 1002, aggregator component 1004, monitor component 1006, etc., of the analytics component 1000 and/or substantially any other operational aspects of the analytics component 1000. It is to be appreciated and understood that the various components of the analytics component 1000 can communicate data, instructions, or signals between each other and/or between other components associated with the analytics component 1000 as desired to carry out operations of the analytics component 1000. It is to be further appreciated and understood that respective components (e.g., communication component 1002, aggregator component 1004, monitor component 1006, etc.) of the analytics component 1000 each can be a stand-alone unit, can be included within the analytics component 1000 (as depicted), can be incorporated within another component of the analytics component 1000 (e.g., within the analytics management component 1016) or a component separate from the analytics component 1000, and/or virtually any suitable combination thereof, as desired. It also is to be appreciated and understood that respective components (e.g., communication component 1002, aggregator component 1004, monitor component 1006, . . . processor component 1030, data store 1032) of the analytics component 1000 can be shared with and used by another component(s) (e.g., modeler component, virtualization component) or system(s) (e.g., modeler system, virtualization system) or such other component(s) or system(s) can comprise components that can be the same as or similar to that of the analytics component 1000.

In accordance with various embodiments, one or more of the various components of the analytics component 1000 (e.g., communication component 1002, aggregator component 1004, monitor component 1006, etc.) can be electrically and/or communicatively coupled to one another to perform one or more of the functions of the analytics component 1000. In some implementations, one or more components of the analytics component 1000 (e.g., communication component 1002, aggregator component 1004, monitor component 1006, . . . , analytics management component 1016) can comprise software instructions that can be stored in the data store 1032 and executed by the processor component 1030. The analytics component 1000 also can interact with other hardware and/or software components not depicted in FIG. 10. For example, the processor component 1030 can interact with one or more external user interface devices, such as a keyboard, a mouse, a display monitor, a touchscreen, or other such interface devices.

Figure 11:
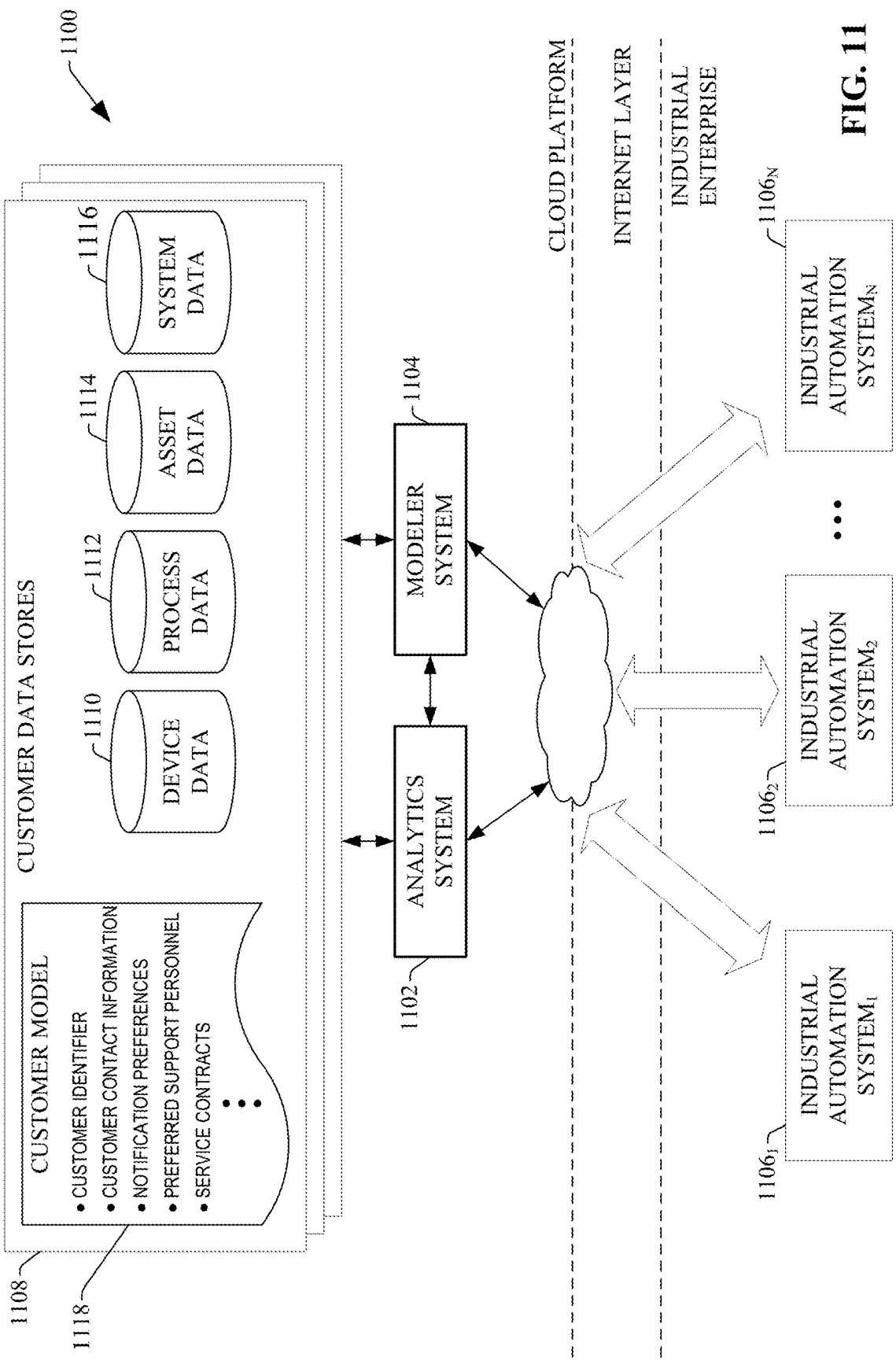
FIG. 11 illustrates a diagram of an example system that can facilitate performing analytics on data or generation of a model that can be representative of the industrial automation system, and the performance of other analytics-related or model-related services based at least in part collection of customer-specific industrial data by a cloud-based analytics system or modeling system, in accordance with various aspects and embodiments of the disclosed subject matter.

FIG. 11 illustrates a diagram of an example system 1100 that can facilitate performing analytics on data or generation of a model that can be representative of the industrial automation system, and the performance of other analytics-related or model-related services based at least in part collection of customer-specific industrial data by a cloud-based analytics system or modeling system, in accordance with various aspects and embodiments of the disclosed subject matter. The system 1100 can include an analytics system 1102 and a modeler system 1104 that respectively can execute as cloud-based services on a cloud platform (e.g., cloud platform 902 of FIG. 9), and can collect data from multiple industrial automation systems, such as industrial automation system₁ 1106₁, industrial automation system₂ 1106₂, and/or (up through) industrial automation system$_N$ 1106$_N$. The industrial automation systems (e.g., 1106₁, 1106₂, 1106$_N$) can comprise different industrial automation systems within a given facility and/or different industrial facilities at diverse geographical locations. Industrial automation systems (e.g., 1106₁, 1106₂, 1106$_N$) also can correspond to different business entities (e.g., different industrial enterprises or customers), wherein the analytics system 1102 or modeler system 1104 can collect and maintain a distinct customer data store 1108 for each customer or business entity.

The analytics system 1102 or modeler system 1104 can organize manufacturing data collected from the industrial automation systems (e.g., 1106₁, 1106₂, 1106$_N$) according to various classes. In the illustrated example, manufacturing data can be classified according to device data 1110, process data 1112, asset data 1114, and system data 1116.

Figure 12:
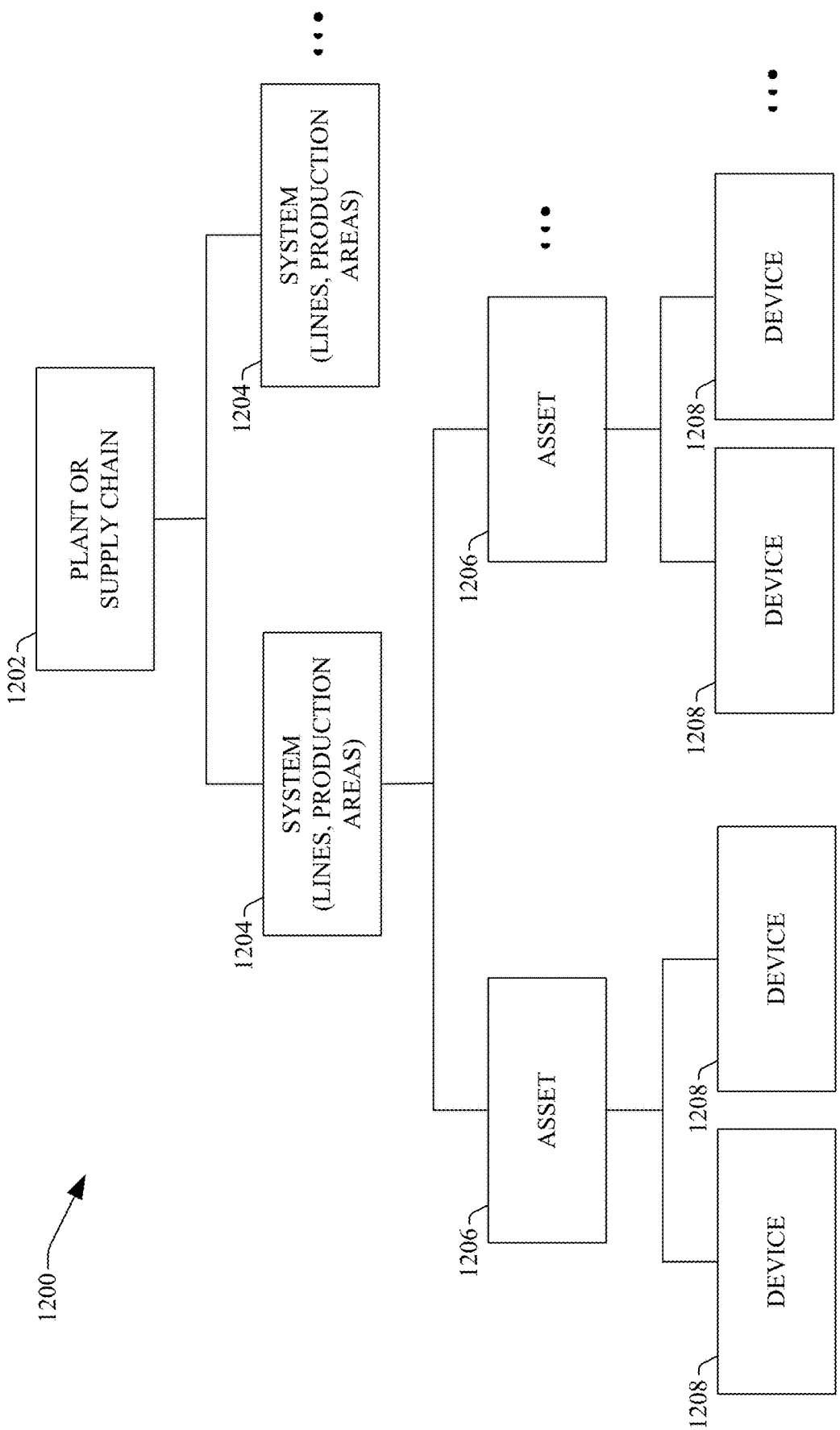
FIG. 12 illustrates a diagram of an example hierarchical relationship between these example data classes.

Referring briefly to FIG. 12, FIG. 12 illustrates a diagram of an example hierarchical relationship 1200 between these example data classes. A given plant or supply chain 1202 can comprise one or more industrial automation systems 1204. The industrial automation systems 1204 can represent the production lines or productions areas within a given plant facility or across multiple facilities of a supply chain. Each industrial automation system 1204 can comprise a number of assets 1206 that can represent the machines and equipment that make up the industrial automation system (e.g., the various stages of a production line). In general, each asset 1206 can comprise one or more industrial devices 1208, which can include, for example, the programmable controllers, motor drives, HMIs, sensors, meters, etc. comprising the asset 1206. The various data classes depicted in FIGS. 11 and 12 are only intended to be exemplary, and it is to be appreciated that any organization of industrial data classes maintained by the analytics system 1102 or modeler system 1104 is within the scope of one or more embodiments of the disclosed subject matter.

Returning again to FIG. 11 (along with FIG. 12), the analytics system 1102 or modeler system 1104 can collect and maintain data from the various devices and assets that make up the industrial automation systems 1204 and can classify the data according to the aforementioned classes for the purposes of facilitating analysis of the data, generation of models of the industrial automation systems (e.g., 1106₁, 1106₂, 1106$_N$), and/or performing other operations by the analytics system 1102 or modeler system 1104. Device data 1110 can comprise device-level information relating to the identity, configuration, and status of the respective devices comprising the industrial automation systems (e.g., 1106₁, 1106₂, 1106$_N$), including but not limited to device identifiers, device statuses, current firmware versions, health and diagnostic data, device documentation, identification and relationship of neighboring devices that interact with the device, etc.

The process data 1112 can comprise information relating to one or more processes or other automation operations carried out by the devices; e.g., device-level and process-level faults and alarms, process variable values (speeds, temperatures, pressures, etc.), and the like.

The asset data 1114 can comprise information generated, collected, determined, or inferred based on data that can be aggregated from various (e.g., multiple) industrial devices over time, which can yield higher asset-level views of the industrial automation systems (e.g., 1106₁, 1106₂, 1106$_N$). Example asset data 1114 can include performance indicators (KPIs) for the respective assets, asset-level process variables, faults, alarms, etc. Since the asset data 1114 can yield a relatively longer term view of asset characteristics relative to the device and process data, the analytics system 1102 or modeler system 1104 can leverage the asset data 1114 to facilitate identifying operational patterns and correlations unique to each asset, among other types of analysis, and this can facilitate generating performance analytics, determining correlations between respective aspects (e.g., internal or intrinsic aspects, external or extrinsic aspects) associated with an industrial automation system(s), generating notifications, recommendations, or instructions relating to the determined correlations, generating respective modeling assets or virtualization assets that can correspond to the respective assets, and generating, updating, using, customizing, etc., of model or a virtualized industrial automation system of the industrial control system based at least in part on the respective models or virtualizations of the respective assets associated with the industrial control system.

The system data 1116 can comprise collected, determined, or inferred information that can be generated based on data that can be aggregated from various (e.g., multiple) assets over time. The system data 1116 can characterize system behavior within a large system of assets, yielding a system-level view of each of the industrial automation systems (e.g., $1106_1$, $1106_2$, $1106_N$). The system data 1116 also can document the particular system configurations in use and industrial operations performed at each of the industrial automation systems (e.g., $1106_1$, $1106_2$, $1106_N$). For example, the system data 1116 can document the arrangement of assets, interconnections between devices, the product being manufactured at a given facility, an industrial process performed by the assets, a category of industry of each industrial system (e.g., automotive, oil and gas, food and drug, marine, textiles, etc.), or other relevant information. Among other functions, this data can be accessed by technical support personnel during a support session so that particulars of the customer's unique system and device configurations can be obtained without reliance on the customer to possess complete knowledge of their assets.

As an example, a given industrial facility can include a packaging line (e.g., the system), which in turn can comprise a number of individual assets (e.g., a filler, a labeler, a capper, a palletizer, etc.). Each asset can comprise a number of devices (e.g., controllers, variable frequency drives, HMIs, etc.). Using an architecture similar to that depicted in FIG. 9, the analytics system 1102 or modeler system 1104 can collect industrial data from the individual devices during operation and can classify the data in the customer data store 1108 according to the aforementioned classifications. Note that some data may be duplicated across more than one class. For example, a process variable classified under process data 1112 also can be relevant to the asset-level view of the system represented by the asset data 1114. Accordingly, such process variables can be classified under both classes. Moreover, subsets of data in one classification can be derived, determined, or inferred based on data under another classification. For example, subsets of system data 1116 that can characterize certain system behaviors can be derived, determined, or inferred based on a long-term analysis of data in the lower-level classifications.

In addition to maintaining the data classes (e.g., 1110, 1112, 1114, 1116), each customer data store also can maintain a customer model 1118 that can contain data specific to a given industrial entity or customer. The customer model 1118 can contain customer-specific information and preferences, which can be leveraged by (e.g., used by) the analytics system 1102 or modeler system 1104 to facilitate generating or updating a model of an industrial automation system, generating or updating a virtualized industrial automation system that can represent an industrial automation system, remotely interacting with (e.g., monitoring, tracking, controlling, etc.) an industrial automation system using an associated virtualized industrial automation system, customizing a view of and/or a data overlay associated with a virtualized industrial automation system for a user, sharing a customized view of and/or a customized data overlay associated with a virtualized industrial automation system for a user, processing virtual notes, generating a simulation model of an industrial automation system, performing simulation operations using simulation models, and/or performing other operations in connection with the industrial automation system, etc. Example information that can be maintained in the customer model 1118 can include a client identifier, client preferences or requirements with regard to production or work orders associated with an industrial automation system, analytics results relating to analysis of data associated with a client, determined correlations relating to an industrial automation system(s), determined notifications, recommendations, and/or instructions relating to the determined correlations, client contact information specifying which plant personnel are to be notified in response to results of a response of the industrial automation system to a user interaction with an associated model or virtualized industrial automation system, notification preferences that can specify how plant personnel are to be notified (e.g., email, mobile phone, text message, etc.), service contracts that are active between the customer and the technical support entity, and other such information. The analytics system 1102 or modeler system 1104 can marry (e.g., associate, link, unite, map, etc.) data collected for each customer with the corresponding customer model 1118 for identification and event handling purposes.

As noted above, industrial data can be migrated (e.g., communicated) from industrial devices to the cloud platform (e.g., comprising the analytics system 1102 and modeler system 1104) using cloud gateway components. To this end, some devices can include integrated cloud gateways that can directly interface each device to the cloud platform. Additionally or alternatively, some configurations can utilize a cloud proxy device that can collect industrial data from multiple devices associated with the industrial automation systems (e.g., $1106_1$, $1106_2$, $1106_N$) and can send (e.g., transmit) the data to the cloud platform. Such a cloud proxy can comprise a dedicated data collection device, such as a proxy server that can share a network (e.g., communication network) with the industrial devices. Additionally or alternatively, the cloud proxy can be a peer industrial device that can collect data from other industrial devices.

Figure 13:
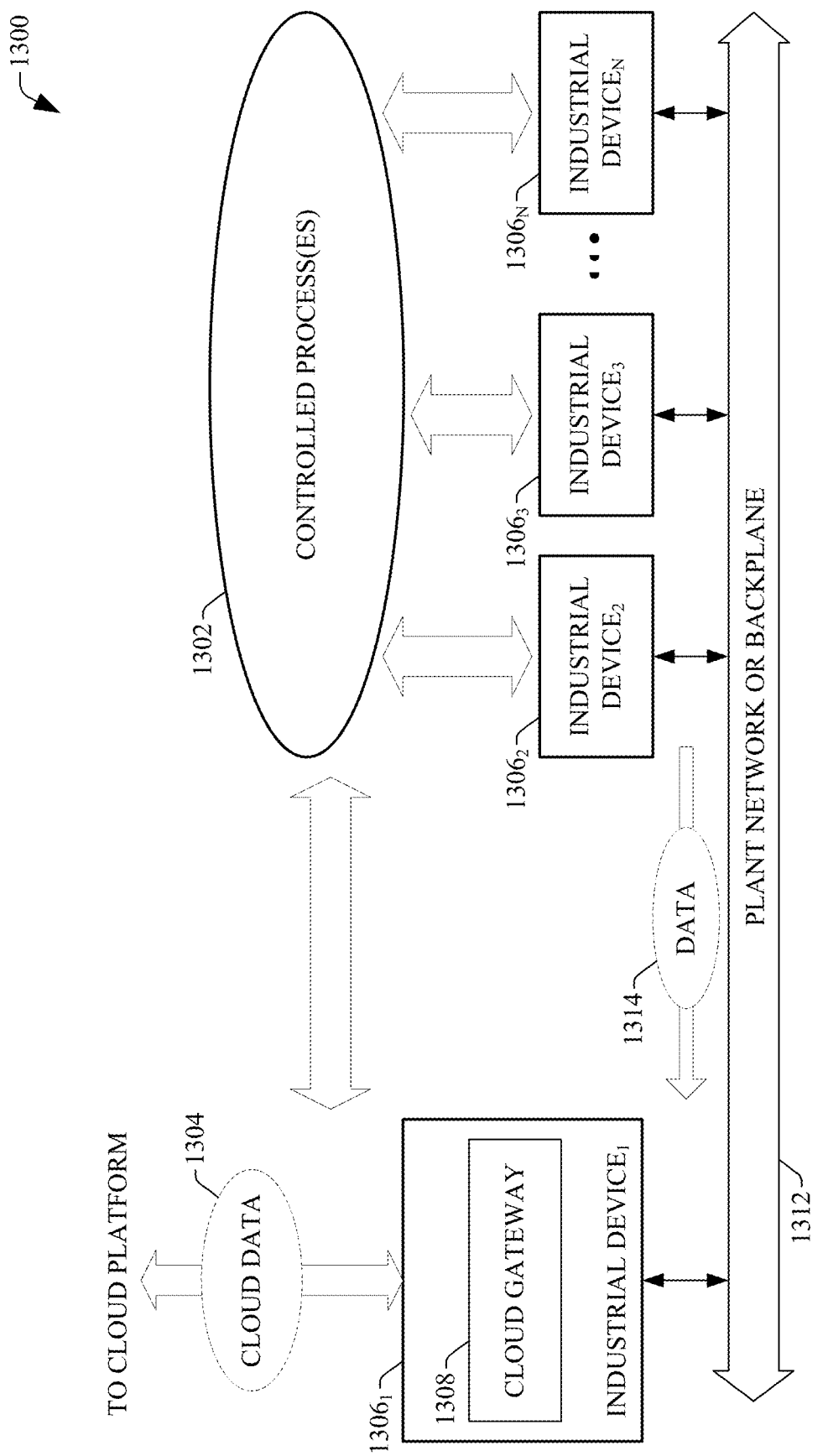
FIG. 13 depicts a block diagram of an example system that can be configured to comprise an industrial device that can act or operate as a cloud proxy for other industrial devices of an industrial automation system to facilitate migrating industrial data to the cloud platform for classification and analysis by an analytics system and a modeler system, in accordance with various aspects and implementations of the disclosed subject matter.
Figure 14:
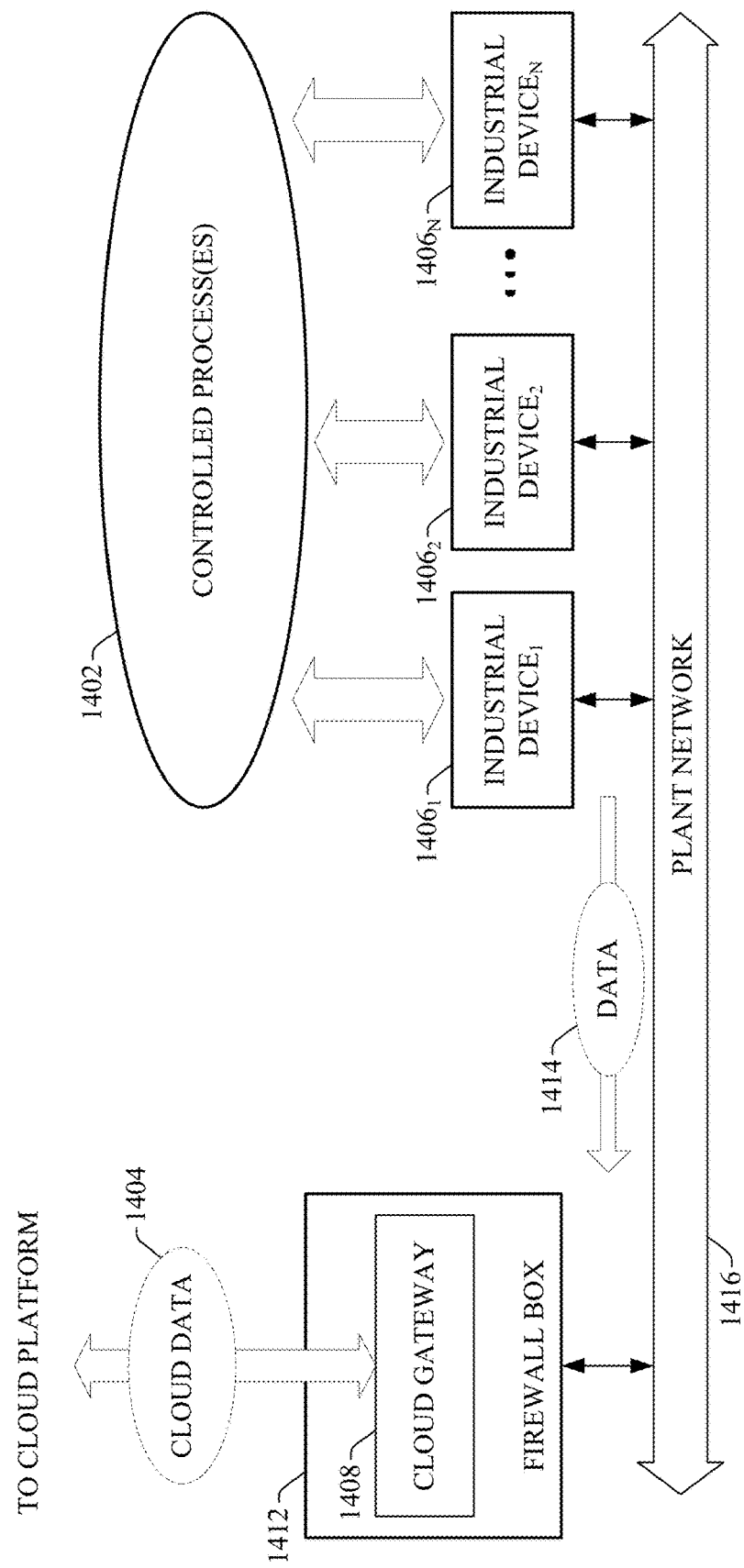
FIG. 14 illustrates a block diagram of an example system that can employ a firewall box that can serve as a cloud proxy for a set of industrial devices to facilitate migrating industrial data to the cloud platform for classification and analysis by an analytics system and a modeler system, in accordance with various aspects and implementations of the disclosed subject matter.

FIGS. 13 and 14 depict block diagrams of example systems 1300 and 1400, respectively, illustrating respective techniques that can facilitate migrating industrial data to the cloud platform via proxy devices for classification and analysis by an analytics system (e.g., comprising an analytics component) and a modeler system (e.g., comprising a modeler component), in accordance with various aspects and implementations of the disclosed subject matter. FIG. 13 depicts system 1300 that can be configured to comprise an industrial device that can act or operate as a cloud proxy for other industrial devices of an industrial automation system. The industrial automation system can comprise a plurality of industrial devices, including industrial device$_1$ 1306$_1$, industrial device$_2$ 1306$_2$, industrial device$_3$ 1306$_3$, and/or (up through) industrial device$_N$ 1306$_N$, that collectively can monitor and/or control one or more controlled processes 1302. The industrial devices 1306$_1$, 1306$_2$, 1306$_3$, and/or (up through) 1306$_N$ respectively can generate and/or collect process data relating to control of the controlled process(es) 1302. For industrial controllers such as PLCs or other automation controllers, this can include collecting data from telemetry devices connected to an industrial controller's I/O, generating data internally based on measured process values, etc.

In the configuration depicted in FIG. 13, industrial device$_1$ 1306$_1$ can act, operate, or function as a proxy for industrial devices 1306$_2$, 1306$_3$, and/or (up through) 1306$_N$, whereby the data 1314 from devices 1306$_2$, 1306$_3$, and/or (up through) 1306$_N$ can be sent (e.g., transmitted) to the cloud via proxy industrial device$_1$ 1306$_1$. Industrial devices 1306$_2$, 1306$_3$, and/or (up through) 1306$_N$ can deliver their respective data 1314 to the proxy industrial device$_1$ 1306$_1$ over the plant network or backplane 1312 (e.g., a Common Industrial Protocol (CIP) network or other suitable network protocol). Using such a configuration, as desired, one industrial device can be interfaced to the cloud platform (via cloud gateway component 1308). In some embodiments, the cloud gateway component 1308 can perform preprocessing on the gathered data prior to migrating the data to the cloud platform (e.g., time stamping, filtering, formatting, normalizing, summarizing, compressing, etc.). The collected and processed data can be pushed (e.g., transmitted) to the cloud platform as cloud data 1304 via cloud gateway component 1308. Once migrated to the cloud platform, the cloud-based analytics system or modeler system can classify the data according to the example classifications described herein and/or can utilize the data to facilitate performing various operations relating to determining respective correlations relating to respective items of interest associated with an industrial automation system(s), generating notifications, recommendations, and/or instructions relating to correlations between respective items of interest associated with the industrial automation system(s) to facilitate improving operations associated with the industrial automation system(s) and/or achieving defined goals associated with the industrial automation system(s), generating desired visualizations (e.g., visualized information displays) relating to the industrial automation system(s) (e.g., visualized information displays that can be customized based on respective items of interest selected by a user), generating or updating models of industrial automation systems, generating or updating virtualized industrial automation systems and using virtualized industrial automation systems (e.g., to facilitate remotely interacting with and/or controlling operation of associated industrial automation systems).

While the proxy device illustrated in FIG. 13 is depicted as an industrial device that itself can perform monitoring, tracking, and/or controlling of a portion of controlled process(es) 1302, other types of devices also can be configured to serve as cloud proxies for multiple industrial devices according to one or more implementations of the disclosed subject matter. For example, FIG. 14 illustrates an example system 1400 that can comprise a firewall box 1412 that can serve as a cloud proxy for a set of industrial devices 1406$_1$, 1406$_2$, and/or (up through) 1406$_N$. The firewall box 1412 can act as a network infrastructure device that can allow the plant network 1416 to access an outside network such as the Internet, while also providing firewall protection that can prevent unauthorized access to the plant network 1416 from the Internet. In addition to these firewall functions, the firewall box 1412 can include a cloud gateway component 1408 that can interface the firewall box 1412 with one or more cloud-based services (e.g., analytics services, visualization services (e.g., services for information visualization and customization), model-related services, virtualization-related services, data collection services, data storage services, etc.). In a similar manner to the proxy industrial device 1306$_1$ of FIG. 13, the firewall box 1412 of FIG. 14 can collect industrial data 1414 from including industrial devices 1406$_1$, industrial device$_2$ 1406$_2$, and/or (up through) industrial device$_N$ 1406$_N$, which can monitor and control respective portions of controlled process(es) 1402. Firewall box 1412 can include a cloud gateway component 1408 that can apply appropriate pre-processing to the gathered industrial data 1414 prior to pushing (e.g., communicating) the data to the cloud-based analytics system or modeler system as cloud data 1404. Firewall box 1412 can allow industrial devices 1406$_1$, 1406$_2$, and/or (up through) 1406$_N$ to interact with the cloud platform without directly exposing the industrial devices to the Internet.

In some embodiments, the cloud gateway 1308 of FIG. 13 or cloud gateway 1408 of FIG. 14 can tag the collected industrial data (e.g., 1314 or 1414) with contextual metadata prior to pushing the data as cloud data (e.g., 1304 or 1404) to the cloud platform. Such contextual metadata can include, for example, a time stamp, a location of the device at the time the data was generated, or other contextual information. In another example, some cloud-aware devices can comprise smart devices capable of determining their own context within the plant or enterprise environment. Such devices can determine their location within a hierarchical plant context or device topology. Data generated by such devices can adhere to a hierarchical plant model that can define multiple hierarchical levels of an industrial enterprise (e.g., a workcell level, a line level, an area level, a site level, an enterprise level, etc.), such that the data can be identified (e.g., by the analytics system or modeler system) in terms of these hierarchical levels. This can allow a common terminology to be used across an entire industrial enterprise to identify devices and their associated data. Cloud-based applications and services that model an enterprise according to such an organizational hierarchy can represent industrial controllers, devices, machines, or processes as data structures (e.g., type instances) within this organizational hierarchy to provide context for data generated by respective devices within the enterprise relative to the enterprise as a whole. Such a convention can replace the flat name structure that is employed by some industrial applications.

In some embodiments, the cloud gateway 1308 of FIG. 13 or cloud gateway component 1408 of FIG. 14 can comprise uni-directional "data only" gateways that can be configured only to move data from the premises (e.g., industrial facility) to the cloud platform. Alternatively, the cloud gateway components 1308 and 1408 can comprise bi-directional "data and configuration" gateways that additionally can be configured to receive configuration or instruction data from services running on the cloud platform. Some cloud gateways can utilize store-and-forward technology that can allow the gathered industrial data (e.g., 1314 or 1414) to be temporarily stored locally on storage associated with the cloud gateway component (e.g., 1308 or 1408) in the event that communication between a gateway and the cloud platform is disrupted. In such events, the cloud gateway component (e.g., 1308 or 1408) can forward (e.g., communicate) the stored data to the cloud platform when the communication link is re-established.

To ensure a rich and descriptive set of data for analysis purposes, the cloud-based analytics system or modeler system can collect device data in accordance with one or more standardized device models. To this end, a standardized device model can be developed for each industrial device. Device models can profile the device data that is available to be collected and maintained by the analytics system or modeler system.

Figure 15:
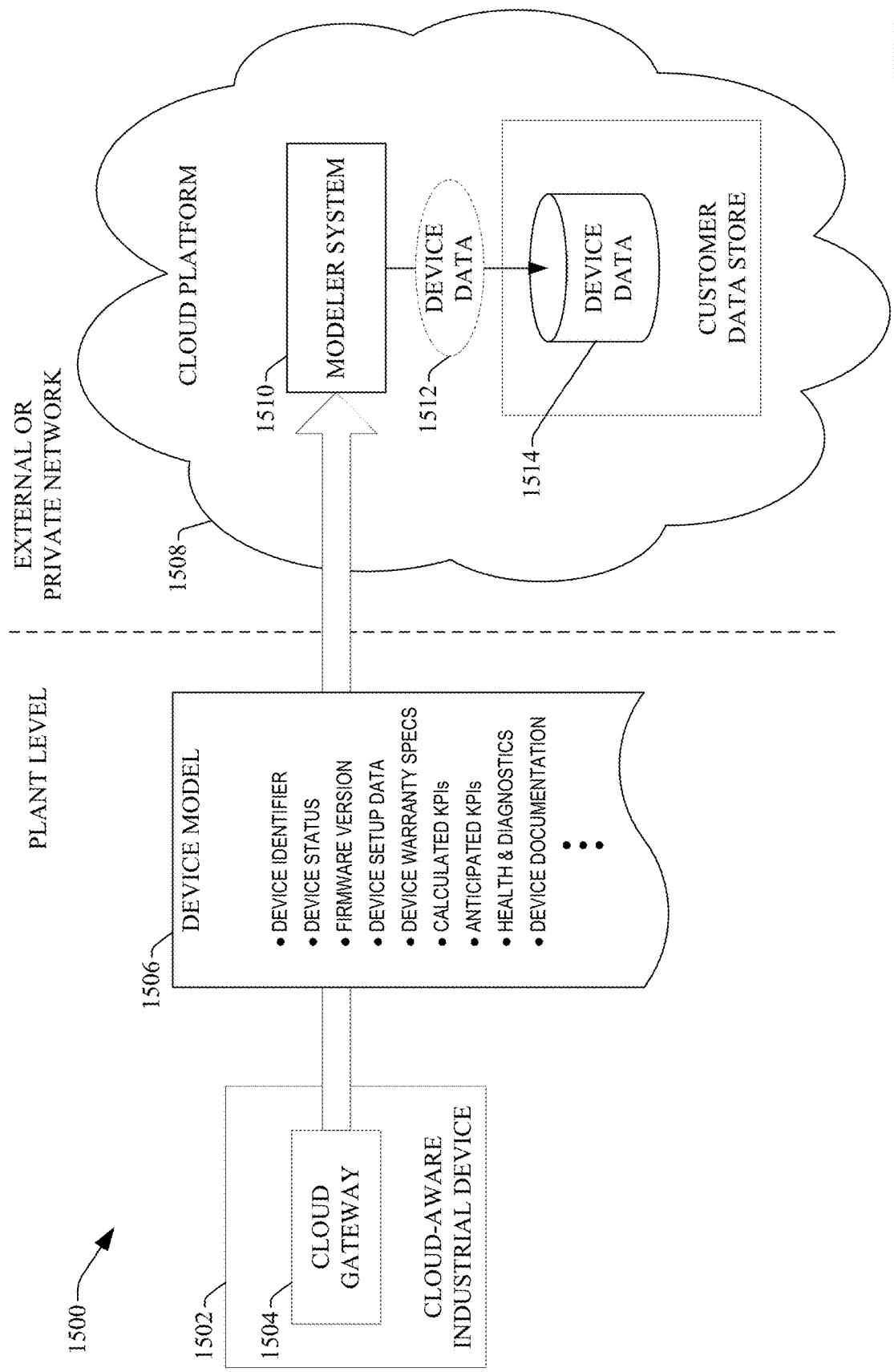
FIG. 15 illustrates a block diagram of an example device model according to various aspects and implementations of the disclosed subject matter.

FIG. 15 illustrates a block diagram of an example device model 1500 according to various aspects and implementations of the disclosed subject matter. In the illustrated example model 1500, the device model 1506 can be associated with a cloud-aware industrial device 1502 (e.g., a programmable logic controller, a variable frequency drive, an HMI, a vision camera, a barcode marking system, etc.). As a cloud-aware device, the industrial device 1502 can be configured to automatically detect and communicate with the cloud platform 1508 upon installation at a plant facility, simplifying integration with existing cloud-based data storage, analysis, and applications (e.g., as performed by the analytics systems, modeler systems, and/or virtualization systems described herein). When added to an existing industrial automation system, the industrial device 1502 can communicate with the cloud platform and can send identification and configuration information in the form of the device model 1506 to the cloud platform 1508. The device model 1506 can be received by the modeler system 1510 (or analytics system (not shown in FIG. 15)), which can update the customer's device data 1514 based on the device model 1506. In this way, the modeler system 1510 (or analytics system) can leverage the device model 1506 to facilitate integrating the new industrial device 1502 into the greater system as a whole. This integration can include the modeler system 1510 (or analytics system) updating cloud-based applications or services to recognize the new industrial device 1502, determining one or more correlations between the new industrial device 1502 and other aspects (e.g., industrial assets, extrinsic events or conditions) associated with the industrial automation system, adding the new industrial device 1502 to a dynamically updated data model of the customer's industrial enterprise or plant, modifying a model to integrate, incorporate, or include a model of the new industrial device 1502 based at least in part on the identification and configuration information (or other data), or modifying a virtualization industrial automation system associated with the industrial automation system to integrate, incorporate, or include a virtualized version of the new industrial device 1502 based at least in part on the identification and configuration information (or other data), determining or predicting a response of the modified industrial automation system based at least in part on a modified model or modified simulation model that integrates the new industrial device 1502, making other devices on the plant floor aware of the new industrial device 1502, or other desired integration functions. Once deployed, some data items comprising the device model 1506 can be collected and monitored by the modeler system 1510 (or analytics system) on a real-time or near real-time basis.

The device model 1506 can comprise such information as a device identifier (e.g., model and serial number) associated with the industrial device 1502, status information for the industrial device 1502, a currently installed firmware version associated with the industrial device 1502, device setup data associated with the industrial device 1502, warranty specifications associated with the industrial device 1502, calculated and/or anticipated KPIs associated with the industrial device 1502 (e.g., mean time between failures), health and diagnostic information associated with the industrial device 1502, device documentation, or other such parameters.

Figure 16:
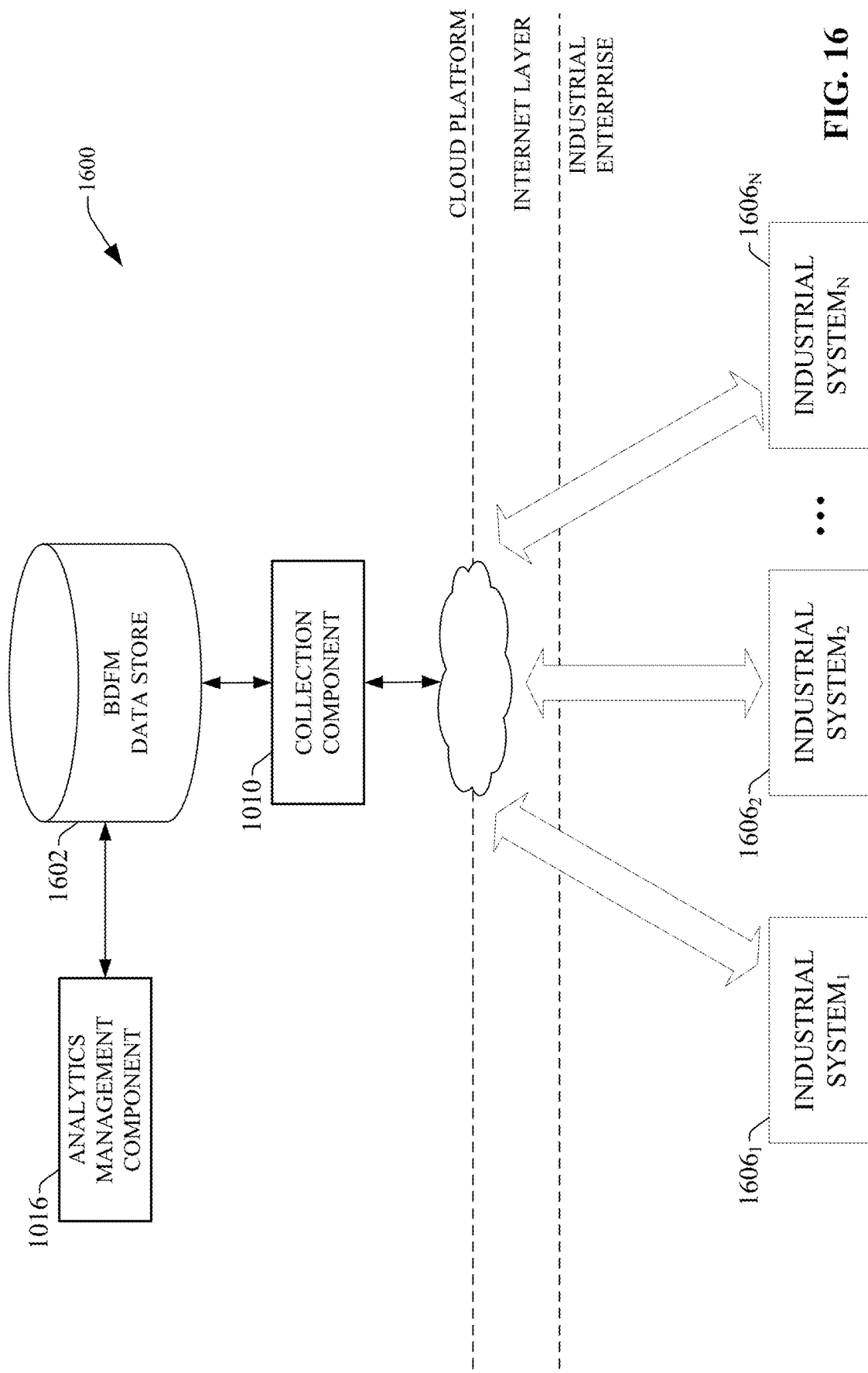
FIG. 16 presents a block diagram of an example system that can facilitate collection of data from devices and assets associated with respective industrial automation systems for storage in cloud-based data storage, in accordance with various aspects and implementations of the disclosed subject matter.

In addition to maintaining individual customer-specific data stores for each industrial enterprise, the modeler system (e.g., cloud-based modeler system), or analytics system (e.g., cloud-based analytics system), also can feed (e.g., transmit) sets of customer data to a global data storage (referred to herein as cloud-based data store or Big Data for Manufacturing (BDFM) data store) for collective big data analysis in the cloud platform (e.g., by the virtualization system). FIG. 16 presents a block diagram of an example system 1600 that can facilitate collection of data from devices and assets associated with respective industrial automation systems for storage in cloud-based data storage, in accordance with various aspects and implementations of the disclosed subject matter. As illustrated in FIG. 16, the collection component 1010 of the modeler system (e.g., as facilitated by the interface component 1012) can collect data from devices and assets comprising respective different industrial automation systems, such as industrial automation system$_1$ 1606$_1$, industrial automation system$_2$ 1606$_2$, and/or (up through) industrial automation system$_N$ 1606$_N$, for storage in a cloud-based BDFM data store 1602. In some embodiments, data maintained in the BDFM data store 1602 can be collected anonymously with the consent of the respective customers. For example, customers can enter into a service agreement with a technical support entity whereby the customer can agree to have their device and asset data collected by the analytics system, modeler system, and/or virtualization system in exchange for analytics-related services, modeling-related services, and/or virtualization-related services or a credit towards analytics-related services, modeling-related services, and/or virtualization-related services. The data maintained in the BDFM data store 1602 can include all or portions of the classified customer-specific data described in connection with FIG. 11, as well as additional data (e.g., derived, determined, or inferred data). The analytics component 1000 (e.g., aggregator component 1004, analytics management component 1016, etc.) or another component of the analytics system can organize the collected data stored in the BDFM data store 1602 according to device type, system type, application type, applicable industry, or other relevant categories. The analytics management component 1016 can analyze data stored in the resulting multi-industry, multi-customer data store (e.g., BDFM data store 1602) to facilitate learning, determining, or identifying industry-specific, device-specific, and/or application-specific trends, patterns, thresholds (e.g., device-related thresholds, network-related thresholds, etc.), industrial-automation-system interrelationships between devices or assets, etc., associated with the industrial automation systems associated with the cloud platform. In general, the analytics management component 1016 can perform a data analysis (e.g., big data analysis) on data (e.g., the multi-industrial enterprise data) maintained (e.g., stored in) the BDFM data store 1602 to facilitate learning, determining, identifying, characterizing, virtualizing, simulating, and/or emulating operational industrial-automation-system interrelationships, correlations, thresholds, trends, or patterns associated with industrial automation systems as a function of industry type, application type, equipment in use, asset configurations, device configuration settings, or other types of variables.

For example, it can be known that a given industrial asset (e.g., a device, a configuration of device, a machine, etc.) can be used across different industries for different types of industrial applications. Accordingly, the analytics management component 1016 can identify a subset of the global data stored in BDFM data store 1602 relating to the asset or asset type, and perform analysis on this subset of data to determine how the asset or asset type performs over time and under various types of operating conditions for each of multiple different industries or types of industrial applications. The analytics management component 1016 also can determine the operational behavior of the asset or asset type over time and under various types of operating conditions for each of different sets of operating constraints or parameters (e.g. different ranges of operating temperatures or pressures, different recipe ingredients or ingredient types, etc.). The analytics management component 1016 can leverage (e.g., use) a large amount of historical data relating to the asset or asset type that has been gathered (e.g., collected and/or aggregated) from many different industrial automation systems to facilitate learning or determining common operating characteristics of many diverse configurations of industrial assets or asset types at a relatively high degree of granularity and under many different operating contexts. The analytics management component 1016 can use the learned or determined operating characteristics relating to the industrial assets or asset types to facilitate determining correlations between respective items of interest associated with an industrial automation system(s), visualizing information relating to the industrial automation system(s) for a user, determining changes to operations or industrial assets associated with the industrial automation system(s) that can facilitate improving operations associated with the industrial automation system(s) and/or achieving desired goals with respect to the industrial automation system(s), and/or determining and providing notifications, recommendations, or instructions relating to the correlations between the respective items of interest or the determined changes to operations or industrial assets associated with the industrial automation system. The modeler component and/or virtualization component can use the learned or determined operating characteristics relating to the industrial assets or asset types to facilitate generating, updating, and/or using modeled versions or virtualized versions of the industrial assets or asset types when employed in an industrial automation system to facilitate generating, updating, and/or using a model of an industrial automation component or a virtualized industrial automation system that can be based at least in part on the modeled or virtualized versions of the industrial assets or asset types.

Figure 17:
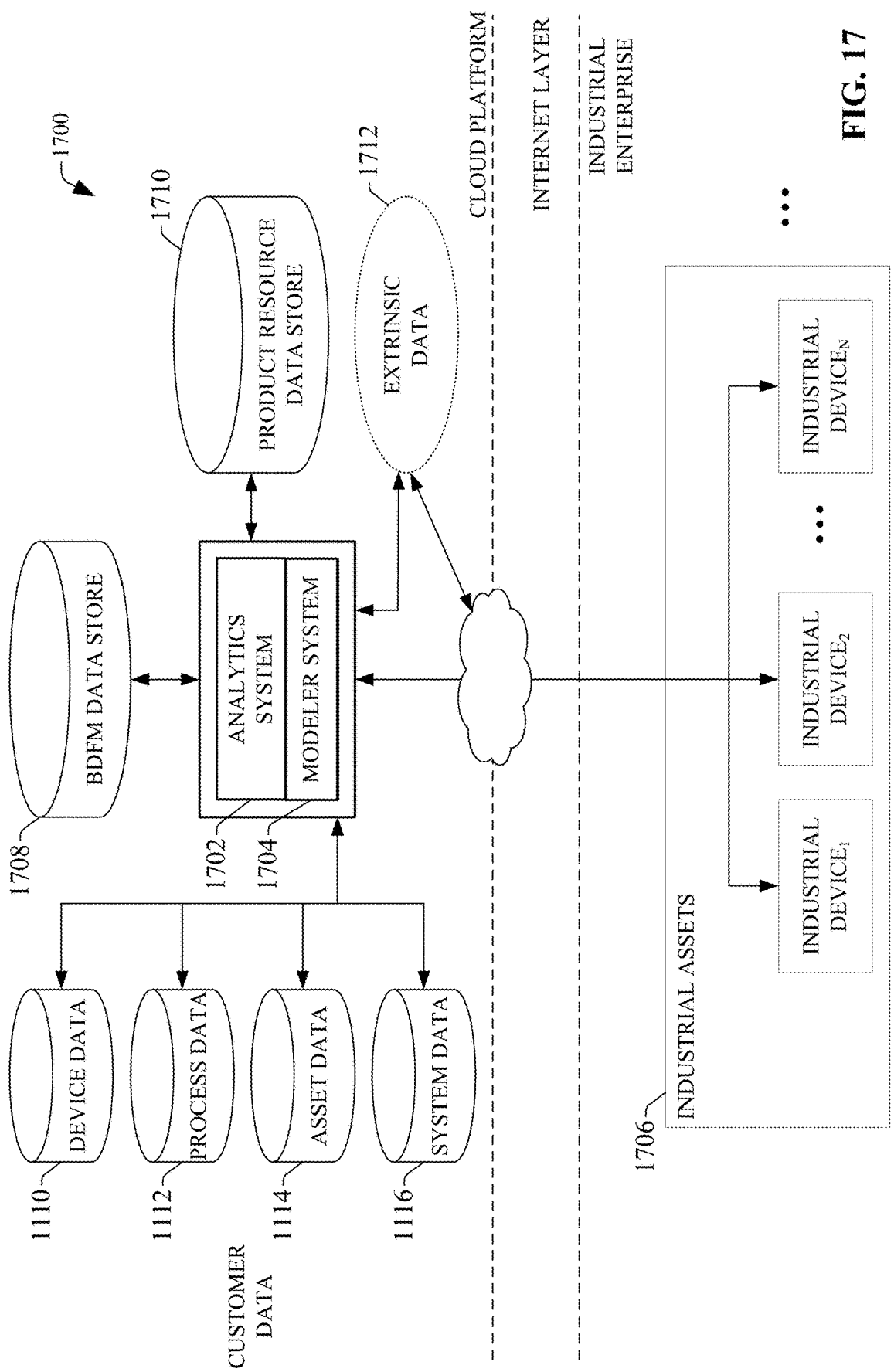
FIG. 17 illustrates a block diagram of a cloud-based system that can employ a analytics system and modeler system to facilitate performing or providing analytics-related services and modeler-related services associated with industrial automation systems, in accordance with various aspects and embodiments of the disclosed subject matter.

FIG. 17 illustrates a block diagram of a cloud-based system 1700 that can employ a analytics system and modeler system to facilitate performing or providing analytics-related services and modeler-related services associated with industrial automation systems, in accordance with various aspects and embodiments of the disclosed subject matter. As disclosed herein, the analytics system 1702 and modeler system 1704 can collect, maintain, and monitor customer-specific data (e.g. device data 1110, process data 1112, asset data 1114, and system data 1116) relating to one or more industrial assets 1706 of an industrial enterprise. In addition, the analytics system 1702 and modeler system 1704 can collect and organize industrial data anonymously (with customer consent) from multiple industrial enterprises, and can store such industrial data in a BDFM data store 1708 for collective analysis by the analytics system 1702 and/or modeler system 1704, for example, as described herein.

The analytics system 1702 and modeler system 1704 also can collect product resource information and maintain (e.g., store) the product resource information in the cloud-based product resource data store 1710. In general, the product resource data store 1710 can maintain up-to-date information relating to specific industrial devices or other vendor products in connection with industrial automation systems. Product data stored in the product resource data store 1710 can be administered by the analytics system 1702 and/or modeler system 1704 and/or one or more product vendors or OEMs. Exemplary device-specific data maintained by the product resource data store 1710 can include product serial numbers, most recent firmware revisions, preferred device configuration settings and/or software for a given type of industrial application, or other such vendor-provided information.

The system depicted in FIG. 17 can provide analytics-related services and model-related services to subscribing customers (e.g., owners of industrial assets 1706). For example, customers can enter an agreement with a product vendor or technical support entity to allow their system data to be gathered anonymously and fed into (e.g., communicated to and stored in) the BDFM data store 1708, and this thereby can expand the store of global data available for collective analysis by the analytics system 1702 and/or the modeler system 1704. In exchange, the vendor or technical support entity can agree to provide analytics-related services and/or model-related services (e.g., customized model-related services) to the customer (e.g., real-time or near real-time system monitoring; real-time or near real-time performance of analytics on data and determination of correlations relating to an industrial automation system; real-time or near real-time generation, updating, and/or use of a model or a virtualized industrial automation system associated with an industrial automation system, etc.). Alternatively, the customer can subscribe to one or more available analytics-related services or model-related services that can be provided by the analytics system 1702 or modeler system 1704, and optionally can allow their system data to be maintained in the BDFM data store 1708. In some embodiments, a customer can be given an option to subscribe to analytics-related services or model-related services without permitting their data to be stored in the BDFM data store 1708 for collective analysis with data from other systems (e.g., industrial automation systems). In such cases, the customer's data will only be maintained as customer data (e.g., in customer data store 1108) for the purposes of real-time or near-real time performance of analytics on data, visualization of information relating to an industrial automation system, and/or determination of recommendations or instructions to facilitate improving operations associated with the industrial automation system, relating to that particular customer, and/or real-time or near real-time generation, updating, and/or use of a model or a virtualized industrial automation system associated with an industrial automation system relating to that particular customer, and the collected customer data will be analyzed in connection with data stored in the BDFM data store 1708 and the product resource data store 1710 without that customer data being migrated for storage in the BDFM data store 1708 for long-term storage and analysis. In another exemplary agreement, customers can be offered a discount on analytics-related services or model-related services in exchange for allowing their system data to be anonymously migrated to the BDFM data store 1708 for collective analysis by the analytics system 1702 or modeler system 1704.

In accordance with various aspects, the customer-specific data can include device and/or asset level faults and alarms, process variable values (e.g., temperatures, pressures, product counts, cycle times, etc.), calculated or anticipated key performance indicators for the customer's various assets, indicators of system behavior over time, and other such information. The customer-specific data also can include documentation of firmware versions, configuration settings, and software in use on respective devices of the customer's industrial assets. Moreover, the analytics system 1702 or modeler system 1704 can take into consideration customer information encoded in customer model 1118, which can have a bearing on inferences made by the analytics system 1702 or modeler system 1704 based at least in part on the analysis (e.g., big data analysis) stored in the BDFM data store 1708. For example, customer model 1118 may indicate a type of industry that is the focus of the customer's business (e.g., automotive, food and drug, oil and gas, fibers and textiles, power generation, marine, etc.). Knowledge of the customer's industry can facilitate enabling the analytics system 1702 or modeler system 1704 to correlate the customer-specific data with data relating to similar systems and applications in the same industry, as documented by the data stored in the BDFM data store 1708.

Taken together, customer-specific data and a customer model (e.g., 1118) can facilitate accurately modeling the customer's industrial enterprise at a highly granular level, from high-level system behavior over time down to the device and software level. The analyzing (e.g., by the analytics system 1702 or modeler system 1704) of this customer-specific data in view of global industry-specific and application-specific trends learned via analysis of data stored in the BDFM data store 1708, as well as vendor-provided device information maintained in the product resource data store 1710, can facilitate real-time or near-real time performance of analytics on data, visualization of information relating to an industrial automation system (e.g., customized visualization of information based on correlations between respective items of interest associated with the industrial automation system), and/or determination of recommendations or instructions to facilitate improving operations associated with the industrial automation system, and can facilitate real-time or near real-time generation, updating, and/or use of a model or a virtualized industrial automation system associated with an industrial automation system to facilitate real-time or near real-time remote interaction with (e.g., monitoring, tracking, controlling, etc., of) the industrial automation system using the model or the virtualized industrial automation system (e.g., based at least in part on user interactions with the virtualized industrial automation system by a user via a communication device).

In some implementations, the system 1700 (e.g., via the collection component, analytics system 1702, or modeler system 1704) also can receive, collect, or capture extrinsic data 1712 from one or more sources (e.g., external data sources). The analytics system 1702 or modeler system 1704 can use or leverage the extrinsic data 1712 received, collected, or captured from sources external to a customer's industrial enterprise, wherein the extrinsic data 1712 can have relevance to operation of the customer's industrial automation system(s). Example extrinsic data 1712 can include, for example, energy cost data, material cost and availability data, transportation schedule information from companies that provide product transportation services for the customer, market indicator data, web site traffic statistics, information relating to known information security breaches or threats, or other information relevant to the operation of the customer's industrial automation system(s). The analytics system 1702 or modeler system 1704 can retrieve extrinsic data 1712 from substantially any data source, such as, e.g., servers or other data storage devices linked to the Internet, cloud-based storage that maintains extrinsic data of interest, or other sources. The analytics system 1702 or modeler system 1704 can analyze the extrinsic data 1712 and/or other data (e.g., user-related data associated with users (e.g., operators, managers, technicians, other workers) associated with the industrial automation system(s), device data 1110, process data 1112, asset data 1114, system data 1116, etc.) to facilitate performing analytics-related services, visualization-related services, modeling-related services, virtualization-related services, or other services in connection with the industrial automation system(s).

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 18-22 illustrate various methods in accordance with one or more embodiments of the subject application. While, for purposes of simplicity of explanation, the one or more methods shown herein are shown and described as a series of acts, it is to be understood and appreciated that the disclosed subject matter is not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the disclosed subject matter. Furthermore, interaction diagram(s) may represent methods, in accordance with the subject disclosure when disparate entities enact disparate portions of the methods. Further yet, two or more of the disclosed example methods can be implemented in combination with each other, to accomplish one or more features or advantages described herein.

Figure 18:
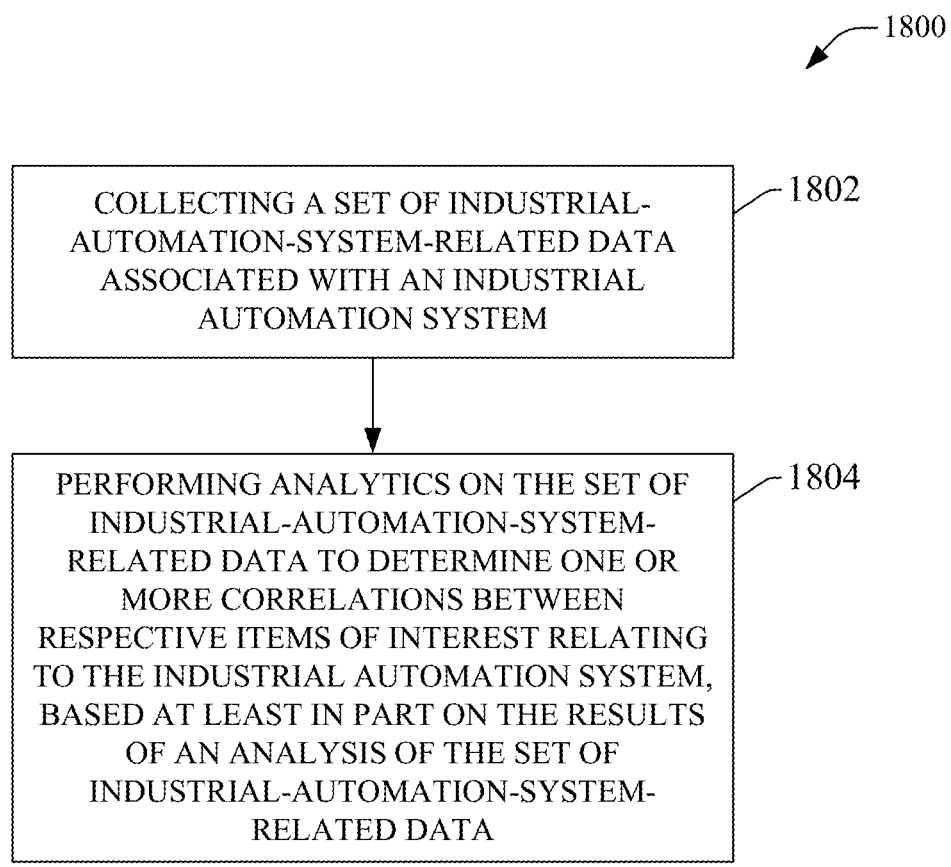
FIG. 18 illustrates a flow diagram of an example method that can perform analytics on industrial-automation-system-related data to determine correlations between respective items of interest associated with an industrial automation system associated with an industrial enterprise, in accordance with various implementations and embodiments of the disclosed subject matter.

FIG. 18 illustrates a flow diagram of an example method 1800 that can perform analytics on industrial-automation-system-related data (e.g., cloud-based data) to determine correlations between respective items of interest associated with an industrial automation system associated with an industrial enterprise, in accordance with various implementations and embodiments of the disclosed subject matter. The method 1800 can be implemented by an analytics system that can comprise an analytics component that can comprise or be associated with a collection component, a data store, and/or an analytics management component, etc. All or a desired portion of the analytics system can reside in a cloud platform.

At 1802, a set of industrial-automation-system-related data associated with an industrial automation system can be collected. The collection component can obtain, collect, or otherwise receive industrial-automation-system-related data and can store such data in a cloud-based data store. The collection component also can receive other data, including other industrial-automation-system-related data from another (e.g., a related) industrial automation system or one or more extrinsic data sources.

The set of industrial-automation-system-related data can comprise, for example, device-related data (e.g., industrial device-related data, network device-related data), asset-related data, process-related data (e.g., industrial-automation-process-related data), data relating to users associated with the industrial automation system (e.g., role information, user preferences, etc.), and/or other industrial-automation-system-related data associated with an industrial enterprise.

The industrial-automation-system-related data can be migrated (e.g., communicated) to the cloud platform using one or more cloud gateways (e.g., communication gateway components) that can serve as uni-directional or bi-directional communication interfaces between industrial devices or assets of the industrial automation system and the cloud platform. The device-related data, asset-related data, process-related data, and/or other industrial-automation-system-related data can be stored in the cloud-based data store in association with identification information, such as, for example, a customer identifier and other customer-specific information.

At 1804, analytics can be performed on the set of industrial-automation-system-related data to determine one or more correlations between respective items of interest relating to the industrial automation system, based at least in part on the results of an analysis of the set of industrial-automation-system-related data, to facilitate improving (e.g., optimizing, making more acceptable) performance of the operation of the industrial automation system or associated users (e.g., employees). The analytics management component can access the cloud-based data store and can receive (e.g., collect, obtain, etc.) the set of industrial-automation-system-related data from the cloud-based data store. The analytics management component can analyze the set of industrial-automation-system-related data to generate analysis results. The analytics management component can determine or identify one or more correlations between respective items of interest relating to the industrial automation system, based at least in part on the analysis results. The respective items of interest can relate to internal factors (factors within the industrial facility comprising the industrial automation system), such as, for example, an industrial device, industrial process, other type of industrial asset, network-related device, device or process parameters, material inventory within the industrial facility, production output, employee behavior or interaction with the industrial automation system, asset maintenance, repair, or replacement, or asset downtime; or external (e.g., extrinsic) factors, such as, for example, material inventory of a supplier, weather conditions (e.g., weather conditions in the area of the industrial facility, weather conditions that can affect consumer demand for a product, weather conditions that can affect the supplying of materials for the product to the industrial facility), demand for a product by consumers, energy costs associated with producing a product, transportation costs relating to transporting product or product-related materials, or governmental policies or laws.

Figure 19:
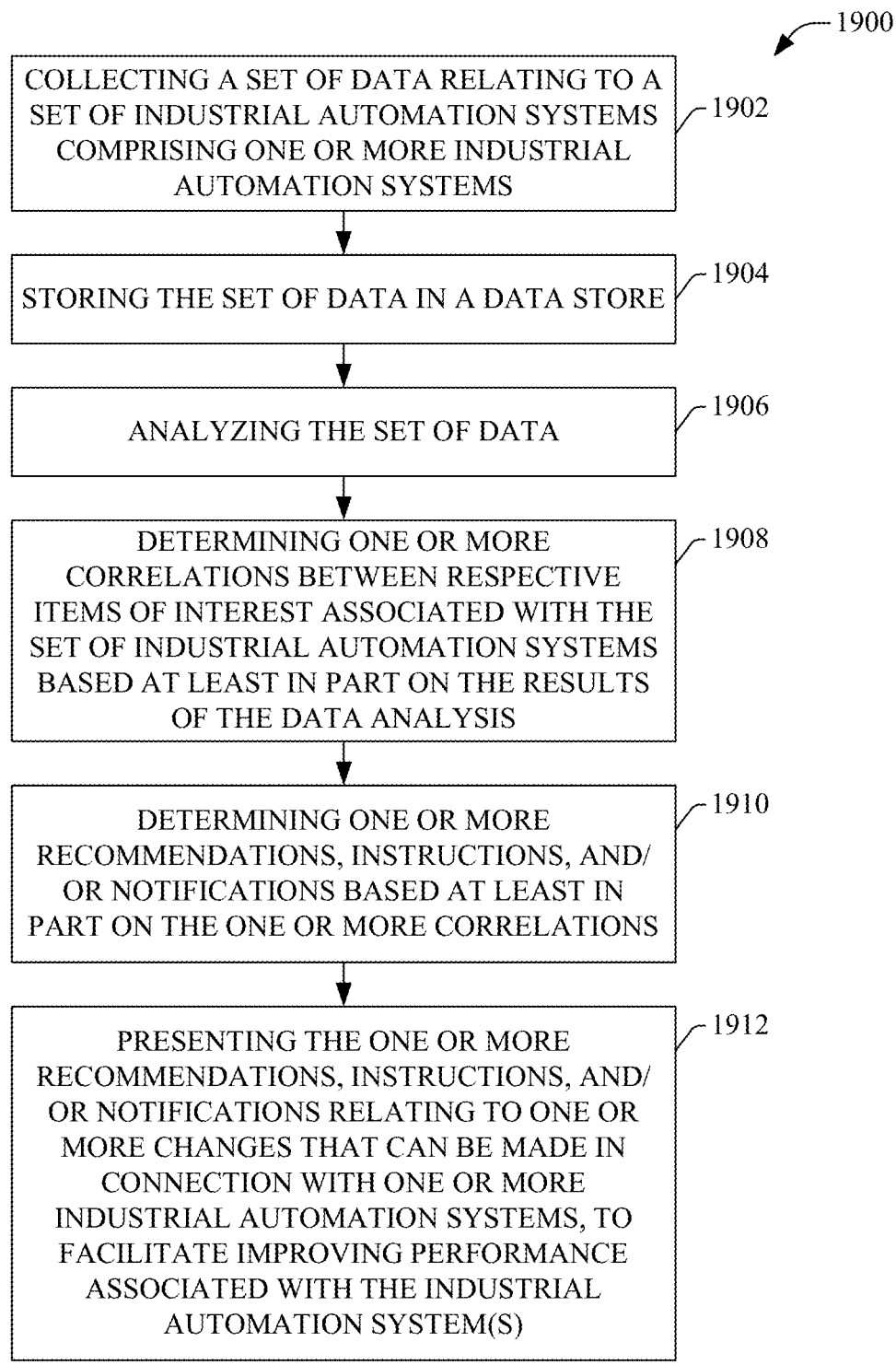
FIG. 19 depicts a flow diagram of another example method that can perform analytics on industrial-automation-system-related data to determine correlations between respective items of interest associated with a set of industrial automation systems associated with an industrial enterprise and generate recommendations, notifications, or instructions relating to the correlations to facilitate improving operation of the set of industrial automation systems, in accordance with various implementations and embodiments of the disclosed subject matter.

FIG. 19 depicts a flow diagram of another example method 1900 that can perform analytics on industrial-automation-system-related data (e.g., cloud-based data) to determine correlations between respective items of interest associated with a set of industrial automation systems associated with an industrial enterprise and generate recommendations, notifications, or instructions relating to the correlations to facilitate improving operation of the set of industrial automation systems, in accordance with various implementations and embodiments of the disclosed subject matter. The method 1900 can be implemented by an analytics system that can comprise an analytics component that can comprise or be associated with a collection component, a data store, and/or an analytics management component, etc. All or a desired portion of the analytics system can reside in a cloud platform.

At 1902, a set of data (e.g., industrial-automation-system-related data) relating to a set of industrial automation systems comprising one or more industrial automation systems can be collected. The analytics component can monitor and track operations of the industrial automation systems of the set of industrial automation systems, employee interactions with the industrial automation systems, and/or extrinsic factors (e.g., weather conditions, supplying of materials for products, product demand, transportation costs associated with products, energy costs) with respect to the set of industrial automation systems, etc. Based at least in part on the monitoring and tracking, data (e.g., industrial-automation-system-related data) can be obtained by, migrated, or otherwise received by the cloud platform. The collection component can collect the set of data relating to the set of industrial automation systems. The set of data can comprise data relating to industrial devices, industrial processes, other industrial assets, and/or network-related devices, etc., associated with the one or more industrial automation systems of the set of industrial automation systems. The set of industrial automation systems can be associated with one or more industrial enterprises.

Respective subsets of the data can be obtained from respective industrial devices, industrial processes, other industrial assets, and/or network-related devices via one or more cloud gateway devices (e.g., respective cloud gateways integrated with the respective devices, processes, assets, etc.). For instance, the analytics component or modeler component can discover the respective industrial devices, industrial processes, other industrial assets, and/or network-related devices in the industrial automation system, and the respective industrial devices, industrial processes, other industrial assets, and/or network-related devices can provide their respective subsets of data to the analytics component or modeler component via the one or more cloud gateway devices, in response to being polled (e.g., queried) by the analytics component or modeler component.

At 1904, the set of data can be stored in a data store. The collection component can facilitate storing the set of data in the data store, wherein the data store can be a cloud-based data store located in the cloud platform.

At 1906, the set of data can be analyzed. The analytics management component can access the cloud-based data store and can retrieve, obtain, read the set of data from the cloud-based data store. The analytics management component can analyze the set of data (e.g., perform big data analysis on the set of data) to facilitate determining one or more correlations between respective items of interest associated with the set of industrial automation systems, wherein the respective items of interest can relate to internal factors with respect to the set of industrial automation systems or extrinsic factors with respect to the set of industrial automation systems.

At 1908, one or more correlations can be determined between respective items of interest associated with the set of industrial automation systems based at least in part on the results of the data analysis. The analytics management component can determine one or more correlations between respective items of interest associated with the set of industrial automation systems based at least in part on the data analysis results. For example, based at least in part on the data analysis results, the analytics management component can determine that there is a correlation between a first item of interest, e.g., a parameter setting (e.g., a speed parameter value for the motor)) for an industrial device (e.g., motor) of an industrial automation system, and a second item of interest, e.g., product breakage and/or misalignment of products on a conveyor. The respective items of interest, and the determined correlations, also can span across multiple industrial automation systems and/or can relate to extrinsic factors that can be external to an industrial automation system.

At 1910, one or more recommendations, instructions, and/or notifications can be determined based at least in part on the one or more correlations. Based at least in part on the one or more correlations, the analytics management component can determine one or more changes that can be made in connection with one or more industrial automation systems of the set of industrial automation systems to facilitate improving operation of the set of industrial automation systems. The analytics management component can determine and generate one or more recommendations, instructions, and/or notifications relating to the one or more changes that can be made in connection with one or more industrial automation systems of to facilitate improving operation of the set of industrial automation systems. For example, based at least in part on the determined correlation between the first item of interest and the second item of interest, the analytics management component can determine a change (e.g., adjustment, modification) that can be made to the parameter setting of the industrial device (e.g., to slow the motor down) to facilitate reducing or minimizing product breakage and/or misalignment of products on the conveyor.

At 1912, one or more recommendations, instructions, and/or notifications relating to one or more changes that can be made in connection with one or more industrial automation systems, to facilitate improving performance associated with the one or more industrial automation system, can be presented (e.g., communicated, displayed). The analytics component can present the one or more recommendations, instructions, and/or notifications, which can relate to the one or more changes that can be made in connection with one or more industrial automation systems, to a communication device associated with a user or an industrial automation system(s) for consideration or action by the user or the industrial automation system(s). For example, the analytics component can present a notification message to the user (e.g., via the communication device of the user) to facilitate notifying the user of the correlation between the first item of interest and second item of interest and/or the negative impact on system performance (e.g., product breakage and/or misalignment of products on the conveyor) relating to the correlation, a recommendation message to the user (e.g., via the communication device of the user), wherein the recommendation recommends that a change (e.g., adjustment, modification) be made to the parameter setting of the industrial device to facilitate reducing or minimizing product breakage and/or misalignment of products on the conveyor, or instructions to the motor or a controller associated with the motor to facilitate changing the parameter setting associated with the motor based on the instructions to facilitate reducing or minimizing product breakage and/or misalignment of products on the conveyor.

Figure 20:
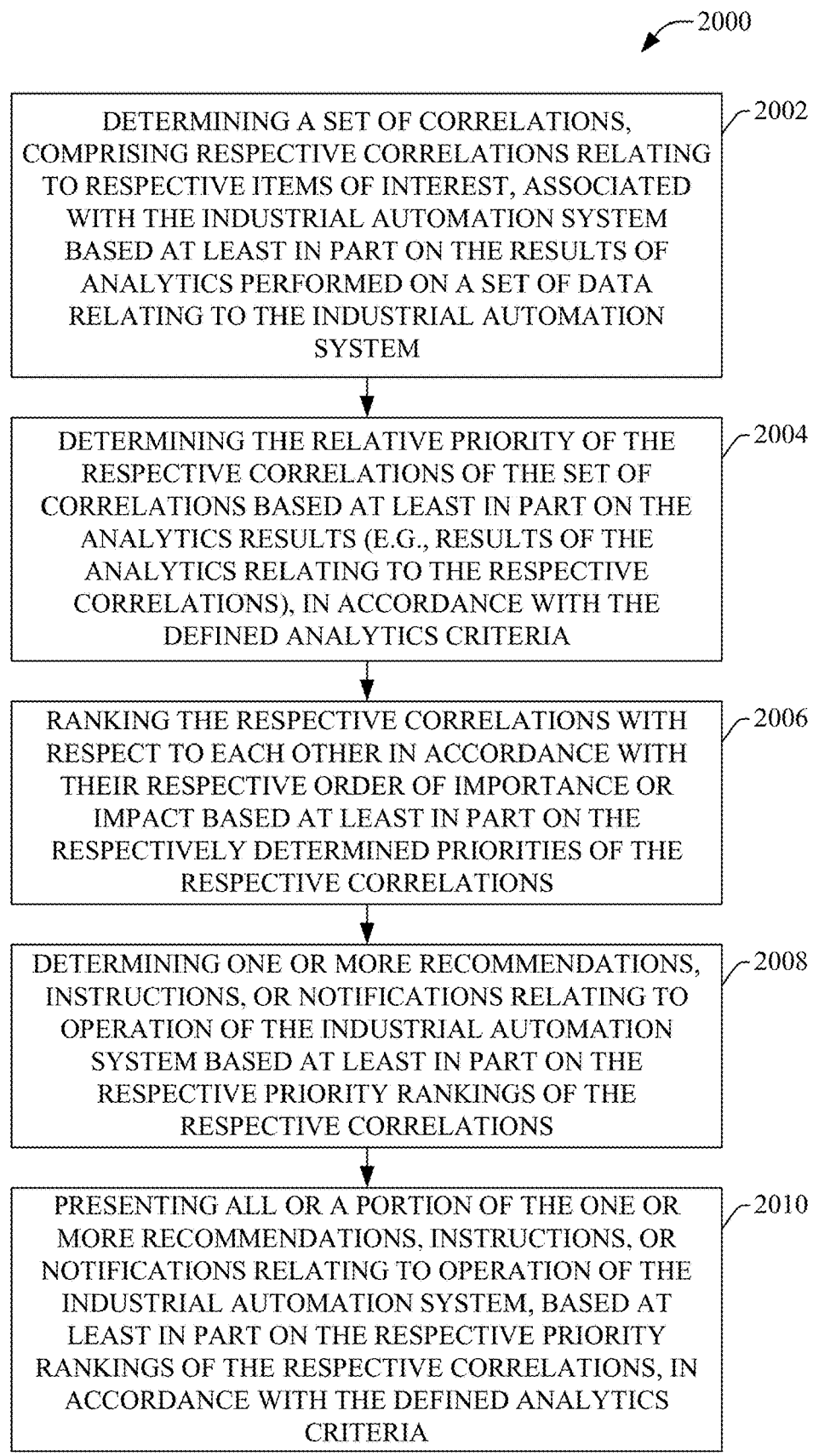
FIG. 20 presents a flow diagram of an example method that can rank and prioritize respective correlations between respective items of interest associated with an industrial automation system to facilitate improving operation of the industrial automation system, in accordance with various implementations and embodiments of the disclosed subject matter.

FIG. 20 presents a flow diagram of an example method 2000 that can rank and prioritize respective correlations between respective items of interest associated with an industrial automation system to facilitate improving operation of the industrial automation system, in accordance with various implementations and embodiments of the disclosed subject matter. The method 2000 can be implemented by an analytics system that can comprise an analytics component that can comprise or be associated with a collection component, a data store, and/or an analytics management component, etc. All or a desired portion of the analytics system can reside in a cloud platform.

At 2002, a set of correlations, comprising respective correlations relating to respective items of interest, associated with the industrial automation system can be determined based at least in part on the results of analytics performed on a set of data relating to the industrial automation system. The analytics management component can determine the set of correlations based at least in part on the results of the analytics performed on the set of data relating to the industrial automation system.

At 2004, the relative priority of the respective correlations of the set of correlations can be determined based at least in part on the analytics results (e.g., results of the analytics relating to the respective correlations), in accordance with the defined analytics criteria. In accordance with the defined analytics criteria, there can be one or more factors that can be considered and applied in determining the relative priority of the respective correlations. For example, in accordance with the defined analytics criteria, the one or more factors can relate to the relative impact or importance on respective defined goals (e.g., production output, revenue from products, profits from products, minimization of waste or breakage associated with production) of the respective correlations, wherein the respective correlations can affect respective defined goals differently (e.g., one correlation affecting a certain goal more than other correlations), and wherein certain goals can be considered more important than other goals. In some implementations, the analytics management component can respectively weight the respective defined goals, in accordance with the defined analytics criteria, to facilitate reflecting (e.g., taking into account) the relative impact or importance of the respective defined goals with respect to each other (e.g., as defined by an entity associated with the industrial automation system). The analytics management component can analyze the respective correlations, and data respectively associated therewith, and can determine the relative priority of the respective correlations of the set of correlations based at least in part on the analysis results, the defined analytics criteria, and/or the respective weightings of the respective defined goals.

At 2006, the respective correlations can be ranked with respect to each other in accordance with their respective order of importance or impact based at least in part on the respectively determined priorities of the respective correlations. The analytics management component can rank the respective correlations with respect to each other in accordance with their respective order of importance or impact based at least in part on the respectively determined priorities of the respective correlations, wherein a correlation having a higher importance or impact can be ranked higher in priority than a correlation having a lower importance or impact.

At 2008, one or more recommendations, instructions, or notifications relating to operation of the industrial automation system can be determined based at least in part on the respective priority rankings of the respective correlations. The analytics management component can determine one or more recommendations, instructions, or notifications relating to operation of the industrial automation system based at least in part on the respective priority rankings of the respective correlations. For instance, the analytics management component can analyze the respective priority rankings of the respective correlations and can determine that a first recommendation or instruction is to be made to facilitate a first change to an aspect (e.g., configuration or parameter setting of an industrial asset) of the industrial automation system based at least in part on a first correlation relating to the aspect, wherein the first correlation is ranked first in priority relative to the other correlations. This can be due to the recommended or instructed change being determined (e.g., by the analytics management component) to have the most desired (e.g., the most positive or favorable) impact on the operation of the industrial automation system in connection with a particular defined goal or set of defined goals.

In some instances, acting on a highest-ranked correlation (e.g., making a change associated with respect to one aspect associated with an industrial automation system related to the highest-ranked correlation) can have an undesirable (e.g., negative) impact with respect to another aspect associated with the industrial automation system that is associated with a lower-ranked correlation. However, in accordance with the defined analytics criteria, due in part to the determined benefit and/or importance of making the change with respect to the one aspect associated with an industrial automation system related to the highest-ranked correlation, the analytics management component can determine that the change with respect to the one aspect is to be made or recommended to be made, even though there may be some undesirable impact with respect to the other aspect associated with the industrial automation system that is associated with the lower-ranked correlation.

The respective priority rankings of the respective correlations associated with the industrial automation system also can facilitate enabling a user to identify the relative importance of making the respective recommended changes to the respective aspects of the industrial automation system associated with the respective priority rankings of the respective correlations. In this way, a user can know which correlations and recommended changes are more important than others, and the user can determine what changes in connection with an industrial automation system are to be made, and can prioritize the order of the making of changes in connection with an industrial automation system, based at least in part on the recommendations, which can be correspondingly prioritized (e.g., by the analytics management component), in accordance with the respective priority rankings of the respective correlations associated with the industrial automation system.

At 2010, all or a portion of the one or more recommendations, instructions, or notifications relating to operation of the industrial automation system can be presented (e.g., to a user or the industrial automation system), based at least in part on the respective priority rankings of the respective correlations, in accordance with the defined analytics criteria. The analytics management component can present (e.g., to user via a communication device, to the industrial automation system) all or a portion of the one or more recommendations, instructions, or notifications relating to the operation of the industrial automation system, based at least in part on the respective priority rankings of the respective correlations, in accordance with the defined analytics criteria, to facilitate improved operation of the industrial automation system (e.g., based on the consideration or action of the user or industrial automation system in response to all or a portion of the one or more recommendations, instructions, or notifications relating to the operation of the industrial automation system).

Figure 21:
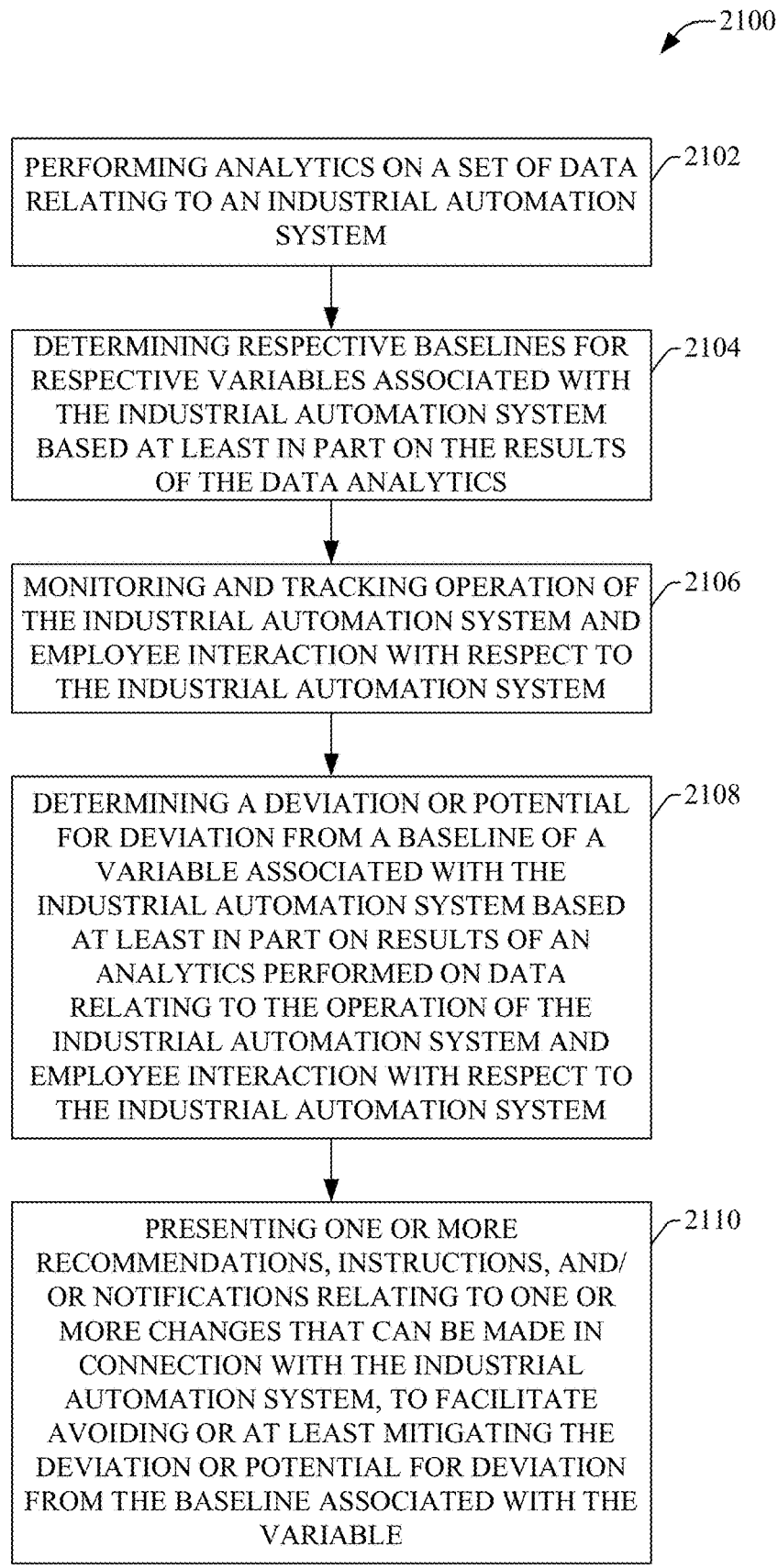
FIG. 21 illustrates a flow diagram of an example method that can determine baselines for respective variables associated with an industrial automation system and determine a deviation from a baseline of a variable associated with an industrial automation system, in accordance with various implementations and embodiments of the disclosed subject matter.

FIG. 21 presents a flow diagram of an example method 2100 that can determine baselines for respective variables associated with an industrial automation system and determine a deviation from a baseline of a variable associated with an industrial automation system, in accordance with various implementations and embodiments of the disclosed subject matter. The method 2100 can be implemented by an analytics system that can comprise an analytics component that can comprise or be associated with a collection component, a data store, and/or an analytics management component, etc. All or a desired portion of the analytics system can reside in a cloud platform.

At 2102, analytics can be performed on a set of data relating to an industrial automation system. The analytics management component can access the cloud-based data store and can retrieve, obtain, read the set of data from the cloud-based data store, wherein the data can be collected from or in connection with the industrial automation system. The analytics management component can perform analytics on the set of data (e.g., perform big data analysis on the set of data) to facilitate determining respective baselines of a set of baselines for respective variables associated with the industrial automation system. The set of variables can relate to, for example, production output of a product by the industrial automation system, a cost associated with producing the product, an amount of material used to produce a product, an amount of time to produce the product, or a performance of an employee in performing a work task in connection with the industrial automation system and/or producing the product.

At 2104, respective baselines (e.g., baseline values, levels, and/or results) for respective variables associated with the industrial automation system can be determined based at least in part on the results of the data analytics. The analytics management component can determine the respective baselines (e.g., performance baselines or guidelines) for the respective variables associated with the industrial automation system based at least in part on the data analytics results.

At 2106, operation of the industrial automation system and employee interaction with respect to the industrial automation system can be monitored and tracked. The analytics management component can monitor and track the operation of the industrial automation system and employee interaction (e.g., work performance or behavior) with respect to the industrial automation system to facilitate determining whether a variable associated with the industrial automation system is deviating or potentially can deviate (e.g., is projected to deviate based on a trend, or is in danger of or substantially close to deviating) from a baseline associated with the variable.

At 2108, a deviation or potential for deviation from a baseline of a variable associated with the industrial automation system can be determined based at least in part on results of an analytics performed on data relating to the operation of the industrial automation system and employee interaction with respect to the industrial automation system. The analytics management component can determine the deviation or potential for deviation from the baseline of the variable associated with the industrial automation system based at least in part on the data analytics results. For example, the analytics management component can analyze the data and, based at least in part on the analytics results, can determine that a variable (e.g., production output, a variable relating to performance of a work task by an employee, an amount of waste in connection with producing a product, a cost associated with producing a product) is deviating or is predicted to deviate from the related (e.g., applicable) baseline for that variable.

At 2110, one or more recommendations, instructions, and/or notifications relating to one or more changes that can be made in connection with the industrial automation system, to facilitate avoiding or at least mitigating the deviation or potential for deviation from the baseline associated with the variable, can be presented (e.g., communicated, displayed). The analytics component can determine and present the one or more recommendations, instructions, and/or notifications, which can relate to the one or more changes that can be made in connection with the industrial automation system, to a communication device associated with a user or an industrial automation system(s) for consideration or action by the user or the industrial automation system(s). For example, the analytics component can present a notification message to the user (e.g., via the communication device of the user) to facilitate notifying a user of the deviation or potential for deviation of a variable from a baseline associated with the industrial automation system, a recommendation message to the user (e.g., via the communication device of the user), wherein the recommendation message can recommend that a change (e.g., adjustment, modification) be made in connection with the variable (e.g., asset-related variable and/or employee-related variable and/or other variable relating to the industrial automation system) to facilitate alleviating, preventing, or mitigating a deviation of the variable from the baseline, or instructions to the an industrial asset(s) associated with the industrial automation system, wherein the instructions can facilitate changing (e.g., adjusting, modifying) an aspect (e.g., parameter setting, configuration) associated with the industrial asset(s) to facilitate alleviating, preventing, or mitigating the deviation of the variable from the baseline.

Figure 22:
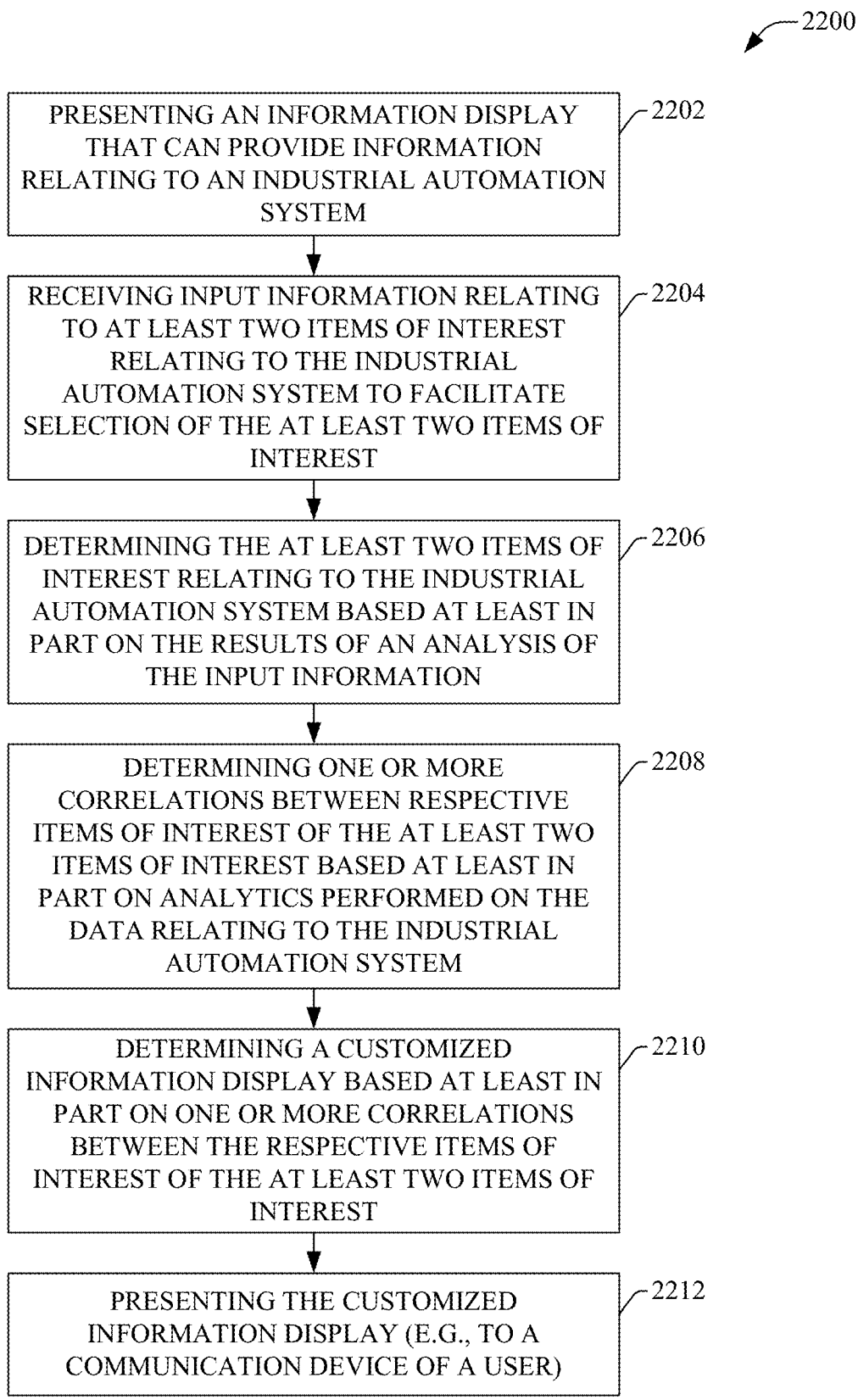
FIG. 22 depicts a flow diagram of an example method that can customize information displays relating to correlations between respective items of interest that are associated with an industrial automation system, in accordance with various implementations and embodiments of the disclosed subject matter.

FIG. 22 depicts a flow diagram of an example method 2200 that can customize information displays relating to correlations between respective items of interest that are associated with an industrial automation system, in accordance with various implementations and embodiments of the disclosed subject matter. The method 2200 can be implemented by an analytics system that can comprise an analytics component that can comprise or be associated with a collection component, a data store, visualization component, and/or an analytics management component, etc. All or a desired portion of the analytics system can reside in a cloud platform.

At 2202, an information display that can provide information relating to an industrial automation system can be presented. The analytics management component can generate information relating to an industrial automation system, or a portion thereof, based at least in part on results of an analysis of industrial-automation-system-related data collected from or in connection with the industrial automation system. The visualization component can generate an information display that can provide the information relating to the industrial automation system, and can present the information display to a user, for example, via a communication device of the user. The information display generated by the visualization component can be a multi-dimensional (e.g., 2-D or 3-D) visualization, and can be presented in one or more formats, such as, for example, a multi-dimensional virtualization or modeling of all or a portion of the industrial automation system, a customized data overlay that can be overlaid on respective portions (e.g., respective virtualized or modeled industrial assets) of the virtualized or modeled industrial automation system, a chart, a graph, a list of data values. In some implementations, the formats of visualization of the information display generated by the visualization component can be determined and/or or customized by the visualization component based at least in part on an identifier, a role, an authentication credential, a user preference, or access rights to the industrial-automation-system-related information associated with the user, and/or other factors, in accordance with the defined analytics criteria.

At 2204, input information relating to at least two items of interest relating to the industrial automation system can be received to facilitate selection of the at least two items of interest. The user can enter input information (e.g., selection information) into a user interface of the user's communication device or another user interface to facilitate selecting the at least two items of interest to the user, wherein such input information can be communicated from the communication device or another device associated with the other user interface to the analytics component. The analytics component can receive the input information. Respective items of interest of the at least two items of interest can relate to respective portions (e.g., industrial asset(s)) or aspects (e.g., product output, material supplies for product available at the industrial facility, production goal(s)) of the industrial automation system or respective extrinsic conditions (e.g., weather conditions, transportation costs), events (e.g., change in material supplies provided by a supplier, train derailment that affects the supply of materials), or factors associated with the industrial automation system, such as more fully disclosed herein.

At 2206, the at least two items of interest relating to the industrial automation system can be determined based at least in part on the results of an analysis of the input information. The analytics management component or visualization component can analyze the input information, and can determine or identify the at least two items of interest selected by the user.

At 2208, one or more correlations between respective items of interest of the at least two items of interest can be determined based at least in part on analytics performed on the data relating to the industrial automation system. The analytics management component can perform analytics on the data relating to the industrial automation system to determine correlations between respective items of interest relating to the industrial automation system. As part of performing the analytics, the analytics management component can perform analytics on the data to determine correlations between the at least two items of interest that were selected by the user.

At 2210, a customized information display can be determined based at least in part on one or more correlations between the respective items of interest of the at least two items of interest. The visualization component can determine the customized information display based at least in part on one or more correlations between the respective items of interest selected by the user, the identifier, role, authentication credential, user preference, or access rights to the industrial-automation-system-related information associated with the user, and/or other factors, in accordance with the defined analytics criteria. The customized information display (e.g., 2-D or 3-D customized information display) can present information relating to the one or more correlations between the respective items of interest selected by the user in one or more desired formats of visualization, wherein the visualization component can determine the one or more desired formats of visualization to employ when generating the customized information display based at least in part on the respective items of interest selected by the user, the identifier, role, authentication credential, user preference, or access rights to the industrial-automation-system-related information associated with the user, and/or other factors, in accordance with the defined analytics criteria. The information relating to the one or more correlations can comprise information describing the one or more correlations between the respective items of interest (e.g., describing how a change with regard to a first item of interest can affect or change a second item of interest) and/or one or more recommendations or instructions that can be considered or acted upon by the user to facilitate improving operations associated with the industrial automation system.

At 2212, the customized information display can be presented (e.g., to the user via the user interface of the user's communication device or other user interface available to the user). The analytics component can present (e.g., communicate) the customized information display to the communication device of the user, wherein the customized information display can be displayed on a display screen of the communication device.

Embodiments, systems, and components described herein, as well as industrial automation or control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 23:
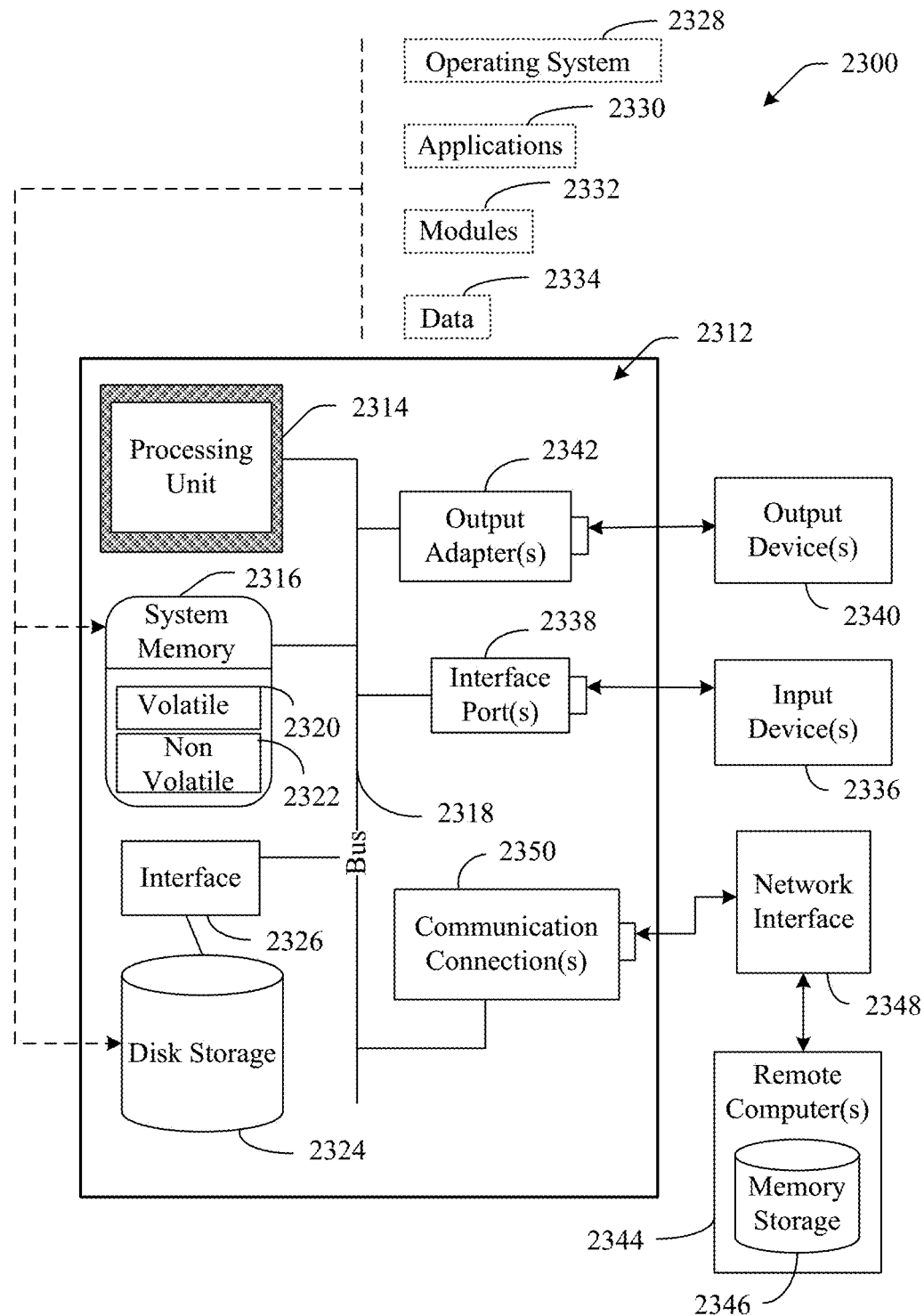
FIG. 23 is an example computing and/or operating environment.
Figure 24:
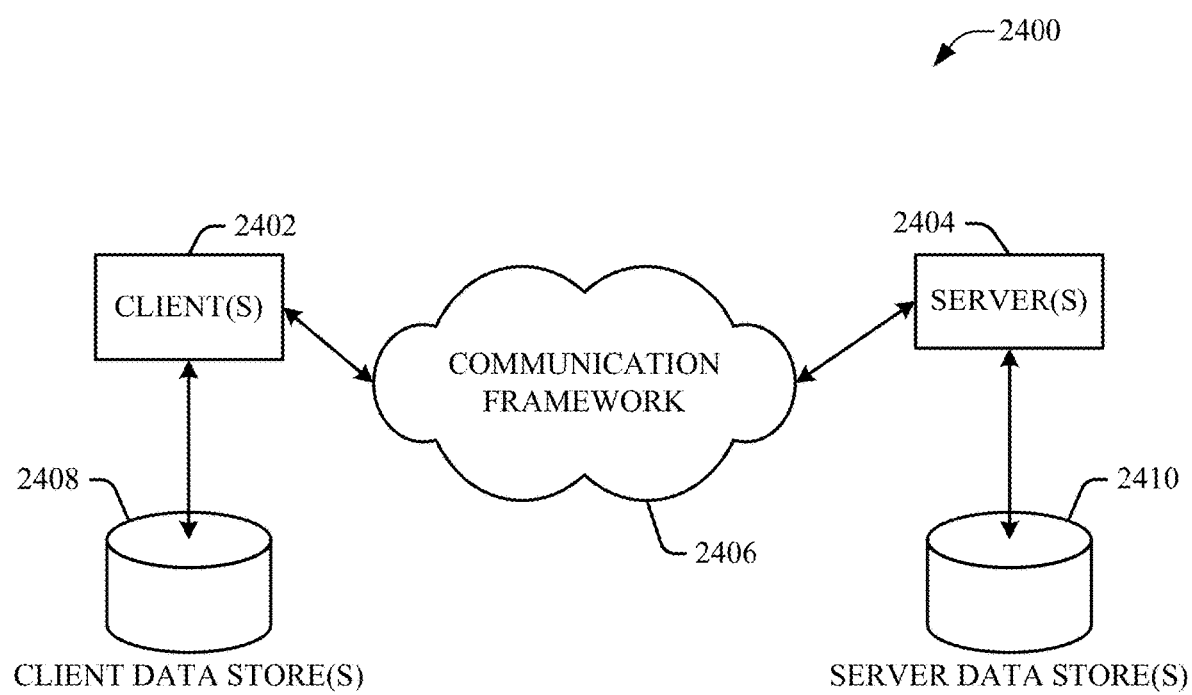
FIG. 24 is an example computing and/or networking environment.

In order to provide a context for the various aspects of the disclosed subject matter, FIGS. 23 and 24 as well as the following discussion are intended to provide a brief, general description of a suitable environment in which the various aspects of the disclosed subject matter can be implemented.

With reference to FIG. 23, an example environment 2300 for implementing various aspects of the aforementioned subject matter includes a computer 2312. The computer 2312 includes a processing unit 2314, a system memory 2316, and a system bus 2318. The system bus 2318 couples system components including, but not limited to, the system memory 2316 to the processing unit 2314. The processing unit 2314 can be any of various available processors. Multi-core microprocessors and other multiprocessor architectures also can be employed as the processing unit 2314.

The system bus 2318 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 2316 includes volatile memory 2320 and nonvolatile memory 2322. The basic input/output system (BIOS), containing the basic routines to transfer information between elements within the computer 2312, such as during start-up, is stored in nonvolatile memory 2322. By way of illustration, and not limitation, nonvolatile memory 2322 can include read only memory (ROM), programmable ROM (PROM), electrically programmable ROM (EPROM), electrically erasable PROM (EEPROM), or flash memory.

Volatile memory 2320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2312 also includes removable/non-removable, volatile/non-volatile computer storage media. FIG. 23 illustrates, for example a disk storage 2324. Disk storage 2324 includes, but is not limited to, devices like a magnetic disk drive, floppy disk drive, tape drive, Jaz drive, Zip drive, LS-100 drive, flash memory card, or memory stick. In addition, disk storage 2324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 2324 to the system bus 2318, a removable or non-removable interface is typically used such as interface 2326.

It is to be appreciated that FIG. 23 describes software that acts as an intermediary between users and the basic computer resources described in suitable operating environment 2300. Such software includes an operating system 2328. Operating system 2328, which can be stored on disk storage 2324, acts to control and allocate resources of the computer 2312. System applications 2330 take advantage of the management of resources by operating system 2328 through program modules 2332 and program data 2334 stored either in system memory 2316 or on disk storage 2324. It is to be appreciated that one or more embodiments of the subject disclosure can be implemented with various operating systems or combinations of operating systems.

A user enters commands or information into the computer 2312 through input device(s) 2336. Input devices 2336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2314 through the system bus 2318 via interface port(s) 2338. Interface port(s) 2338 include, for example, a serial port, a parallel port, a game port, and a universal serial bus (USB). Output device(s) 2340 use some of the same type of ports as input device(s) 2336. Thus, for example, a USB port may be used to provide input to computer 2312, and to output information from computer 2312 to an output device 2340. Output adapters 2342 are provided to illustrate that there are some output devices 2340 like monitors, speakers, and printers, among other output devices 2340, which require special adapters. The output adapters 2342 include, by way of illustration and not limitation, video and sound cards that provide a means of connection between the output device 2340 and the system bus 2318. It should be noted that other devices and/or systems of devices provide both input and output capabilities such as remote computer(s) 2344.

Computer 2312 can operate in a networked environment using logical connections to one or more remote computers, such as remote computer(s) 2344. The remote computer(s) 2344 can be a personal computer, a server, a router, a network PC, a workstation, a microprocessor based appliance, a peer device or other common network node and the like, and typically includes many or all of the elements described relative to computer 2312. For purposes of brevity, only a memory storage device 2346 is illustrated with remote computer(s) 2344. Remote computer(s) 2344 is logically connected to computer 2312 through a network interface 2348 and then physically connected via communication connection 2350. Network interface 2348 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2350 refers to the hardware/software employed to connect the network interface 2348 to the system bus 2318. While communication connection 2350 is shown for illustrative clarity inside computer 2312, it can also be external to computer 2312. The hardware/software necessary for connection to the network interface 2348 includes, for exemplary purposes only, internal and external technologies such as, modems including regular telephone grade modems, cable modems and DSL modems, ISDN adapters, and Ethernet cards.

FIG. 24 is a schematic block diagram of a sample computing and/or networking environment 2400 with which the disclosed subject matter can interact. The computing and/or networking environment 2400 can include one or more clients 2402. The client(s) 2402 can be hardware and/or software (e.g., threads, processes, computing devices). The computing and/or networking environment 2400 also can include one or more servers 2404. The server(s) 2404 can also be hardware and/or software (e.g., threads, processes, computing devices). The servers 2404 can house threads to perform transformations by employing one or more embodiments as described herein, for example. One possible communication between a client 2402 and servers 2404 can be in the form of a data packet adapted to be transmitted between two or more computer processes. The computing and/or networking environment 2400 can include a communication framework 2406 that can be employed to facilitate communications between the client(s) 2402 and the server(s) 2404. The client(s) 2402 are operably connected to one or more client data stores 2408 that can be employed to store information local to the client(s) 2402. Similarly, the server(s) 2404 are operably connected to one or more server data stores 2410 that can be employed to store information local to the servers 2404.

What has been described above includes examples of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

It is to be appreciated and understood that components (e.g., modeler component, model management component, virtualization component, collection component, communication device, information provider component, processor component, data store, etc.), as described with regard to a particular system or method, can include the same or similar functionality as respective components (e.g., respectively named components or similarly named components) as described with regard to other systems or methods disclosed herein.

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A method, comprising:
with regard to a first time period, generating, by a system comprising a processor, a first model representative of an industrial automation system, comprising a set of devices, based at least in part on a first result of first analytics performed on a first subset of a set of industrial data obtained from the set of devices of the industrial automation system, wherein the first result comprises a correlation between a first item of interest relating to a variable associated with an industrial process associated with the industrial automation system and a second item of interest relating to a production output of the industrial automation system, wherein the first model is utilized to perform a first simulation of first operation of the industrial automation system with regard to the first time period, and wherein the first model, in part, is representative of the correlation and the variable associated with the industrial process;
with regard to the first time period, based at least in part on the first simulation, the correlation, and the first analytics, determining, by the system, a first formula for the variable associated with the industrial process that corresponds to a first level of influence the variable has on the production output of the industrial automation system, wherein the first formula is part of the industrial process and utilized to configure a device associated with the industrial process, and wherein the set of devices comprises the device;
subsequently generating, by the system, a second model representative of the industrial automation system, with regard to a second time period, based at least in part on the correlation and a second result of second analytics performed on a second subset of the set of industrial data, wherein the second model is utilized to perform a second simulation of second operation of the industrial automation system, and wherein the second model, in part, is representative of the correlation and the variable associated with the industrial process; and
with regard to the second time period, based at least in part on the second simulation, the correlation, and the second analytics:
determining, by the system, the first level of influence of the variable on the production output has changed to a second level of influence, and
determining, by the system, a second formula for the variable that corresponds to the second level of influence the variable has on the production output to facilitate improving a performance of the industrial automation system, wherein the second formula is implemented as part of the industrial process, and wherein the device is reconfigured based at least in part on the second formula.

2. The method of claim 1, further comprising:
collecting, by the system, the set of industrial data from the set of devices of the industrial automation system;
storing, by the system, the set of industrial data in a data store, wherein at least one of the first analytics, the second analytics, the collecting of the set of industrial data, or the storing of the set of industrial data in the data store is or are performed in a cloud platform; and
interfacing, by the system, the cloud platform with the industrial automation system via a cloud gateway component of the industrial automation system to facilitate communication of the set of industrial data from the industrial automation system to the cloud platform.

3. The method of claim 2, wherein the device is an industrial device, wherein the industrial device is integrated with or associated with the cloud gateway component to facilitate communication of a portion of the set of industrial data relating to the industrial device from the industrial device to the cloud platform.

4. The method of claim 1, further comprising:
determining, by the system, a performance baseline for the variable associated with the industrial process based at least in part on the first result of the first analytics performed on the first subset of industrial data, wherein the performance baseline relates to a defined production goal associated with the industrial automation system and indicates a defined acceptable performance level for the variable.

5. The method of claim 4, further comprising:
based at least in part on the second result of the second analytics performed on the second subset of industrial data:
determining, by the system, a deviation from the performance baseline for the variable; and
determining, by the system, an alteration to operation of the device that is able to rectify or mitigate the deviation from the performance baseline for the variable, wherein the alteration relates to the second level of influence the variable has on the production output of the industrial automation system.

6. The method of claim 5, further comprising:
implementing, by the system, the alteration to the operation of the device to rectify or mitigate the deviation from the performance baseline for the variable.

7. The method of claim 5, further comprising:
communicating, by the system, a recommendation message or an instruction message to a communication device associated with a user, wherein the recommendation message or the instruction message comprises recommendation information indicating that implementation of the alteration is recommended to rectify or mitigate the deviation from the performance baseline for the variable or an instruction to implement the alteration to rectify or mitigate the deviation from the performance baseline for the variable.

8. The method of claim 1, further comprising:
generating, by the system, a visualized information display comprising first visualized information relating to the first result of the first analytics, wherein the visualized information display is a two-dimensional visualized information display or a three-dimensional visualized information display;
modifying, by the system, the visualized information display, based at least in part on the second result of the second analytics, to generate a modified visualized information display comprising second visualized information that facilitates displaying a visual representation relating to the second formula for the variable or the second level of influence the variable has on the production output; and
presenting, by the system, the modified visualized information display via an interface or a communication device.

9. The method of claim 1, wherein the device is an industrial device, and wherein the method further comprises:
communicating, by the system, analysis instructions and an analysis algorithm to the industrial device to provide the industrial device with analysis functionality that enables the industrial device to perform a self-analysis on the industrial device that relates to operation of the industrial device based at least in part on the analysis instructions and the analysis algorithm.

10. The method of claim 1, further comprising:
receiving, by the system, input information from a communication device associated with a user, wherein the input information indicates a selection of the first item of interest relating to the variable associated with the industrial process and the second item of interest relating to the production output of the industrial automation system; and
in response to the selection of the first item of interest and the second item of interest, determining, by the system, the correlation between the first item of interest and the second item of interest based at least in part on the first result of the first analytics.

11. The method of claim 1, wherein the correlation is a first correlation, and wherein the method comprises:
determining, by the system, a second correlation between the second item of interest relating to the production output of the industrial automation system and a third item of interest relating to a focus of attention of a user while performing work tasks associated with the industrial automation system.

12. The method of claim 11, further comprising:
based at least in part on analyzing the second correlation, determining, by the system, a modification to the industrial automation system in response to the focus of the attention of the user while performing the work tasks to facilitate enhancing the production output of the industrial automation system or mitigating a harm to the production output due in part to the focus of attention of the user.

13. The method of claim 1, further comprising:
receiving, by the system, respective video streams from respective capture components associated with the industrial automation system, wherein the respective capture components capture respective video images of respective portions of the industrial automation system, and wherein the respective video streams comprise the respective video images; and
analyzing, by the system, the respective video streams to facilitate the determining of the correlation between the first item of interest and the second item of interest.

14. A system, comprising:
a non-transitory computer-readable memory that stores computer-executable components; and
a processor, operatively coupled to the memory, that executes the computer-executable components, the computer-executable components comprising:
an analytics component that performs first analytics on a first subset of a set of industrial data received from a set of devices of an industrial automation system, and, based at least in part on a first result of the first analytics, determines a correlation between a first item of interest relating to a first characteristic associated with the industrial automation system and a second item of interest relating to a second characteristic associated with the industrial automation system;
a modeler component that generates a first model that corresponds to the industrial automation system, with regard to a first time period, based at least in part on the first result of the first analytics, wherein the first model is utilized to perform a first simulation of first operation of the industrial automation system with regard to the first time period, wherein the first model, in part, is representative of the correlation and the first characteristic associated with the industrial automation system,
wherein, with regard to the first time period, based at least in part on the first simulation, the correlation, and the first analytics, the analytics component determines a first formula associated with the first characteristic associated with the industrial automation system that corresponds to a first level of influence the first characteristic has on the second characteristic associated with the industrial automation system, wherein the first formula is part of the industrial automation system and utilized to configure a device of the set of devices,
wherein, with regard to a second time period, the analytics component subsequently performs second analytics on a second subset of the set of industrial data,
wherein, the modeler component subsequently generates a second model that corresponds to the industrial automation system, with regard to the second time period, based at least in part on the correlation and a second result of the second analytics, wherein the second model is utilized to perform a second simulation of second operation of the industrial automation system, wherein the second model, in part, is representative of the correlation and the first characteristic associated with the industrial automation system,
wherein, with regard to the second time period, based at least in part on the second simulation, the correlation, and the second analytics, the analytics component determines the first level of influence that the first characteristic had on the second characteristic has changed to a second level of influence the first characteristic has on the second characteristic associated with the industrial automation system, and determines and implements a second formula associated with the first characteristic that corresponds to the second level of influence the first characteristic has on the second characteristic to facilitate improving operation of the industrial automation system, and wherein the second formula is part of the industrial automation system and utilized to reconfigure the device.

15. The system of claim 14, wherein the first characteristic relates to a variable that relates to at least one of an industrial process of the industrial automation system, a network-related device of the set of devices, a production goal associated with a product associated with the industrial process, a product cost associated with producing the product, a material or an ingredient that is used for producing the product, a length of time to produce the product, or an interaction of an entity associated with the industrial automation system; and
wherein the second characteristic relates to at least one of a production output associated with the industrial process, an industrial device of the set of devices, another network-related device of the set of devices, another industrial process of the industrial automation system, another production goal associated with the product, another material or another ingredient that is used for producing the product, another interaction of another entity associated with the industrial automation system, a transportation cost relating to the product, an energy cost associated with the industrial automation system, a governmental policy, or a consumer demand for the product.

16. The system of claim 14, wherein the computer-executable components further comprise:
a collection component that collects the set of industrial data from the set of devices of the industrial automation system and stores the set of industrial data in a data store, wherein at least one of the analytics component, the modeler component, the collection component, or the data store is or are part of a cloud platform; and
an interface component that interfaces the cloud platform with the industrial automation system via a cloud gateway component of the industrial automation system to facilitate communication of data, comprising the set of industrial data, between the industrial automation system and at least one of the analytics component, the modeler component, the collection component, or the data store.

17. The system of claim 14, wherein the analytics component determines a performance baseline for a variable associated with the industrial automation system based at least in part on the first result of the first analytics performed on the first subset of industrial data, wherein the performance baseline relates to a defined production goal associated with the industrial automation system and indicates a defined acceptable performance level for the variable, and wherein the first characteristic relates to the variable.

18. The system of claim 17, wherein, based at least in part on the second result of the second analytics performed on the second subset of industrial data, the analytics component determines a deviation from the performance baseline for the variable, determines a modification to operation of the device that is able to rectify or mitigate the deviation from the performance baseline for the variable, wherein the modification relates to the second level of influence the variable has on a production output associated with an industrial process of the industrial automation system, and wherein the second characteristic relates to the production output.

19. A non-transitory machine-readable medium storing machine-executable instructions that, in response to execution, cause a system comprising a processor to perform operations, comprising:
with regard to a first time interval, creating a first model representative of an industrial automation system, comprising a set of devices, based at least in part on a first result of first analytics performed on a first subset of a set of industrial data obtained from the set of devices of the industrial automation system, wherein the first result comprises a correlation between a first item of interest relating to a variable relating to an industrial process of the industrial automation system and a second item of interest relating to a production outcome of the industrial automation system, wherein a first simulation of first operation of the industrial automation system is executed based at least in part on the first model, and wherein the first model, in part, is representative of the correlation and the variable relating to the industrial process;
with regard to the first time interval, based at least in part on the first simulation, the correlation, and the first analytics, determining, by the system, a first formula for the variable relating to the industrial process that corresponds to a first amount of influence the variable has on the production outcome of the industrial automation system, wherein the first formula is part of the industrial process and utilized to configure a device associated with the industrial process, and wherein the set of devices comprises the device;
subsequently creating a second model representative of the industrial automation system, with regard to a second time interval, based at least in part on a second result of second analytics performed on a second subset of the set of industrial data, wherein a second simulation of second operation of the industrial automation system is executed based at least in part on the second model, and wherein the second model, in part, is representative of the correlation and the variable relating to the industrial process; and
with regard to the second time interval, based at least in part on the second simulation, the correlation, and the second analytics:
determining that the first amount of influence the variable has on the production outcome has changed to a second amount of influence, and
in response to determining that the first amount of influence the variable has on the production outcome has changed to the second amount of influence, determining a second formula for the variable that relates to the second amount of influence the variable has on the production outcome, to facilitate enhancing a performance of the industrial automation system, wherein the second formula is part of the industrial automation process and relates to a reconfiguration of the industrial device, and wherein the device is reconfigured based at least in part on the second formula.

20. The non-transitory machine-readable medium of claim 19, wherein the operations further comprise:
receiving the set of industrial data from the set of devices of the industrial automation system;
storing the set of industrial data in a data store, wherein at least one of the first analytics, the second analytics, the receiving of the set of industrial data, or the storing of the set of industrial data in the data store is or are performed in a cloud platform; and
interfacing the cloud platform with the industrial automation system via a cloud gateway component of the industrial automation system to facilitate communication of data, comprising the set of industrial data, between the industrial automation system and the cloud platform.

* * * * *